US009369315B2

(12) United States Patent
Charalambous et al.

(10) Patent No.: US 9,369,315 B2
(45) Date of Patent: Jun. 14, 2016

(54) DIGITAL COMMUNICATION SYSTEM USING REAL-TIME CAPACITY ACHIEVING ENCODER DESIGN FOR CHANNELS WITH MEMORY AND FEEDBACK

(71) Applicant: UNIVERSITY OF CYPRUS, Nicosia (CY)

(72) Inventors: Charalambos D. Charalambous, Nicosia (CY); Christos K. Kourtellaris, Nicosia (CY)

(*) Notice: Subject to any disclaimer, the term of this patent is extended or adjusted under 35 U.S.C. 154(b) by 0 days.

(21) Appl. No.: 14/700,495

(22) Filed: Apr. 30, 2015

(65) Prior Publication Data

US 2015/0326412 A1 Nov. 12, 2015

Related U.S. Application Data

(60) Provisional application No. 61/987,797, filed on May 2, 2014.

(51) Int. Cl.
*H04L 27/00* (2006.01)
*H04L 25/03* (2006.01)
*H04L 1/00* (2006.01)

(52) U.S. Cl.
CPC ........ *H04L 25/03828* (2013.01); *H04L 1/0009* (2013.01); *H04L 1/0019* (2013.01); *H04L 25/03343* (2013.01)

(58) Field of Classification Search
USPC ....................................................... 375/295
See application file for complete search history.

(56) References Cited

U.S. PATENT DOCUMENTS

| 6,192,238 | B1 * | 2/2001 | Piirainen | 455/422.1 |
|---|---|---|---|---|
| 7,676,007 | B1 * | 3/2010 | Choi et al. | 375/347 |
| 2011/0125702 | A1 * | 5/2011 | Gorur et al. | 706/52 |
| 2013/0007264 | A1 * | 1/2013 | Effros et al. | 709/224 |
| 2015/0098533 | A1 * | 4/2015 | Rusek | 375/350 |

FOREIGN PATENT DOCUMENTS

| WO | WO-2008/024967 A2 | 2/2008 |
|---|---|---|
| WO | WO-2009/084896 A2 | 7/2009 |

OTHER PUBLICATIONS

Blahut, "Computation of channel capacity and rate-distortion functions," IEEE Transactions on Information Theory, vol. 18, No. 4, pp. 460-473, Jul. 1972.

(Continued)

*Primary Examiner* — Lihong Yu
(74) *Attorney, Agent, or Firm* — Marshall, Gerstein & Borun LLP

(57) ABSTRACT

A method for characterizing a capacity of a channel with memory and feedback comprises defining a channel model corresponding to the channel, wherein: the channel is utilized to transmit information from a source to a destination, and the channel model indicates a dependence of outputs from the channel on past and present channel input symbols and on past channel output symbols. The method further includes determining a representation of the capacity based on the channel model and based on a channel input distribution that achieves the capacity, wherein the representation represents the capacity for a finite number of transmissions over the channel, and wherein the representation includes an optimization, and solving the optimization of the representation of the capacity to determine the capacity of the channel for the finite number of transmissions.

25 Claims, 16 Drawing Sheets

(56) References Cited

OTHER PUBLICATIONS

Chen et al., "The capacity of finite-state Markov channels with feedback," IEEE Transactions on Information Theory, vol. 51, No. 3, pp. 780-798, Mar. 2005.

Cover et al., "Gaussian feedback capacity," *IEEE Transactions on Information Theory*, vol. 35, No. 1, pp. 37-43, Jan. 1989.

Cover et al., Elements of Information Theory, 2nd ed. John Wiley & Sons, Inc., Hoboken, New Jersey, 2006. (Table of Contents).

Dobrushin "General formulation of Shannon's main theorem of information theory," Usp. Math. Nauk., vol. 14, pp. 3-104, 1959, translated in Am. Math. Soc. Trans., 33:323-438.

Dobrushin, "Information transmission in a channel with feedback," Theory of Probability and its Applications, vol. 3, No. 2, pp. 367-383, 1958.

Elishco et al., "Capacity and coding of the ising channel with feedback," IEEE Transactions on Information Theory, vol. 60, No. 9, pp. 5138-5149, Jun. 2014.

Gamal et al., *Network Information Theory*. Cambridge University Press, Dec. 2011. (Table of Contents).

Kim, "A Coding Theorem for a Class of Stationary Channels with Feedback," IEEE Transactions on Information Theory, vol. 54, No. 4, pp. 1488-1499, Apr. 2008.

Kim, "Feedback capacity of stationary gaussian channels," IEEE Transactions on Information Theory, vol. 56., No. 1, pp. 57-85, 2010.

Kramer, "Topics in Multi-User Information Theory," Foundations and Trends in Communications and Information Theory, vol. 4, Nos. 4-5, pp. 265-444, 2007.

Permuter et al., "Capacity of a post channel with and without feedback," IEEE Transactions on Information Theory, vol. 60, No. 9, pp. 6041-6057, 2014.

Permuter et al., "Capacity of the trapdoor channel with feedback," IEEE Transactions on Information Theory, vol. 54, No. 7, pp. 3150-3165, Jul. 2008.

Permuter et al., "Finite state channels with time-invariant deterministic feedback," IEEE Transactions on Information Theory, vol. 55, No. 2, pp. 644-662, Feb. 2009.

Schalkwijk et al., "A coding scheme for additive noise channels with feedback-I: no bandwidth constraints," IEEE Transactions on Information Theory, vol. 12, No. 2, pp. 172-182, Apr. 1966.

Shannon, "A mathematical theory of communication," pp. 1-55, reprinted from Bell Syst. Tech., vol. 27, pp. 379-423, 623,656, Jul., Oct. 1948.

Tatikonda et al., "The capacity of channels with feedback," IEEE Transactions on Information Theory, vol. 55, No. 1, pp. 323-349, Jan. 2009.

Verdu et al., "A general formula for channel capacity," IEEE Transactions on Information Theory, vol. 40, No. 4, pp. 1147-1157, Jul. 1994.

Yang et al., "Feedback capacity of finite-state machine channels," Information Theory, IEEE Transactions on, vol. 51, No. 3, pp. 799-810, Mar. 2005.

Yang et al., "On the Feedback Capacity of Power-Constrained Gaussian Noise Channels with Memory," IEEE Transactions on Information Theory, vol. 53, No. 3, pp. 929-954, Mar. 2007.

European Search Report, corresponding European Application No. 15165990.1, mailing date Sep. 24, 2015.

\* cited by examiner

DIGITAL COMMUNICATION SYSTEM USING REAL-TIME CAPACITY ACHIEVING ENCODER DESIGN FOR CHANNELS WITH MEMORY AND FEEDBACK

CROSS-REFERENCE TO RELATED APPLICATIONS

This application claims priority to and the benefit of the filing date of U.S. Provisional Patent Application Ser. No. 61/987,797, which was entitled "Real-Time Capacity Achieving Encoder Design For Channels With Memory And Feedback" and filed on May 2, 2014. The entire disclosure of this application is hereby expressly incorporated by reference herein for all uses and purposes.

TECHNICAL FIELD

This patent application relates generally to systems and methods for facilitating real-time communication, and more particularly, to determining properties of channel input distributions that characterize capacities of channels with memory, with feedback, with or without transmission cost, and without feedback (in certain cases in which feedback does not increase capacity), to designing encoders to achieve capacities of channels with memory, to characterizing nonanticipative rate distortion functions for sources of information with memory, and to utilize characterized rate distortion functions and channel capacities in Joint Source-Channel Coding (JSCC).

BACKGROUND

Advancements in information technology and networks are transforming the everyday lives of many people with respect to employment, health care, communication, education, environment, etc. In particular, advancements in information technology and networks have spawned the field of Cyber-Physical Systems (CPSs), which field refers to the next generation of engineering systems integrated via advanced technologies and protocols. These engineering systems are capable of performing ubiquitous computing, communication, and control for complex physical systems and can be implemented in energy systems (e.g., the electric power distribution and smart grids), transportation systems (e.g., traffic networks), health care and medical systems, surveillance networks, control systems for underwater and unmanned aerial vehicles, etc. In many of these applications, sub-systems, sensors or observation posts, and controllers or control stations are distributed, often at distinct locations, and communication among sub-systems is limited. Thus, in the context of such systems, there is a demand for real-time communication, decentralized decisions, and the integration of real-time communication and decentralized decisions into complex networks.

In the field of communications, most encoders and decoders for transmitting information over channels (e.g., for transmitting speech signals over wireless communication channels) are designed based on an assumption that the channels do not have memory. That is, most communication systems are configured based on theories, methods, expressions, etc. assuming that channels of the communication system have an conditional output probability distribution that depends only on a current input (i.e., the output of the channels is conditionally independent of previous channel inputs or outputs symbols and the source symbols). However, typical communication channels are not memoryless due to Inter-symbol interference (ISI), correlated channel noise, etc. As a result, most communication systems are configured with components (e.g., encoders) that do not operate optimally when transmitting information over channels (e.g., the components do not achieve the capacity of the channels with memory) and are, in many cases, overly complicated due to the lack of knowledge of capacity achieving properties of the encoders. A characterization of channel capacity and corresponding capacity achieving channel input distributions, which would allow for the design of capacity achieving encoders, is not known for most channels with memory.

Further, the field of communications has developed primarily based on the following model: a message is generated randomly by an information source, the message is encoded by an encoder, the message is transmitted as a signal over a noisy channel, and the transmitted signal is decoded to produce an output as an approximation of the message generated by the source. The fundamental problem of this model is to determine simultaneously what information should be transmitted (source coding) and how the information should be transmitted (channel coding) to achieve performance. Over the years, this fundamental problem has been separated into the two subproblems of source coding and channel coding. The first sub-problem, source coding, is related to efficient representation of information, such as information representing speech, so as to minimize information storage and to characterization of a minimum rate of compressing the information generated by the source of the information (e.g., via the classical Rate Distortion Function (RDF) of the source subject to a fidelity of reconstruction). The second sub-problem, channel coding or "error correction coding," is related to a correction of errors arising from channel noise, such as flaws in an information/data storage or transmission system, loss of information packets in networks, failures of communications links, etc., and to the characterization of the maximum rate of information transmission, called "channel capacity."

The general separation of the fundamental problem into source coding and channel coding sub-problems, has divided the community of developers into independent groups developing source codes and channel codes, respectively. Although, extremely useful in some contexts, this idealized separation is limiting future advances in communication technology, in that developers are ignoring practical design criteria, such as computational complexity, delay, and optimal performance. Further, the ideal separation of source coding and channel coding is often violated for point-to-point communications over channels with memory and for network communication systems. On the other hand, the optimal design of simultaneously performing data compression and channel coding is, in those known cases, elegantly simple. However, this optimal design is, in general, hard to find. For example, separation of source and channel coding leads to the design of channel codes which treat all information bits as equally important. However, a scenario in which all information bits are equally important (e.g., in achieving an optimal channel capacity) is rare, and, hence, a separation of source and channel coding can lead to performance degradation.

SUMMARY

In an embodiment, a method for characterizing a capacity of a channel with memory and feedback comprises defining a channel model corresponding to the channel, wherein: the channel is utilized to transmit information from a source to a destination, and the channel model indicates a dependence of outputs from the channel on past and present channel input symbols and on past channel output symbols. The method further includes determining a representation of the capacity based on the channel model and based on a channel input distribution that achieves the capacity, wherein the representation represents the capacity for a finite number of transmissions over the channel, and wherein the representation includes an optimization, and solving, by one or more processors of a specially configured computing device, the optimization of the representation of the capacity to determine the capacity of the channel for the finite number of transmissions and a per unit time limit of the capacity of the channel.

In another embodiment, a system comprises one or more processors and one or more non-transitory memories. The one or more non-transitory memories store computer-readable instructions that specifically configure the system such that, when executed by the one or more processors, the computer-readable instructions cause the system to: receive a channel model corresponding to the channel, wherein: the channel is utilized to transmit information from a source to a destination, and the channel model indicates a dependence of outputs from the channel on past and present channel input symbols and on past channel output symbols. the computer-readable instructions further cause the system to: determine a representation of the capacity based on the channel model and based on a channel input distribution that achieves the capacity, wherein the representation represents the capacity for a finite number of transmissions over the channel, and wherein the representation includes an optimization, and solve the optimization of the representation of the capacity to determine the capacity of the channel for the finite number of transmissions.

DETAILED DESCRIPTION

Figure 1:
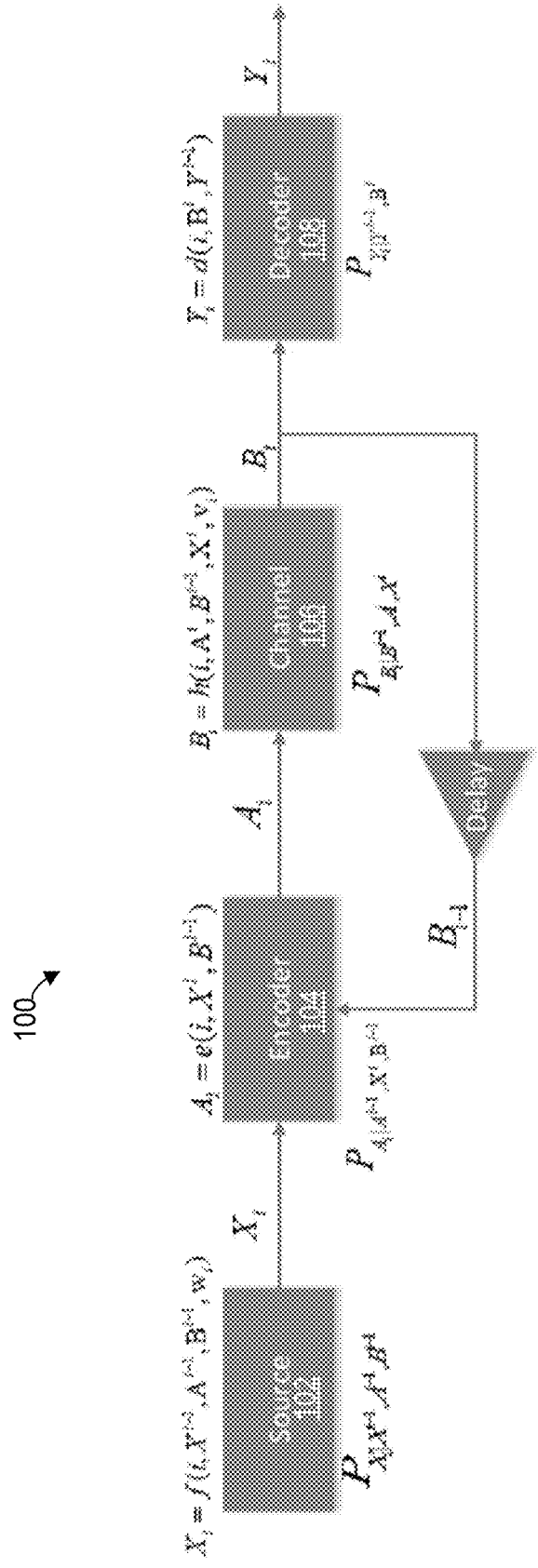
FIG. 1 is a block diagram of an example communication system for encoding and transmitting messages generated by a source.

The techniques of the present disclosure facilitate a characterization of capacity and capacity achieving channel input distributions for channels with memory, with or without feedback, and with transmission cost. Further, encoders of the present disclosure satisfy necessary and sufficient conditions to achieve the capacity of channels with memory, with or without feedback, and with transmission cost, and methods of the present disclosure include determining whether an optimal transmission, for a given model of channels and transmission cost, is indeed real-time transmission. Encoders of the present disclosure may also be configured that such that the encoders simultaneously compress and encode information for sources with memory and/or with zero-delay, by performing a JSCC design.

To this end, a two-step procedure determines the structural properties of (i) capacity achieving encoders, and (ii) capacity achieving channel input distributions, for general channels with memory and with or without feedback encoding and transmission cost. More specifically, the two-step procedure identifies "multi-letter," "finite block length" feedback capacity expressions along with the corresponding capacity achieving channel input distributions and encoders. By extension, the procedure identifies per unit time limiting feedback capacity formulas along with the corresponding capacity achieving channel input distributions and encoders.

Further, necessary and sufficient conditions allow for the design of an encoder with or without feedback that achieves the capacity of a channel with memory. These encoders, referred to herein as "information lossless" encoders, define a mapping of information from a source, which mapping generates the information to the output of the encoder. The mapping may be invertible such that no information is lost in the encoding process. For each of a plurality a channel classes, the determined capacity achieving input distributions, mentioned above, allow specific mapping (e.g., encoders) to be defined. These specific mappings adhere to the necessary and sufficient conditions for capacity achieving encoders.

Nonanticipative rate distortion functions (RDFs) of the present disclosure may achieve a zero-delay compression of information from a source. These nonanticipative RDFs may represent an optimal (e.g., capacity achieving) compression that is zero-delay. For example, the nonanticipative RDFs of the present disclosure may represent a scheme for compressing information that only depends on previously communicated symbols (e.g., is causal), not on all communicated symbols. The nonanticipative RDFs may also represent compression of both time-varying, or "nonstationary," and stationary sources of information.

Still further, methods for designing encoding schemes may utilize Joint Source Channel Coding (JSCC) to generate encoding schemes for simultaneous compression and channel coding operating with zero-delay or in real-time. As opposed to having codes for compression and codes for channel coding of compressed information, encoding schemes of the present disclosure may utilize a single encoding scheme, generated via JSCC design, that provides both compression and channel coding with zero-delay. JSCC methods to design such encoding scheme may utilize characterized capacities, necessary and sufficient conditions of information lossless encoders, and nonanticipative RDFs as discussed above.

A. System Overview

FIG. 1 is a block diagram of an example communication system 100 including at least some components that may be configured according to and/or utilize the methods discussed herein. In the example system 100, a source 102 generates a message (e.g., including any suitable information). An encoder 104 encodes the generated message, and the encoded message is transmitted as a signal over a channel 106. A decoder 108 decodes and the transmitted signal to produce an output.

The source 102 may include one or more stationary or mobile computing or communication devices, in an implementation. For example, the source 102 may include a laptop, desktop, tablet, or other suitable computer generating messages including digital data, such as digital data representing pictures, text, audio, videos, etc. In other examples, the source 102 may be a mobile phone, smartphone, land line phone, or other suitable phone generating messages including signals representative of audio or text messages to one or more other suitable phones or communication devices. Generally, the source 102 may include any number of devices or components of devices generating messages to be encoded by the encoder 104 and transmitted over the channel 106. Further details of an example computing device, which may be implemented as the source 102, are discussed with reference to FIG. 15.

In particular, the example source 102 generates messages including source symbols $x^n \triangleq \{x_0, x_1, \ldots, x_n\}$, $x_j \in X_j$, where $j=0, 1, \ldots, n$, according to a source distribution $P_{X^n}(dx^n)$. As discussed above, these symbols may represent any suitable information, such as photos, audio, video, etc. generated by or forwarded by the source 102.

The encoder 104 may include one or more devices, circuits, modules, engines, and/or routines communicatively and/or operatively coupled to the source 102. For example, the encoder 104 may be communicatively and/or operatively coupled to the source 102 via a bus of a computing device (e.g., a computing device implemented as the source 102), such as an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, or the Peripheral Component Interconnect Express (PCI-E) bus, or the encoder 104 may be communicatively and/or operatively coupled to the source 102 via one or more wires or cables, such as Ethernet cables, ribbon cables, coaxial cables, etc. In any event, the encoder 104 receives messages (e.g., source symbols $x^n$) from the source 102.

The example encoder 104 encodes the received symbols $x^n$ from the source 102 into channel input symbols $a^n \triangleq \{a_0, a_1, \ldots, a_n\}$, $a_j \in X_j$, where $j=0, 1, \ldots, n$. These channel input symbols have "induced" channel input distributions $\{P_{A_i|B^{i-1},A^{i-1}}(da_i|b^{i-1},a^{i-1}):i=1,2,\ldots,n\}$ if there is feedback or $\{P_{A_i|A^{i-1}}(da_i|a^{i-1}):i=1,2,\ldots,n\}$ if there is no feedback encoding. Further details of encoders and the encoding of the generated source symbols is discussed with reference to FIGS. 6, 7, and 8.

The channel 106 may include any number of wires, cables, wireless transceivers, etc., such as Ethernet cables, configured to facilitate a transmission of the encoded source symbols from the encoder 104 to the decoder 108. Further details of various types of channels that may be implemented as the channel 106 are discussed in section B.2. entitled "Characterizing Channels." The example channel 106 is noisy with memory defined by a sequence of conditional distributions, $\{P_{B_i|B^{i-1},A^i}(db_i|b^{i-1},a^i):i=1,2,\ldots,n\}$. The channel produces a channel output $b^n \triangleq \{b_0, b_1, \ldots, b_n\}$, $b_j \in B_j$, where $j=0, 1, \ldots, n$, which channel output is input to the decoder 108.

The decoder 108 may include one or more devices, modules, engines, and/or routines communicatively and/or operatively coupled to one or more computing devices, phones, etc. to receive decoded information transmitted over the channel 106. The decoder 108 receives the channel output, $B_j$, and decodes the channel output to produce the decoded output $Y_j$. The decoder 108 may or may not use past channel outputs and decoder outputs to produce $Y_j$. For example, when the source 102 is a originating phone, the decoder 108 may be communicatively and/or operatively coupled to terminating phone to decode audio signals sent from the originating phone to the terminating phone.

In some implementations, the source 102 and/or encoder 104 may know (e.g., receive transmissions indicative of and/or store information indicative of) all, or at least some outputs ($B_j$) from the channel 106, before generating, encoding, and/or transmitting a next signal. This functionality may be referred to herein as "feedback." In other words, a channel or communication system with feedback may be a system in which a source and/or encoder receive indications of, or otherwise "know," all or at least some previous outputs from the channel before sending a subsequent signal over the channel.

B. Characterization of Capacities and Identification of Capacity Achieving Channel Input Distributions and Capacity Achieving Encoders The methods described below allow the "finite block length" feedback capacity for channels, such as the channel 106, with memory and with and without transmission cost constraints on the encoders to be characterized, in some implementations. "Feedback capacity" may refer to a capacity of a channel with feedback, as discussed above, and "finite block length" may refer to a feedback capacity defined in terms of a finite number of transmissions or a finite time period such that the feedback capacity can be defined without taking a limit of infinite transmissions. In characterizing the finite block length feedback capacity, operators of communications systems may also identify the corresponding capacity achieving channel input distributions and the capacity achieving encoders. Operators may also utilize the characterization to determine whether feedback increases the finite block length capacity of channels without feedback, to characterize the finite block length capacity without feedback for general channels with memory and with or without transmission cost constraints on the encoders, and to identify the corresponding capacity achieving channel input distributions and capacity achieving encoders. By extension, the methods described below may allow a per unit time limiting version of the finite block length feedback capacity to determine the capacity and capacity achieving channel input distributions.

In some implementations, the characterization of the finite block length feedback capacity may facilitate the design of optimal encoding and decoding schemes that both reduce the complexity of communication systems and operate optimally. Operating optimally may include an optimal operation in terms of the overall number of processing elements (e.g., CPUs) required to process transmissions and/or the number of memory elements and steps required to encoder and decode messages. Such optimal encoding and decoding schemes may require small processing delays and short code lengths in comparison to encoding and decoding schemes designed based on an assumption of a channel without memory or based on a separate treatment of source codes and channel codes.

Architectures and methodologies discussed herein provide encoders and decoders based on channel characteristics, transmission cost requirements, and the characteristics of messages generated by a source (e.g., the source 102). Although, the characterizations, encoders, distributions, etc. discussed below are described, by way of example, with reference to the example communication system 100, which system 100 is a point-to-point communication system, characterizations, encoders, distributions, etc. may be applied to or implemented in systems other than point-to-point communication systems. For example, the characterizations, encoders, distributions, etc. of the present disclosure may be implemented in multi-user and network communication systems by repeating the procedures described below (for each user, for each node of a network, etc.).

B.1. Characterizing Channels

A determination and characterization of the capacity of a channel, such as the channel 106, may first include a characterization or description of the channel. The techniques of the present disclosure characterize a plurality of channel types with memory and with or without feedback allowing the capacity of these channels to be determined along with capacity achieving encoders and distributions, in some implementations. Generally, the characterization of a channel includes: (i) an "alphabet" defining the signals spaces (e.g., inputs and outputs) of a communication system; (ii) a "transmission cost function" defining a dependence of a rate of information transfer over the channel on the amount of energy or, more generally, any cost imposed on symbols transferred over the channel; and (iii) a model for the channel described by, for example, conditional distributions or stochastic discrete-time recursions in linear, nonlinear and state space form.

Channel input and output alphabets may, in some implementations, be complete separable metric spaces such as functions spaces of finite energy signals. These metric spaces may include, by way of example and without limitation, continuous alphabets, countable alphabets, and finite alphabets, such as real-valued $R^p$-dimensional and/or complex-valued $C^p$-dimensional alphabets for channel output alphabets and real-valued $R^p$-dimensional and/or complex-valued $C^q$-dimensional alphabets for channel input alphabets, finite energy or power signals, and bounded energy signals defined on metric spaces.

Transmission cost functions may include, by way of example, nonlinear functions of past and present channel inputs and past channel outputs or conditional distributions. The transmission cost functions define a cost of transmitting certain symbols over a channel, which cost is generally not the same for all symbols. For example, an energy, or other cost, required to transmit one symbol may differ from an energy required to transmit another symbol. Operators of a communication system may determine transmission cost functions, to utilize in the methods discussed below, by sending certain information (e.g., diagnostic or configuration information) over a channel and measuring an output of the channel.

Similarly, by sending certain information over a channel, operators of a communication system may determine a channel model. The channel model may model the behavior of the channel including a dependence (e.g., non-linear dependence) of transmission on past channel inputs, outputs and noise processes of memory. By way of example, the channel model may be a linear channel models with arbitrary memory, a Gaussian channel model, a state space model, or an arbitrary conditional distribution defined on countable, finite channel input and output alphabets, or continuous alphabet spaces. For waveform signals (e.g., continuous speech signals) transferred over a channel, the channel model may be a non-linear differential equation, and, for quantized signals (e.g., zeros and ones) transferred over a channel, the channel model may be a conditional distribution.

Models of channels with memory and feedback may include, by way of example, the following channel conditional distributions defining certain classes of channels:

Class A.

$$P_{B_i|B^{i-1},A^i}(db_i|b^{i-1},a^i) = P_{B_i|B^{i-1},A_i}(db_i|b^{i-1},a_i),$$
$$i=0,\ldots,n. \qquad 1.$$

$$P_{B_i|B^{i-1},A^i}(db_i|b^{i-1},a^i) = P_{B_i|B^{i-1},A_{i-L}^i}(db_i|b^{i-1},a_{i-L}^i),$$
$$i=0,\ldots,n. \qquad 2.$$

Class B.

$$P_{B_i|B^{i-1},A^i}(db_i|b^{i-1},a^i) = P_{B_i|B_{i-1},A_i}(db_i|b_{i-1},a_i),$$
$$i=0,\ldots,n. \qquad 1.$$

$$P_{B_i|B^{i-1},A^i}(db_i|b^{i-1},a^i) = P_{B_i|B_{i-M}^{i-1},A_i}(db_i|b_{i-M}^{i-1},a_i),$$
$$i=0,\ldots,n. \qquad 2.$$

$$P_{B_i|B^{i-1},A^i}(db_i|b^{i-1},a^i) = P_{B_i|B_{i-M}^{i-1},A_i}(db_i|b_{i-M}^{i-1},a_i),$$
$$i=0,\ldots,n. \qquad 3.$$

Class C.

$$P_{B_i|B^{i-1},A^i}(db_i|b^{i-1},a^i) = P_{B_i|B_{i-2}^{i-1},A_{i-1}^i}(db_i|b_{i-2}^{i-1},a_{i-1}^i),\ i=0,\ldots,n. \qquad 1.$$

$$P_{B_i|B^{i-1},A^i}(db_i|b^{i-1},a^i) = P_{B_i|B_{i-M}^{i-1},A_{i-L}^i}(db_i|b_{i-M}^{i-1},a_{i-L}^i),\ i=0,\ldots,n. \qquad 2.$$

where $\{L,M\}$ are nonnegative finite integers. The above example classes of channel conditional distributions may be induced by nonlinear channel models and linear time-varying Autoregressive models or by linear and nonlinear channel models expressed in state space form.

Classes of transmission cost functions may include, by way of example, the following:

Class A.

$$\gamma_i(T^n a^i, T^n b^{i-1}) = \gamma_i^{A.1}(a_i, b^{i-1}),\ i=0,\ldots n, \qquad 1.$$

$$\gamma_i(T^n a^i, T^n b^{i-1}) = \gamma_i^{A.2}(a_{i-N}^i, b^{i-1}),\ i=0,\ldots n, \qquad 2.$$

Class B.

$$\gamma_i(T^n a^i, T^n b^{i-1}) = \gamma_i^{B.1}(a_i, b_{i-1}),\ i=0,\ldots n, \qquad 1.$$

$$\gamma_i(T^n a^i, T^n b^{i-1}) = \gamma_i^{B.2}(a_i, b_{i-K}^{i-1}),\ i=0,\ldots n, \qquad 2.$$

$$\gamma_i(T^n a^i, T^n b^{i-1}) = \gamma_i^{B.3}(a^i, b_{i-K}^{i-1}),\ i=0,\ldots n, \qquad 3.$$

Class C.

$$\gamma_i(T^n a^i, T^n b^{i-1}) = \gamma_i^{C.1}(a_{i-1}^i, b_{i-2}^{i-1}),\ i=0,\ldots n, \qquad 1.$$

$$\gamma_i(T^n a^i, T^n b^{i-1}) = \gamma_i^{C.2}(a_{i-1}^i, b_{i-K}^{i-1}),\ i=0,\ldots n, \qquad 2.$$

where $\{N,K\}$ are nonnegative finite integers.

If M=0 in the above example classes of channels and transmission cost functions, then $$P_{B_i|B_{i-M}^{i-1},\bar{A}^i}(db_i|b_{i-M}^{i-1},\bar{a}^i)|_{M=0} = P_{B_i|\bar{A}^i}(db_i|\bar{a}^i)\text{ for }$$
$$\bar{A}^i \in \{A^i, A_{i-L}^i\}, i=0,1,\ldots,n.$$

Hence, for M=L=0, $$P_{B_i|_{i-M}^{j-1},A_{i-L}^i}(db_i|b_{i-M}^{i-1},a_{i-L}^i)|_{M=L=0} = P_{B_i|A_i}(db_i|a_i),$$
$$i=0,1,\ldots,n$$

is a memoryless channel. Similarly, if K=0 then $$\gamma_i^{C,2}(a_{i-N}^i, b_{i-K}^{i-1})|_{K=0} \equiv \gamma_i^{C,2}(a_{i-N}^i), i=0,\ldots,n.$$

B.2. Capacity Without Feedback

For further clarification, various notations and expressions related to capacities without feedback are presented below. The problem of the capacity of channels with memory and without feedback includes a maximization of mutual information between channel input and output sequences over an admissible set of channel input distributions. The mutual information may be:

$$I(A^n; B^n) \triangleq E_{A^n,B^n}\left\{\log\left(\frac{dP_{A^n,B^n}(\cdot,\cdot)}{d(P_{A^n}(\cdot) \times P_{B^n}(\cdot))}(A^n, B^n)\right)\right\}.$$

The admissible set of channel input distributions may be:

$$\mathscr{P}_{[0,n]}^{noFB} \triangleq \{P_{A_i|A^{i-1}}(da_i|a^{i-1}):i=0,1,\ldots,n\}$$

and the maximization of mutual information may be expressed as:

$$C_{A^\infty;B^\infty}^{noFB} \triangleq \limsup_{n\to\infty} \frac{1}{n+1} C_{A^n;B^n}^{noFB}, \quad C_{A^n;B^n}^{noFB} = \sup_{\mathscr{P}_{[0,n]}^{noFB}} I(A^n; B^n)$$

where $P_{A^n,B^n}(da^n, db^n) = P_{B^n|A^n}(db^n|a^n) \otimes P_{A^n}(da^n)$ is referred to herein as "the joint distribution," $P_{B^n}(db^n) = \int_{A^n} P_{B^n|A^n}(db^n|a^n) \otimes P_{A^n}(da^n)$ is referred to herein as "the channel output distribution," $P_{B^n|A^n}(db^n,a^n) = \otimes_{i=0}^n P_{B_i|B^{i-1},A^i}(db_i|b^{i-1},a^i)$-a.a.$(a^n,b^n)$ is referred to herein as "the channel distribution because the encoder does not utilize feedback, and $E_{A^n,B^n}\{\bullet\}$ denotes the expectation over the joint distribution of $\{A^n,B^n\}$.

Further, the extremum problems of capacity of channels with memory without feedback, when transmission cost is imposed on channel input distributions may be written, by way of example, as:

$$C_{A^\infty;B^\infty}^{noFB}(\kappa) \triangleq \limsup_{n\to\infty} \frac{1}{n+1} C_{A^n;B^n}^{noFB}, \quad C_{A^n;B^n}^{noFB}(\kappa) = \sup_{\mathscr{P}_{[0,n]}^{noFB}(\kappa)} I(A^n; B^n)$$

where $$\mathscr{P}_{[0,n]}^{noFB}(\kappa) \triangleq \left\{P_{A_i|A^{i-1}}(da_i|a^{i-1}), i=0,\ldots,\right.$$
$$\left.n: \frac{1}{n+1} E\left\{\sum_{i=0}^n \gamma_i(T^nA^i, T^nB^{i-1})\right\} \le \kappa\right\}, \kappa \in [0, \infty)$$

and $$T^n a^i \subseteq \{a_0, a_1, \ldots, a_i\}, T^n b^{i-1} \subseteq \{b_0, b_1, \ldots, b_{i-1}\}, i = 0, 1, \ldots, n$$

In this notation, $C_{A^n;B^n}^{noFB}$ is referred to herein as the finite block length capacity without feedback, $C_{A^\infty;B^\infty}^{noFB}$ is referred to herein as the capacity without feedback, $C_{A^n;B^n}^{noFB}(\kappa)$ is referred to herein as the finite block length capacity without feedback with transmission cost, and $C_{A^\infty;B^\infty}^{noFB}(\kappa)$ is referred to herein as the capacity without feedback with transmission cost.

B.3. Capacity with Feedback

For still further clarification, various notations and expressions related to capacities with feedback are presented below.

The problem of the capacity of channels with memory and with feedback includes a maximization of directed information from channel input and output sequences over an admissible set of channel input distributions. The directed information may be written as:

$$I(A^n \to B^n) \triangleq$$
$$\sum_{i=0}^n I(A^i; B_i | B^{i-1}) = \sum_{i=0}^n E_{A^i,B^i}\left\{\log\left(\frac{dP_{B_i|B^{i-1},A^i}(\cdot | B^{i-1}, A^i)}{dP_{B_i|B^{i-1}}(\cdot | B^{i-1})}(B_i)\right)\right\},$$

and the admissible set of channel input distributions may be expressed as:

$$\mathscr{P}_{[0,n]} \triangleq \{P_{A_i|A^{i-1},B^{i-1}}(da_i|a^{i-1},b^{i-1}):i=0,1,\ldots,n\}$$

The maximization of directed information may be expressed as:

$$C_{A^\infty \to B^\infty}^{FB} \triangleq \limsup_{n\to\infty} \frac{1}{n+1} C_{A^n \to B^n}^{FB}, \quad C_{A^n \to B^n}^{FB} \triangleq \sup_{\mathscr{P}_{[0,n]}} I(A^n \to B^n)$$

For each $i=0, 1, \ldots, n$, $\{P_{A^iB^i}(da^i,db^i), P_{B_i|B^{i-1}}(db_i|b^{i-1})\}$ are referred to herein as the joint and conditional distributions induced by the channel and the channel input distributions, and $E_{A^i,B^i}\{\bullet\}$ denotes the expectation over the joint distribution of $\{A^i,B^i\}$.

Further, the extremum problems of capacity of channels with memory and with feedback, when transmission cost is imposed on channel input distributions may be written, by way of example, as:

$$C_{A^\infty \to B^\infty}^{FB}(\kappa) \triangleq \limsup_{n\to\infty} \frac{1}{n+1} C_{A^n \to B^n}^{FB}(\kappa), \quad C_{A^n \to B^n}^{FB} \triangleq \sup_{\mathscr{P}_{[0,n]}(\kappa)} I(A^n \to B^n)$$

where $$\mathscr{P}_{[0,n]}(\kappa) \triangleq$$
$$\left\{P_{A_i|A^{i-1},B^{i-1}}, i=1,\ldots,n: \frac{1}{n+1} E\left\{\sum_{i=0}^n \gamma_i(T^nA^i, T^nB^{i-1})\right\} \le \kappa\right\}.$$

In this notation, $C_{A^n \to B^n}^{FB}$ is referred to herein as the finite block length feedback capacity, $C_{A^\infty \to B^\infty}^{FB}$ is referred to herein as the feedback capacity, $C_{A^n \to B^n}^{FB}(\kappa)$ is referred to herein as the finite block length feedback capacity with transmission cost, and $C_{A^\infty \to B^\infty}^{FB}(\kappa)$ is referred to herein as the feedback capacity with transmission cost.

Figure 2:
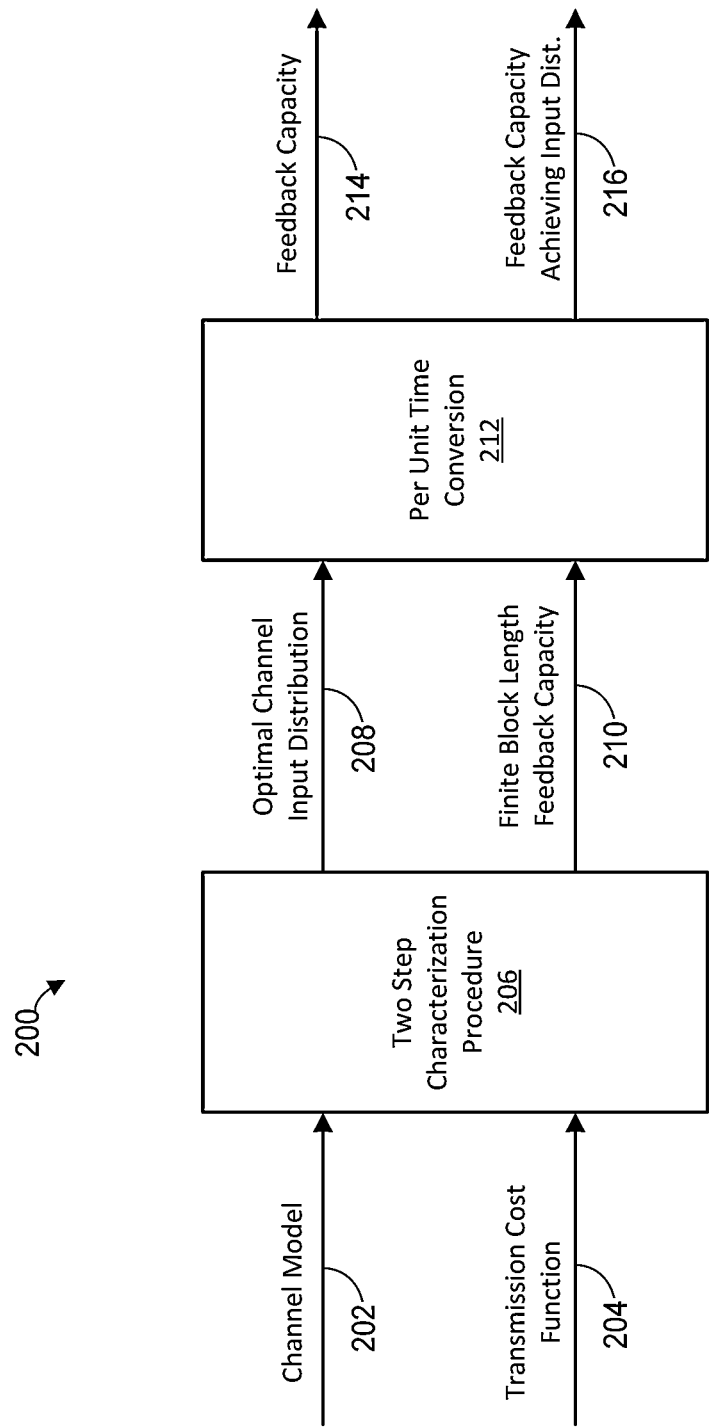
FIG. 2 illustrates an example process to characterize a capacity of a channel, such as the channel illustrated in FIG. 1.

B.4. Characterization of Capacities and Identification of Optimal Channel Input Distributions Overview FIG. 2 illustrates an example process 200 for characterizing capacities and identifying optimal channel input distributions. The capacities characterized via the process 200 may include finite block length feedback capacities, feedback capacities, finite block length feedback capacities with transmission cost, feedback capacities with transmission cost, finite block length capacities without feedback, capacities without feedback, finite block length capacities without feedback and with transmission cost, and capacities without feedback and with transmission cost. These types of capacities are further described in sections B.2. and B.3. entitled "Capacity Without Feedback" and "Capacity With Feedback," respectively. A computing device, such as the computing device illustrated in detail in FIG. 15, may be specially and/or specifically configured (e.g., by one or more algorithms, routines, modules, or engines) to implement at least a portion of the process 200. Further, components of the example communication system 100, such as the encoder 104, may be configured according to the output of the process 200.

In the process 200, a channel model 202 and a transmission cost function 204 are input into a two-step characterization procedure 206. The channel model 202 and transmission cost function 204 may describe one of the plurality of channel classes and transmission cost function classes discussed in section B.1. entitled "Characterizing Channels." In particular, the channel model 202 may describe the noise of a channel and dependencies amongst channel inputs and channel output via one or more conditional distributions and/or one or more non-linear differential equations. The transmission cost function 204 may define a cost of sending each of a plurality of symbols (e.g., defined in an alphabet) over the channel described by the channel model 202.

The two-step characterization procedure 206 may, based on the channel model 202 and a transmission cost function 204 produce an optimal channel input distribution 208 and a finite block length feedback capacity 210, in the scenario illustrated in FIG. 2. Although the finite block length feedback capacity 210 is illustrated in FIG. 2, the two-step characterization procedure may characterize other capacities, such as $C_{A^n \to B^n}^{FB}(\kappa)$, $C_{A^\infty \to B^\infty}^{FB}(\kappa)$, $C_{A^n;B^n}^{noFB}$, or $C_{A^n;B^n}^{noFB}(\kappa)$ depending on the class of channel described by the channel model 202 and the class of the transmission cost function 204. Further details of an implementation of the two-step characterization procedure 206 are discussed with reference to FIGS. 3, 4, and 5. Generally, a first step of the two-step characterization procedure 206 may include utilizing stochastic optimal control to identify subset of channel input distributions, and a second step of the two-step characterization procedure 206 include utilize a variational equality to further narrow the subsets of channel input distributions to the optimal channel input distribution 208.

In some implementations, the process 200 also includes a per unit time conversion 212 of the optimal channel input distribution 208 and the finite block length feedback capacity 210. This per unit time conversion 212 converts the finite block length feedback capacity 210 to a feedback capacity 213, which feedback capacity 214 describes the capacity of the channel as a number of transmissions approaches infinity. The per unit time conversion 212 additionally generates a feedback capacity achieving input distribution 216 corresponding to the feedback capacity 214. Although the feedback capacity 214 is illustrated in FIG. 2, the per unit time conversion 212 may generate other capacities, such as $C_{A^\infty \to B^\infty}^{FB}(\kappa)$, $C_{A^\infty;B^\infty}^{noFB}$, or $C_{A^\infty;B^\infty}^{noFB}(\kappa)$, depending on the class of channel described by the channel model 202 and the class of the transmission cost function 204. Further details of implementations of the per unit time conversion 212 are discussed below.

B.5. Two-Step Procedure for Characterizing Capacity and Identifying Optimal Input Distributions As discussed with reference to FIG. 2, the two-step characterization procedure 206 may, based on a channel model and a transmission cost function, produce the optimal channel input distribution 208 and a specific characterization of (e.g., a formula of) a capacity, such as the finite block length feedback capacity 210. In an implementation, step one of the two-step characterization procedure 206 utilizes techniques from stochastic optimal control with relaxed or randomized strategies (e.g., conditional distributions), and step two of the two-step characterization procedure 206 may utilizes a variational equality of directed information, as described further below.

Given a specific channel distribution and a specific transmission cost function from the classes described in section B.1. entitled "Characterizing Channels," step one of the two-step characterization procedure 206 may include applying stochastic optimal control to show a certain joint process which generates the information structure of the channel input distribution at each time is an extended Markov process. For an example, for the channel input distribution (at every time) describing a channel with memory:

$$P_{A_i|A^{i-1},B^{i-1}}(da_i|a^{i-1},b^{i-1})$$

the joint process $$\mathscr{P}_i \subseteq \{a^{i-1},b^{i-1}\}, \text{ for } i=0,1,\ldots,n,$$

is an extended Markov process, with respect to a smaller information structure $$\mathscr{\tilde{P}}_i \subseteq \{a^{i-1},b^{i-1}\},$$

for i=0, 1, . . . , n. Based on this joint process, the optimal channel input distribution corresponding to $C_{A^n \to B^n}^{FB}$ and $C_{A^n \to B^n}^{FB}(\kappa)$ is included in specific subsets of input distributions:

$$\overline{\mathscr{P}}_{[0,n]} \subseteq \{P_i(da_i|a^{i-1},b^{i-1}): i=0,\ldots,n\} \in \mathscr{P}_{[0,n]}$$
$$\text{and } \overline{\mathscr{P}}_{[0,n]}(\kappa) \subset \mathscr{P}_{[0,n]}(\kappa).$$

Thus, step one of the two-step characterization procedure 206 narrows all possible channel input distributions to specific subsets of input distributions, where the subsets of input distributions include the optimal channel input distribution.

Further, in some implementations of the step one of the two-step characterization procedure 206, the first step may include a characterization of capacity (e.g., finite block length feedback capacity) corresponding to the determined subsets of input distributions. In particular, step one of the two-step characterization procedure 206 may include generating a formula or other expression representing a capacity corresponding to the determined subsets of input distributions. For the channel input distribution describing a channel with memory (discussed above), the formulas for finite block length feedback capacity and feedback capacity with and without transmission cost are:

$$\overline{C}_{A^\infty \to B^\infty}^{FB} = \limsup_{n \to \infty} \frac{1}{n+1} \overline{C}_{A^n \to B^n}^{FB}, \overline{C}_{A^n \to B^n}^{FB} \triangleq \sup_{\mathscr{P}_{n,i}} I(A^n \to B^n)$$

$$\overline{C}_{A^\infty \to B^\infty}^{FB}(\kappa) = \limsup_{n \to \infty} \frac{1}{n+1} \overline{C}_{A^n \to B^n}^{FB}(\kappa), \overline{C}_{A^n \to B^n}^{FB}(\kappa) \triangleq \sup_{\mathscr{P}_{n,i}(\kappa)} I(A^n \to B^n)$$

where $I(A^n \to B^n) = I(\overline{\pi},P)$ is a specific functional of the channel input distribution $\overline{\pi} \in \overline{\mathscr{P}}_{[0,n]}$ and the channel conditional distribution P∈{Class A, Class B, Class C} as described in section B.1. entitled "Characterizing Channels."

Step two of the two-step characterization procedure 206 includes applying a variational equality of directed information to the subsets of input distributions determined in step one. In this manner, step two of the two-step characterization procedure 206 further narrows the determined subsets of input distributions, in some implementations. In particular, for the example above involving a channel with memory, an upper bound is achievable over the determined subsets of input distributions is expressed as:

$$\overline{\overline{\mathscr{P}}}_{[0,n]} \subset \overline{\mathscr{P}}_{[0,n]} \text{ and } \overline{\overline{\mathscr{P}}}_{[0,n]}(\kappa) \subset \overline{\mathscr{P}}_{[0,n]}(\kappa).$$

Based on such an upper bound or further narrowing of input distributions, step two may further include determining a refined capacity based on the narrowed input distributions. For the example above of a channel with memory, the characterization of finite block length feedback capacity and feedback capacity with and without transmission cost, obtained from step two is:

$$C_{A^\infty \to B^\infty}^{\circ FB} = \limsup_{n \to \infty} \frac{1}{n+1} C_{A^n \to B^n}^{\circ FB}, \; C_{A^n \to B^n}^{\circ FB} \triangleq \sup_{\pi \in \mathcal{P}_{[0,n]}} I(A^n \to B^n)$$

$$C_{A^\infty \to B^\infty}^{\circ FB}(\kappa) = \limsup_{n \to \infty} \frac{1}{n+1} C_{A^n \to B^n}^{\circ FB}(\kappa), \; C_{A^n \to B^n}^{\circ FB}(\kappa) \triangleq \sup_{\pi \in \mathcal{P}_{[0,n]}(\kappa)} I(A^n \to B^n)$$

where $I(A^n \to B^n) = I(\dot\pi, P)$ is a specific functional of the channel input distribution $\dot\pi \in \mathcal{P}_{[0,n]}$ and the channel conditional distribution $P \in \{\text{Class A, Class B, Class C}\}$ as described in section B.1. entitled "Characterizing Channels."

Figure 3:
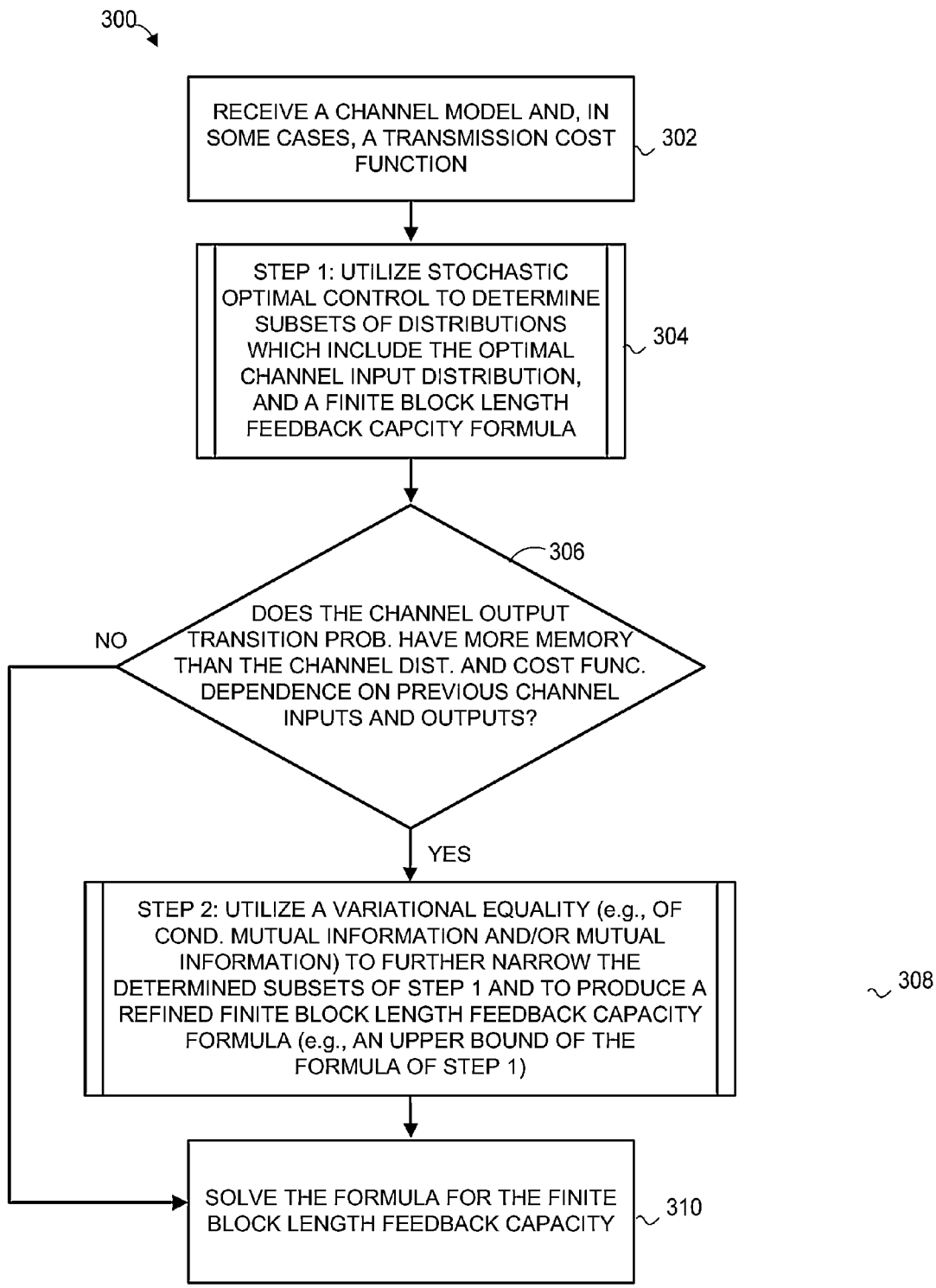
FIG. 3 is a flow diagram of an example method for characterizing a capacity and optimal channel input distribution with a two-step procedure.

FIG. 3 is a flow diagram of an example method 300 for characterizing a capacity and optimal channel input distribution with a two-step procedure, such as the two-step procedure 206. A computing device, such as the computing device illustrated in detail in FIG. 15, may be specially and/or specifically configured to implement at least a portion of the method 300. Further, in some implementations, a suitable combination of a computing device and an operator of a communication system, such as the communication system 100, may implement the method 300.

In the method 300, a computing device or operator receives a channel model and transmission cost function (block 302). The received channel model may include a channel conditional distribution, such as one of the channel conditional distributions P∈{Class A, Class B, Class C} as described in section B.1. entitled "Characterizing Channels," or the channel model may include other types of functions, such as non-linear differential equations, for channels transmitting continuous signals (e.g., speech signals). Also, the transmission cost function may include one of the transmission cost functions as described in section B.1. entitled "Characterizing Channels."

The computing device and/or operator then applies step one of a two-step procedure (block 304). In step one, the computing device and/or operator utilizes stochastic optimal control to determine subsets of input distributions and a corresponding capacity formula based on the received channel model and transmission cost function. The determine subsets of input distributions may include the optimal channel input distributions. That is the determined subsets of input distributions may include the channel input distribution that achieves the corresponding capacity of the channel. Further details of step one of the two-step procedure are discussed with reference to FIG. 4.

For certain channel models and transmission cost functions, step one may be sufficient to identify the information structures of channel input distributions and characterize a capacity (e.g., the finite block length feedback capacity and the feedback capacity with and without transmission cost) of the channel. In other cases, step one may only be an intermediate step before step two of the two-step procedure. More specifically, step one may be sufficient for channel conditional distributions which only depend on all previous channel outputs and costs (e.g., not a current and/or previous channel input). As such, the method 300 includes determining if the channel, described by the received channel model, is dependent on more than the previous channel outputs and costs (block 306). If the channel is only dependent on all previous channel outputs and costs, the flow continues to block 310. If the channel is dependent on more than the previous channel outputs and costs (e.g., channel inputs), the flow continues to block 308.

At block 308, the computing device and/or operator applies step two of the two-step procedure. In step two, the computing device and/or operator utilizes a variational equality to further narrow the subsets of input distributions determined at block 304. Further, the computing device and/or operator determines a refined capacity formula, such as a finite block length feedback capacity, based on the further narrowed subsets of input distributions. In some implementations, the further narrowing of the input distributions based on the variational equality includes identifying a single optimal channel input distribution, and, in other implementations, the further narrowing of the input distributions based on the variational equality includes identifying a smaller subset of channel input distribution including fewer distributions than the subsets determined at block 304.

The computing device and/or operator solves the capacity formula (determined at block 304) and/or refined capacity formula (determined at block 308) to determine the capacity of the channel (block 310). The capacity formulas solved at block 308 may include maximizations or other extremum problems, as further discussed above. The computing device and/or operator may utilize various techniques to solve these maximizations or extremum problems including, by way of example and without limitation, dynamic programming and/or stochastic calculus of variations (e.g., the stochastic maximum principle).

Figure 4:
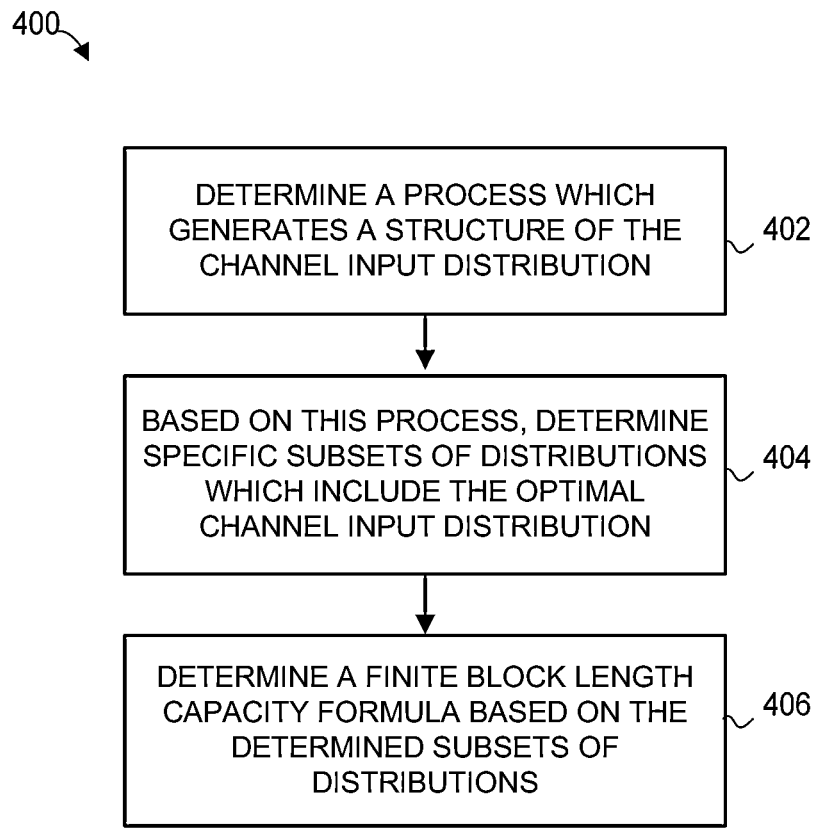
FIG. 4 is a flow diagram of an example method for determining subsets of channel input distributions and a corresponding capacity based on step one of a two-step procedure, such as the two step procedure utilized in the method of FIG. 3.

FIG. 4 is a flow diagram of an example method 400 for determining subsets of channel input distributions and a corresponding capacity based on step one of the two-step procedure (discussed with reference to FIG. 3). A computing device, such as the computing device illustrated in detail in FIG. 15, may be specially and/or specifically configured to implement at least a portion of the method 400. Further, in some implementations, a suitable combination of a computing device and an operator of a communication system, such as the communication system 100, may implement the method 400.

In the method 400, a computing device and/or operator determines, for a specific channel described by a channel model, a process which generates a structure of the channel input distribution (block 402). The computing device and/or operator may utilize techniques from stochastic optimal control to optimize a "pay-off" (e.g., a finite block length capacity of the specific channel) over all possible processes (e.g., distributions). As discussed above for an example channel with memory, the determination of the process may include demonstrating that a certain joint process which generates the information structure of the channel input distribution at each time is an extended Markov process.

The computing device and/or operator may then determine a smaller set of processes (e.g., distributions) optimizing the capacity (block 404). This smaller set of distributions or processes includes the optimal distribution or process that achieves the finite block length capacity, or "pay-off." For example, the smaller set of distributions may include only some of a complete set of possible channel input distributions, where the smaller set, or subset, includes the optimal channel input distribution.

The computing device and/or operator also determines a capacity formula based on the determined subset of process or distributions (block 406). As discussed further in sections B.2. and B.3. entitled "Capacity Without Feedback" and "Capacity With Feedback," respectively, formulas for capacities may be expressed in terms of channel input distributions. Thus, upon determining subsets of channel input distributions at block 404, the computing device and/or operator may generate a formula for capacity, for the specific channel, based on the subsets of channel input distributions.

Figure 5:
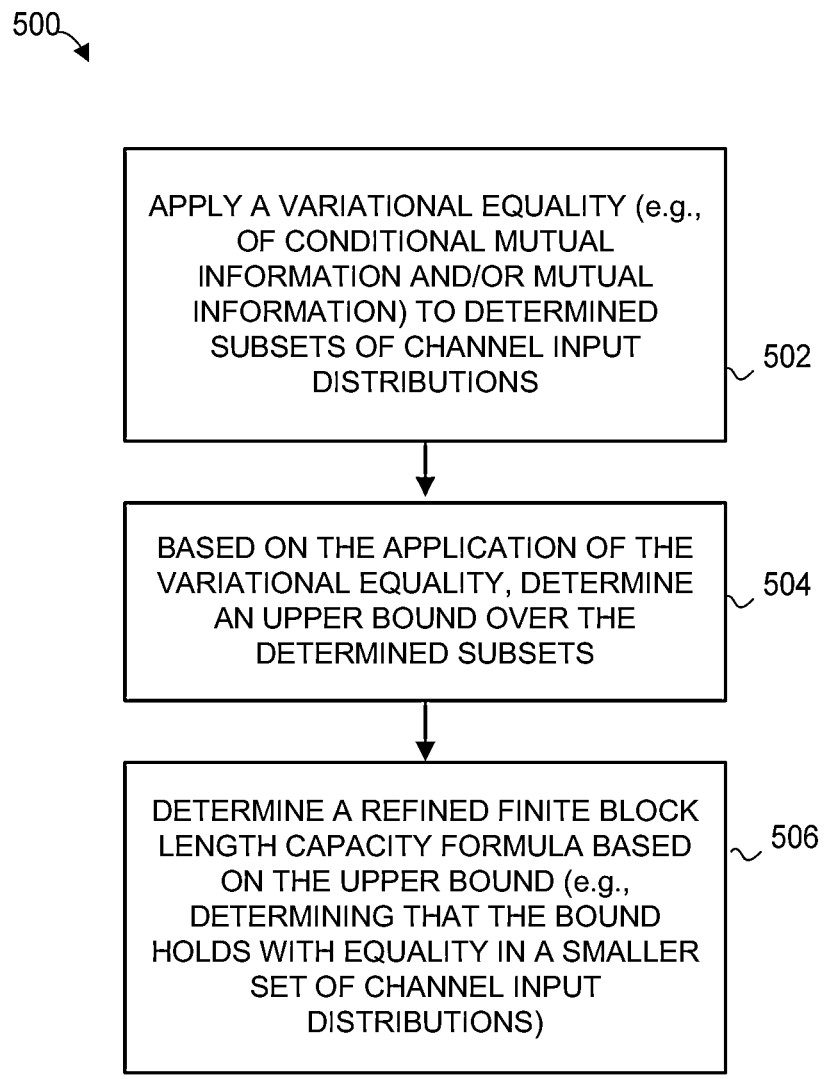
FIG. 5 is a flow diagram of an example method for narrowing subsets of channel input distributions and determining a corresponding refined capacity based on step two of a two-step procedure, such as the two step procedure utilized in the method of FIG. 3.

FIG. 5 is a flow diagram of an example method 400 for narrowing subsets of channel input distributions and determining a corresponding refined capacity based on step two of the two-step procedure (discussed with reference to FIG. 3). A computing device, such as the computing device illustrated in detail in FIG. 15, may be specially and/or specifically configured to implement at least a portion of the method 500. Further, in some implementations, a suitable combination of a computing device and an operator of a communication system, such as the communication system 100, may implement the method 500.

In the method 500, a computing device and/or operator applies a variational equality to subsets of input distributions (block 502). For example, the computing device and/or operator may apply the variational equality of directed information further described in C. D. Charalambous et al., "Directed information on abstract spaces: Properties and variational equalities," http://arxiv.org/abs/1302.3971, submitted Feb. 16, 2013. Such an application of a variation equality may generate an upper bound over the subsets of input distributions (block 504). That is, the application of the variational equality further narrows subsets of input distributions (e.g., determined according to the example method 400) based on techniques specific to information theory (e.g., directed information). The computing device and/or operator also determines a refined capacity formula based on the further narrowed subsets of input distributions (block 506).

B.6. Example Characterizations of Capacities and Identification of Channel Input Distributions for Channels in Class A By way of example, example finite block length feedback capacity formulas and input distributions, for example classes of channels, determined according the two-step procedure (described with reference to FIGS. 2, 3, 4, and 5) are presented below. The corresponding feedback capacities with and without transmission cost are limiting versions of the finite block length feedback capacities presented below.

B.6.1. Class A.1.

For an example channel condition distribution, $$\{P_{B_i|B^{i-1},A_i}(db_i|b^{i-1},a_i): i=0,1,\ldots,n\}$$

the optimal channel input distribution $C_{A^n;B^n}^{noFB}$ is included in the subset:

$$\overline{\mathscr{P}}_{[0,n]}^{A.1} \triangleq \{P_{A_i|B^{i-1}}(da_i|b^{i-1}): i=0,\ldots,n\} \subset \mathscr{P}_{[0,n]}.$$

As such, for each i=0, 1, n, the information structures of the maximizing channel input distribution (according to the example two-step procedure described in section B.5. entitled "Two-Step Procedure for Characterizing Capacity and Identifying Optimal Input Distributions") is:

$$\mathscr{P}_i^P \triangleq \{b^{i-1}\} \subset \{a^{i-1}, b^{i-1}\}.$$

The characterization of the finite block length feedback capacity is then $$C_{A^n \to B^n}^{FB,A.1} \triangleq \sup \sum_{i=0}^n \int \log\left(\frac{dP_{B_i|B^{i-1},A_i}(\cdot|b^{i-1},a_i)}{dP_{B_i|B^{i-1}}(\cdot|b^{i-1})}(b_i)\right) P_{B^i,A_i}(db^i, da_i) =$$

$$\sup \sum_{i=0}^n I(A_i; B_i | B^{i-1})$$

where $$P_{B^i,A_i}(db^i, da_i) = P_{B_i|B^{i-1},A_i}(db_i|b^{i-1}, a_i) \otimes$$
$$P_{A_i|B^{i-1}}(da_i|b^{i-1}) \otimes P_{B^{i-1}}(db^{i-1}), i = 0, 1, \ldots, n.$$

and $$P_{B_i|B^{i-1}}(db_i|b^{i-1}) = \int P_{B_i|B^{i-1},A_i}(db_i|b^{i-1}, a_i) \otimes P_{A_i|B^{i-1}}(da_i|b^{i-1}),$$
$$i = 0, \ldots, 1, n.$$

If a transmission cost, such as $$\gamma_i^{A.1}(a_i, b^{i-1}), \gamma_i^{B.1}(a_i, b_{i-1}), \gamma_i^{B.2}(a_i, b_{i-K}^{i-1}),$$
$$i=0,1,\ldots,n$$

is imposed, then the example characterization of the finite block length feedback capacity is:

$$C_{A^n \to B^n}^{FB,A.1}(\kappa) = \sup \sum_{i=0}^n I(A_i; B_i | B^{i-1}).$$

B.6.1.1. Example Non-Linear and Linear Channel Models

Channel distribution of example class A.1 (as defined in section B.1. entitled "Characterizing Channels") may include one or both of distributions defined on finite and countable alphabet space and distributions defined on continuous alphabet spaces, which distributions may be induced by the models described below.

Let $$\mathbb{A}_i \triangleq \mathbb{R}^q, \mathbb{B}_i \triangleq \mathbb{R}^p, \mathbb{V}_i \triangleq \mathbb{R}^r, h_i: \mathbb{B}^{i-1} \times \mathbb{A}_i \times \mathbb{V}_i \mapsto \mathbb{B}_i, i = 0, 1, \ldots, n$$

where $\{h_i(\bullet,\bullet,\bullet): i=0, 1, \ldots\}$ are measurable functions, and $\{V_i: i=0, 1, \ldots\}$ is a random channel noise process with joint distribution:

$$P_{V^n}(dv^n) \text{ on } \mathscr{B}(\mathbb{V}^n).$$

A recursive expression as follows may define an example nonlinear channel model, for a channel in the example class A.1, with a continuous alphabet:

$$B_i = h_i(B^{i-1}, A_i, V_i), i=0, \ldots, n$$

where transmission in the example model begins at time i=0, and the initial data $$B^{-1} \triangleq b_{-\infty}^{-1}, A_0 \triangleq a_0, V_{-1} \triangleq v_{-1}$$

are specified according to the covention utilized in the model. For example, this data may be taken to be the null set of data or any available data prior to transmission time $i \in \{-\infty, \ldots, -2, -1\}$.

If the channel noise process $\{V_i: i=0, 1, \ldots\}$ is an independent sequence (e.g., non-necessarily stationary), then the above recursive expression for the example nonlinear channel model may be utilized in step one of the two-step process with the channel probability distribution $$\mathbb{P}\{B_i \in A | B^{i-1} = b^{i-1}, A^i = a^i\} = \mathbb{P}\{V_i: b_i(b^{i-1}, a_i, V_i) \in A\}, \Gamma \in \mathscr{B}(\mathbb{B}_i)$$

$$= Q_i(\Gamma | b^{i-1}, a_i), i = 0, 1, \ldots, n.$$

Another recursive expression as follows may define an example linear channel model, for a channel in the example class A.1:

$$B_i = -\sum_{j=0}^{i-1} C_{i,j} B_j + D_{i,i} A_i + V_i, \ i = 0, \ldots, n$$

where, for each i=0, 1, ... n, the coefficients $\{C_{i,j}, D_{i,i}: i=0, 1, \ldots n, j=0, 1, \ldots, i-1\}$ are real-valued matrices with dimensions p by p and p by q, respectively (e.g., with $\{p,q\}$ being positive integers).

With such a linear model, the channel input distribution is obtained from $$\mathbb{P}\{B_i \in A \mid B^{i-1} = b^{i-1}, A^i = a^i\} = \mathbb{P}\{V_i : h_i(b^{i-1}, a_i, V_i) \in A\}, \Gamma \in \mathcal{B}(\mathbb{B}_i)$$
$$= Q_i(\Gamma \mid b^{i-1}, a_i), \ i = 0, 1, \ldots, n.$$

and the finite block length feedback capacity is characterized using step one of the two-step procedure, as further described in section B.5. entitled "Two-Step Procedure for Characterizing Capacity and Identifying Optimal Input Distributions."

B.6.1.2. Example MIMO, ANonGN, and AGN Channel Models

Another example linear channel model, defined by linear dynamics, is:

$$B_i = -C_{i,j-1} B_{i-1} + D_{i,i} A_i + V_i, \ i = 0, \ldots, n, \ \frac{1}{n+1} \sum_{i=0}^{n} E\{\gamma^{B.1}(A_i, B_{i-1})\} \le \kappa$$

An example channel noise is non-Gaussian, independent:

$$P_{V^n}(dv^n) = \Pi_{i=0}^{n} P_{V_i}(dv_i),$$

with a zero mean and covariance matrix:

$$\mu_{V_i} \triangleq E(V_i) = 0, K_{V_i} \triangleq E(V_i V_i^T), \ i = 0, 1, \ldots, n,$$

and an average transmission cost $$\frac{1}{n+1} E\{|A_i|_{\Sigma_i}^2\} \le \kappa$$

B.6.1.2.1. Example MIMO, ANonGN Channel with Memory

For an example channel model as described above with memory, a channel input distribution is given by:

$$\mathbb{P}\{B_i \le b_i \mid B^{i-1} = b^{i-1}, A^i = a^i\} = \mathbb{P}\{V_i \le b_i + \Sigma_{j=0}^{i-1} C_{i,j} b_j - D_{i,j} a_i\}, \ i=0,1,\ldots,n.$$

and a characterization, according to step one of the two-step procedure, of the finite block length feedback capacity, with transmission cost, is given by:

$$C_{A^n \to B^n}^{FB,ANonGN-A.1}(\kappa) = \sup_{\{\pi_i(da_i \mid b^{i-1}), i=0,\ldots,n: \ \frac{1}{n+1} \Sigma_{i=0}^n E|A_i|_{\Sigma_i}^2 \le \kappa\}} \left\{ \sum_{i=0}^{n} H(B_i \mid B^{i-1}) \right\} - H(V^n)$$

with $$\mathbb{P}\{B_i \le b_i \mid B^{i-1} = b^{i-1}\} =$$
$$\int_{b_i} \mathbb{P}\left\{V_i \le b_i + \sum_{j=0}^{i-1} C_{i,j} b_j - D_{i,i} a_i\right\} \pi_i(da_i \mid b^{i-1}), \ i = 0, 1, \ldots, n.$$

The information structure of the example channel input distribution $$\{\pi_i(da_i \mid b^{i-1}) = P_{A_i \mid B^{i-1}}(a_i \mid b^{i-1}): i=0,1,\ldots\}$$

implies that a measurable function:

$$e_i : \mathbb{B}^{i-1} \times \mathbb{U}_i \to \mathbb{A}_i, \ \mathbb{U}_i \triangleq \mathbb{R}^p, \ a_i = e_i(b^{i-1}, u_i), \ i = 0, 1, \ldots n,$$

exists, where $\{U_i : i=0, 1, \ldots n\}$ is a p-dimensional random process with distribution $\{P_{U_i}(du_i): i=0, 1, \ldots n\}$ such that $$\mathbb{P}\{U_i : e_i(b^{i-1}, U^i) \in da_i\} = P_{A_i \mid B^{i-1}}(da_i \mid b^{i-1}),$$
$$i=0,1,\ldots,n.$$

Further, according to the definition of the linear channel model, $B_i$, $$A_i = e_i(B^{i-1}, U_i), \ i = 0, 1, \ldots, n,$$

$$B_i = -\sum_{j=0}^{i-1} C_{i,j} B_j + D_{i,i} e_i(B^{i-1}, U_i) + V_i, \ i = 0, 1, \ldots, n,$$

$$\frac{1}{n+1} \sum_{i=0}^{n} E|e_i(B^{i-1}, U_i)|_{\Sigma_i}^2 \le \kappa.$$

define a class of example admissible functions:

$$\mathcal{E}_{0,n}^{ANonGN-A.1-IL}(\mathcal{K}) \triangleq \{e_i(b^{i-1}, u_i), i=0,\ldots,n: \text{ for a fixed } b^{i-1} \text{ the function } e_i(b^{i-1}, \cdot)$$

is one-to-one and onto $\mathbb{A}$ for i=0, ..., n, $$\frac{1}{n+1} \Sigma_{i=0}^{n} E \left| e_i(B^{i-1}, U_i) \right|_{\Sigma_i}^2 \le \kappa \}$$

Another alternative characterization of the finite block length capacity with transmission cost is:

$$C_{A^n \to B^n}^{FB,AN \text{ on } GN-A.1-IL}(\kappa) = \max_{\{P_{U_i}\}_{i=0}^n, \{e_i(\cdot,\cdot)\}_{i=0}^n \in \mathcal{E}_{0,n}^{AN \text{ on } GN-A.1-IL}} \sum_{i=0}^{n} H^e(B_i \mid B^{i-1}) - H(V^n).$$

$$\equiv \max_{\{P_{U_i}\}_{i=0}^n, \{e_i(\cdot,\cdot)\}_{i=0}^n \in \mathcal{E}_{0,n}^{AN \text{ on } GN-A.1-IL}} \sum_{i=0}^{n} I^e(U_i; B_i \mid B^{i-1})$$

-continued where $$\mathbb{P}\{B_i \leq b_i \mid B^{i-1} = b^{i-1}\} = \int_{\mathbb{U}_i} \mathbb{P}\left\{V_i \leq b_i + \sum_{j=0}^{i-1} C_{i,j}b_j - D_{i,i}e_i(b^{i-1}, u_i)\right\} P_{U_i|B^{i-1}}(du_i \mid b^{i-1}),$$

$$i = 0, 1, \ldots, n.$$

The characterization, or capacity formula, may be solved to find the capacity. For example, a computing device may solve the maximization with dynamic programming or another suitable method as further discussed with reference to FIG. 3.

B.6.1.2.2. Example AGN Channel with Memory

In another example case, the channel noise process is Gaussian:

$$V_i \sim N(0, K_{V_i}), i=0,1,\ldots,n,$$

or approximately Gaussian. By the entropy maximizing property of Gaussian distributions, the finite block length feedback capacity is bounded from above by the inequality $$H(B^n) \leq H(B^{g,n}),$$

where $$B^{g,n} \triangleq \{B_i^g : i=0,1,\ldots,n\}$$

is Gaussian distributed. This upper bound may be achieved when $$\{\pi_i(da_i|b^{i-1}) = P_{A_i|B^{i-1}}^g(a_i|b^{i-1}) : i=0,1,\ldots\}$$

is conditional Gaussian and the average transmission cost is satisfied, implying that $$\{P_{B_i|B^{i-1}}(b_i|b^{i-1}) = P_{B_i|B^{i-1}}^g(b_i|b^{i-1}) : i=0,1,\ldots,n\}$$

is also conditionally Gaussian.

Similar to the procedure described in section B.6.1.2.1, a measurable function $$e_i : \mathbb{B}^{i-1} \times \mathbb{U}_i \to \mathbb{A}_i, \mathbb{U}_i \triangleq \mathbb{R}^p, a_i = e_i(b^{i-1}, u_i), i = 0, 1, \ldots, n$$

exists such that $$\mathbb{P}\{U_i; e_i(b^{i-1}, U_i) \in da_i\} = P_{A_i|B^{i-1}}^g(da_i|b^{i-1}),$$
$$i=0,1,\ldots,n.$$

Because the channel output is defined by the example linear channel model, $B_i$, $$B_i^g = -\sum_{j=0}^{i-1} C_{i,j}B_j^g + D_{i,i}e_i(B^{g,i-1}, U_i) + V_i,$$

$$i = 1, \ldots, n, \frac{1}{n+1}\sum_{i=0}^{n} tr(\text{Cov}(A_i)) \leq \kappa.$$

Moreover, the corresponding channel input process denoted by $$A^{g,n} \triangleq \{A_i^g : i=0,1,\ldots,n\}$$

is Gaussian distributed, satisfying the average transmission cost constraint. Also, $\{U_i: i=0, 1, \ldots n\}$ is Gaussian independent of $B^{g,i-1}$ for any $i=0, 1, \ldots, n$, and $$A_i^g = g_i(B^{i-1}, U_i) = \sum_{j=0}^{i-1} \Gamma_{i,j}B_j^g + U_i, i = 0, 1, \ldots, n.$$

$$B_i^g = \sum_{j=0}^{i-1} (D_{i,i}\Gamma_{i,j} - C_{i,j})B_j^g + D_{i,i}U_i + V_i, i = 1, \ldots, n.$$

In terms of $$\Gamma_i \triangleq [\Gamma_{i,0}\Gamma_{i,1}\ldots\Gamma_{i,i-1}] \cdot K_{B^{g,i-1}} \triangleq E\{B^{g,i-1}(B^{g,i-1})^T\},$$
$$i=0,1,\ldots,n.$$

the average transmission cost may be:

$$\sum_{i=0}^{n} E|A_i^g|_{\mathbb{R}^k}^2 = \sum_{i=0}^{n} (\Gamma_i K_{B^{g,i-1}} \Gamma_i^T + K_{U_i}).$$

Thus, the finite block length feedback capacity formula, in this example case, is characterized by:

$$C_{A^n \to B^n}^{FB, AWGNM-A.1}(\kappa) =$$

$$\max_{\{\Gamma_{i,j}, K_{U_i}\}_{i=0,j=0}^{n,n-1} : \frac{1}{(n+1)}\sum_{i=0}^{n}(\Gamma_i K_{B^{g,i-1}}\Gamma_i^T + K_{U_i}) \leq \kappa\}} \frac{p}{2}\sum_{i=0}^{n} \log \frac{|D_{i,i}K_{U_i}D_{i,i}^T + K_{V_i}|}{|K_{V_i}|}.$$

The covariance matrices $\{K_B^{g,i-1} : i=0, 1, \ldots n\}$ may be found from $B_i^g$.

If a process $\{X_i : i=0, 1, \ldots, n\}$ of a source, such as the source 102, intended for transmission over this channel is $\mathbb{R}^p$-valued, Gaussian distributed, and Markov, i.e., $$P_{X_i|X^{i-1}}(dx_i|x^{i-1}) = P_{X_i|X_{i-1}}(dx_i|x_{i-1}), i=0,1,\ldots,n,$$

and the matrices $$\{\Gamma_{i,j}^*, K_{U_i}^* : i=0,1,\ldots,n, j=0,1,\ldots,n-1\}$$

are the matrices maximizing the above expression, then the coding scheme which achieves the finite block length feedback capacity, in this case, is:

$$A_i^{g,*} = \sum_{j=0}^{i-1} \Gamma_{i,j}^* B_j^g + \Delta_i^*\{X_i - E\{X_i \mid B^{g,i-1}\}\} \; i = 0, 1, \ldots, n,$$

$$\Delta_i^* = K_{U_i}^{*\frac{1}{2}}\{\text{Cov}(X_i - E\{X_i \mid B^{g,i-1}\})\}^{-\frac{1}{2}}, i = 0, 1, \ldots, n.$$

B.6.2. Class A.2.

For an example channel condition distribution, $$\{P_{B_i|B^{i-1},A_{i-L}} : i=0,1,\ldots,n\}$$

the optimal channel input distribution for the finite block length feedback capacity, $C_{A^n \to B^n}^{noFB}$, is included in the subset of channel input distributions:

$$\mathscr{P}_{[0,n]}^{A.2} \triangleq \{P_{A_i|A_{i-L}^{i-1},B^{i-1}}(da_i|a_{i-L}^{i-1},b^{i-1}):$$
$$i=0,\ldots,n\} \subset \mathscr{P}_{[0,n]}$$

where $P_{A_i|A_{i-L}^{i-1},B^{i-1}}(da_i|a_{i-L}^{i-1},b^{i-1})$ for $i=0,1,\ldots,L$ may be determined from the convention used in the channel model. For example:

$$P_{A_i|A_{i-L}^{i-1},B^{i-1}}(da_i|a_{i-L}^{i-1},b^{i-1}) = P_{A_i|B^{i-1}}(da_i|b^{i-1}),$$
$$i=0,1,\ldots,L.$$

The characterization of the finite block length feedback capacity, in this case, is:

$$C_{A^n \to B^n}^{FB,A.2} \triangleq$$

$$\sup_{\mathscr{P}} \sum_{i=0}^n \int \log\left(\frac{dP_{B_i|B^{i-1},A_{i-L}^i}(\cdot | b^{i-1}, a_{i-L}^i)}{dP_{B_i|B^{i-1}}(\cdot | b^{i-1})}(b_i)\right) P_{B^i,A_{i-L}^i}(db^i, da_{i-L}^i) =$$

$$\sup_{\mathscr{P}} \sum_{i=0}^n I(A_{i-L}^i; B_i | B^{i-1}).$$

If a transmission cost is imposed corresponding to any $\gamma_i^{A.2}(a_{i-N}^i, b^{i-1}), \gamma_i^{C.2}(a_{i-N}^i, b_{i-K}^{i-1}), i=0,1,\ldots,n.$ then the characterization of the finite block length feedback capacity with transmission cost, in this example case, is:

$$C_{A^n \to B^n}^{FB,A.2,L\wedge N}(\kappa) = \sup_{\mathscr{P}} \sum_{i=0}^n I(A_{i-L\wedge N}^i; B_i | B^{i-1}),$$

$$\mathscr{P}_{[0,n]}^{A.2,L\wedge N} = \mathscr{P}_{[0,n]}^{A.2}\big|_{L=L\wedge N}, L\wedge N \triangleq \max\{L, N\}$$

B.6.2.1. Example Non-Linear and Linear Channel Models

Similar to the models discussed in section B.6.1.1, channel distribution of example class A.2 (as defined in section B.1. entitled "Characterizing Channels") may include one or both of distributions defined on finite and countable alphabet space and distributions defined on continuous alphabet spaces, which distributions may be induced by the models described below.

Let $\mathbb{A}_i \triangleq \mathbb{R}^q, \mathbb{B}_i \triangleq \mathbb{R}^p, \mathbb{V}_i \triangleq \mathbb{R}^r, h_i: \mathbb{B}^{i-1} \times \mathbb{A}_{i-L}^i \times \mathbb{V}_i \mapsto \mathbb{B}_i, i = 0, 1, \ldots, n$ where $\{h_i(\bullet,\bullet,\bullet): i=0, 1, \ldots\}$ are measurable functions, and $\{V_i: i=0, 1, \ldots\}$ is a random channel noise process with joint distribution:

$P_{V^n}(dv^n)$ on $\mathscr{B}(\mathbb{V}^n)$.

Recursive expressions may define a nonlinear channel model for the example channel class A.2 as follows:

$B_i = h_i(B^{i-1}, A_{i-L}^i, V_i), i=1,\ldots,n$ $B_0 = h_0(B^{i-1}, A_{-L}^0, V_0),$ where transmission in the example model begins at time i=0, and the initial data of a pre-determined convention. If the channel noise process $\{V_i: i=0, 1, \ldots\}$ is an independent sequence (e.g., non-necessarily stationary), then the above nonlinear channel model may be applied in step one of the two-step process with the induced channel probability distribution:

$$\mathbb{P}\{B_i \in \Gamma | B^{i-1} = b^{i-1}, A^i = a^i\} = \mathbb{P}\{V_i : h_i(b^{i-1}, a_{i-L}^i, V_i) \in \Gamma\}, \Gamma \in \mathscr{B}(\mathbb{B}_i)$$

$$= Q_i(\Gamma | b^{i-1}, a_{i-L}^i), i = 0, 1, \ldots, n.$$

B.6.2.2. Example MIMO AGN Channel with Memory

For a linear version of the example channel class A.2, the channel output may be modeled as:

$$B_i = -\sum_{j=0}^{i-1} C_{i,j} B_j + D_{i,i} A_i + D_{i,i-1} A_{i-1} + V_i, i = 0, \ldots, n$$

The channel noise process, in this example case, is taken to be Gaussian distributed, i.e., $P_{V^n}(dv^n) = \Pi_{i=0}^n P_{V_i}(dv_i), V_i \sim N(0, K_{V_i}), i=0,1,\ldots,n,$ and the average transmission cost is taken to be:

$$\frac{1}{n+1} E\{\|A_i\|_{\mathbb{R}^q}^2\} \leq \kappa$$

This is a generalization of the example channel model discussed in section B.6.1.2.2 entitled "Example AGN Channel with Memory," and, thus, analogous results (e.g., finite block length capacities) are generated by utilizing similar procedures.

Specifically, the channel input distribution, in this case, may be given by:

$\mathbb{P}\{B_i \leq b_i | B^{i-1} = b^{i-1}, A^i = a^i\} = \mathbb{P}\{V_i \leq b_i + \Sigma_{j=0}^{i-1} C_{i,j} b_j - D_{i,j} a_i - D_{i,i-1} a_{i-1}\}, i=0,1,\ldots,n.$ The characterization of the finite block length feedback capacity, in this example, (i.e., a formula for the finite block length feedback capacity) is given by:

$$C_{A^n \to B^n}^{FB,AWGNM-A.2.1}(\kappa) =$$

$$\sup_{\{\pi_i(da_i|a_{i-1},b^{i-1}):i=0,\ldots,n\} \in \mathscr{P}_{[0,n]}(\kappa)} \left\{\sum_{i=0}^n H(B_i | B^{i-1})\right\} - H(V^n)$$

with, $$\mathbb{P}\{B_i \leq b_i | B^{i-1} = b^{i-1}\} =$$

$$\int_{\mathbb{A}_i} \mathbb{P}\left\{V_i \leq b_i + \sum_{j=0}^{i-1} C_{i,j} b_j - D_{i,i} a_i - D_{i,i-1} a_{i-1}\right\} \pi_i(da_i | a_{i-1}, b^{i-1})$$

$$P_{A_{i-1}|B^{i-1}}(da_{i-1} | b^{i-1}), i = 0, 1, \ldots, n.$$

The optimal (e.g., capacity achieving) channel input distribution $\{\pi_i(da_i|a_{i-1}, b^{i-1}) = P_{A_i|B^{i-1}}^g(a_i|b^{i-1}): i=0,1,\ldots,n\}$ is conditional Gaussian, in this example, and the average transmission cost is satisfied. Thus, $\{P_{B_i|B^{i-1}}(b_i|b^{i-1}) = P_{B_i|B^{i-1}}^g(b_i|b^{i-1}): i=0,1,\ldots,n\}$ is also conditionally Gaussian.

The information structure of the channel input distribution $$\{\pi_i(da_i|a_{i-1},b^{i-1}) \equiv P_{A_i|A_{i-1},B^{i-1}}^g(a_i|a_{i-1},b^{i-1}): i=0,1,\ldots\}$$

implies the following parametrization of the channel and channel input distribution:

$$A_i^g = e_i(A_{i-1}^g, B^{g,i-1}, U_i) = \sum_{j=0}^{i-1} \Gamma_{i,j} B_j^g + \Lambda_{i,i-1} A_{i-1}^g + U_i, \ i=0,1,\ldots,n,$$

$$B_i^g = \sum_{j=0}^{i-1} (D_{i,i}\Gamma_{i,j} - C_{i,j}) B_j^g + (D_{i,i}\Lambda_{i,i-1} + D_{i,i-1}) A_{i-1}^g + D_{i,i} U_i + V_i,$$

$$i = 1, \ldots, n.$$

Thus, the finite block length feedback capacity may be characterized by using any state space representation of the channel output process. Note, if stationarity is assumed, the above equations are further simplified.

If a process $\{X_i: i=0, 1, \ldots, n\}$ of a source, such as the source 102, intended for transmission over this channel is $R^p$-valued, Gaussian distributed, and Markov, i.e., $$P_{X_i|X^{i-1}}(dx_i|x^{i-1}) = P_{X_i|X_{i-1}}(dx_i|x_{i-1}), i=0,1,\ldots,n\},$$

and the matrices which maximize the parametrization of the channel input distribution are denoted by:

$$\{\Gamma_{i,j}^*, \Lambda_{i,i-1}^*, K_{U_i}^*: i=0,1,\ldots,n, j=0,1,\ldots,n-1\},$$

then the coding scheme which achieves the finite block length feedback capacity, in this case, is:

$$A_i^{g,*} = \sum_{j=0}^{i-1} \Gamma_{i,j}^* B_j^g + \Lambda_{i,i-1}^* A_{i-1}^{g,*} + \Delta^*(i)\{X_i - E\{X_i | A^{g,i-1}, B^{g,i-1}\}\} i = 0,$$

$$1, \ldots, n,$$

$$\Delta^*(i) = K_{U_i}^{*\frac{1}{2}} \{Cov(X_i - E\{X_i | A^{g,i-1}, B^{g,i-1}\})\}^{-\frac{1}{2}}, i = 0, 1, \ldots, n.$$

Although the above example illustrates a characterization of the finite block length capacity, channel input distributions, and capacity achieving coding schemes for a certain example channel of class A.2, the above discussed procedure may be extended to any continuous alphabet channel of class A.2, which channel is not necessarily driven by Gaussian noise processes.

B.7. Example Characterizations of Capacities and Identification of Channel Input Distributions for Channels in Class B By way of example, example finite block length feedback capacity formulas and input distributions, for other example classes of channels, determined according the two-step procedure (described with reference to FIGS. 2, 3, 4, and 5) are presented below. The corresponding feedback capacities with and without transmission cost are limiting versions of the finite block length feedback capacities presented below.

B.7.1. Class B.1

For an example channel condition distribution, $$\{P_{B_i|B_{i-1},A_i}(db_i|b_{i-1},a_i): i=0,1,\ldots,n\}$$

referred to as "Unit Memory Channel Output," the optimal channel input distribution $C_{A^n \to B^n}^{FB}$ is included in the subset:

$$\mathscr{P}_{[0,n]}^{B.1} \triangleq \{P_{A_i|B_{i-1}}(da_i|b_{i-1}): i=0,1,\ldots,n\} \subset \mathscr{P}_{[0,n]}$$

This subset implies that the corresponding joint process $\{(A_i, B_i): i=0,\ldots,n\}$ and channel output process $\{B_i: i=0,\ldots,n\}$ are first-order Markov, i.e., $$P_{A_i,B_i|A^{i-1},B^{i-1}}(da_i,db_i|b^{i-1},a^{i-1}) = P_{A_i,B_i|A_{i-1},B_{i-1}}(da_i,db_i|a_{i-1},b_{i-1}), i=0,\ldots,n,$$

$$P_{B_i|B^{i-1}}(db_i|b_{i-1}) = P_{B_i|B_{i-1}}(db_i|b_{i-1}), i=0,1,\ldots,n.$$

These findings are applicable to any channel input and output alphabets as those described earlier, including countable and continuous alphabet spaces.

The characterization of the finite block length feedback capacity is:

$$C_{A^n \to B^n}^{FB,B.1} \triangleq \sup_{\mathscr{P}_{[0,n]}^{B.1}} \sum_{i=0}^{n} I(A_i; B_i | B_{i-1}).$$

This characterization, or capacity formula, is generated by: (i) applying step one of the two-step procedure to determine a candidate set of optimal channel input distributions $\mathscr{P}_{[0,n]}^{A.1}$ (e.g., because the channel is a special case of channel distributions of class A.1); and (ii) applying step two of the two-step procedure to determine that the optimal channel input distribution is included in the narrower (e.g., including fewer elements) set $\mathscr{P}_{[0,n]}^{B.1}$.

If a transmission cost is imposed corresponding to $$\gamma_i^{B.1}(a_i, b_{i-1})$$

then the example characterization of the finite block length feedback capacity with transmission cost is:

$$C_{A^n \to B^n}^{FB,B.1}(\kappa) = \sup_{\mathscr{P}_{[0,n]}^{B.1}(\kappa)} \sum_{i=0}^{n} I(A_i; B_i | B_{i-1}).$$

B.7.1.1. Example Non-Linear and Linear Channel Models

Similar to the models discussed in sections B.6.1.1 and B.6.2.1, channel distributions of example class B.1 may include one or both of distributions defined on finite and countable alphabet space and distributions defined on continuous alphabet spaces, which distributions may be induced by the models described below.

A nonlinear model of a channel in the class B.1 with continuous alphabet spaces may include a recursive expression:

$$B_i = h_i(B_{i-1}, A_i, V_i), i = 0, \ldots, n, \frac{1}{n+1}\sum_{i=0}^{n} E\{\gamma^{B.1}(A_i, B_{i-1})\} \leq \kappa$$

The characterization of the finite block length feedback capacity of the channel defined by this model is given by:

$$C_{A^n \to B^n}^{FB,NCM-B.1}(\kappa) \triangleq$$

$$\sup_{\{P_{A_i|B_{i-1}}(da_i|b_{i-1}): i=0,\ldots,n\} \in \mathscr{P}_{[0,n]}^{B.1}(\kappa)} \sum_{i=0}^{n} E\left\{\log\left(\frac{P_{B_i|B_{i-1},A_i}(dB_i | B_{i-1}, A_i)}{P_{B_i|B_{i-1}}(dB_i | B_{i-1})}\right)\right\}$$

where $$P_{B_i|B_{i-1}}(db_i | b_{i-1}) = \int_{\mathbb{A}_i} P_{B_i|B_{i-1},A_i}(db_i | b_{i-1}, a_i) \otimes P_{A_i|B_{i-1}}(da_i | b_{i-1}),$$

$$i = 0, 1, \ldots, n$$

-continued and $$\vec{\mathcal{P}}_{[0,n]}^{B.1}(\kappa) \triangleq$$

$$\left\{ P_{A_i|B_{i-1}}(da_i \mid b_{i-1}), i = 0, \ldots, n : \frac{1}{n+1} \sum_{i=0}^{n} E\{\gamma_i^{B.1}(A_i, B_{i-1})\} \le \kappa \right\}$$

A computing device and/or operator of a communication system may perform the optimization or maximization of $C_{A^n \to B^n}^{FB,NCM-B.1}(\kappa)$ using dynamic programming To illustrate this point, let $$C_t : \mathbb{B}_{t-1} \longmapsto \mathbb{R}$$

denote the "cost-to-go" (corresponding to $C_{A^n \to B^n}^{FB,NCM-B.1}(\kappa)$) from the time "t" to the terminal time "n" given the value of the output $B_{t-1} = b_{t-1}$. This cost-to-go satisfies the following dynamic programming recursions:

$$C_t(b_{t-1}) = \inf_{s \le 0} \sup_{P_{A_t|B_{t-1}}(da_t|b_{t-1})} \left\{ \int_{\mathbb{A}_t \times \mathbb{B}_t} \log\left( \frac{P_{B_t|B_{t-1},A_t}(db_t \mid b_{t-1}, a_t)}{P_{B_t|B_{t-1}}(db_t \mid b_{t-1})} \right) \right.$$

$$P_{B_t|B_{t-1},A_t}(db_t \mid b_{t-1}, a_t) \otimes P_{A_t|B_{t-1}}(da_t \mid b_{t-1}) +$$

$$s \left[ \int_{\mathbb{A}_t} \gamma_t^{B.1}(a_t, b_{t-1}) P_{A_t|B_{t-1}}(da_t \mid b_{t-1}) - (n+1)\kappa \right] +$$

$$\left. \int_{\mathbb{A}_t \times \mathbb{B}_t} C_{t+1}(b_t) P_{B_t|B_{t-1},A_t}(db_t \mid b_{t-1}, a_t) \otimes P_{A_t|B_{t-1}}(da_t \mid b_{t-1}) \right\},$$

$$C_n(b_{n-1}) = \inf_{s \le 0} \sup_{P_{A_n|B_{n-1}}(da_n|b_{n-1})} \left\{ \int_{\mathbb{A}_n \times \mathbb{B}_n} \log\left( \frac{P_{B_n|B_{n-1},A_n}(db_n \mid b_{n-1}, a_n)}{P_{B_n|B_{n-1}}(db_n \mid b_{n-1})} \right) \right.$$

$$P_{B_n|B_{n-1},A_n}(db_n \mid b_{n-1}, a_n) \otimes P_{A_n|B_{n-1}}(da_n \mid b_{n-1}) +$$

$$\left. s \left[ \int_{\mathbb{A}_n} \gamma_n^{B.1}(a_n \mid b_{n-1}) P_{A_n|B_{n-1}}(da_n \mid b_{n-1}) - (n+1)\kappa \right] \right\}.$$

The characterization of the finite block length feedback capacity (or the formula for the finite block length feedback capacity) is then expressible as:

$$C_{A^n \to B^n}^{FB,NCM-B.1}(\kappa) = \mathbb{E} C_0(b_{-1}) P_{B_{-1}}(db_{-1}).$$

Note, although not discussed in detail here, the above dynamic programmic recursions also apply to channels defined on finite alphabet spaces.

In some implementations, once the optimal channel input distribution is found and the finite block length feedback capacity is found, a computing device may utilize the Blahut-Arimoto algorithm to compute the maximization of the dynamic programming, working backward in time (i.e., sequentially). This utilization may reducer the computational complexity in solving the finite block length capacity, the capacity and the corresponding capacity achieving channel input distribution.

To develop another characterization of the finite block length feedback capacity consider the information structure of the channel input distribution:

$$\{P_{A_i|B_{i-1}}(a_i|b_{i-1}) : i = 0, 1, \ldots\}$$

This information structure implies that there exists a measurable function:

$$e_i : \mathbb{B}_{i-1} \times \mathbb{U}_i \to \mathbb{A}_i, \ \mathbb{U}_i \triangleq \mathbb{R}^p, \ a_i = e_i(b_{i-1}, u_i), \ i = 0, 1, \ldots, n,$$

where $\{U_i : i = 0, 1, \ldots, n\}$ is an r-dimensional random process with distribution:

$$\{P_{U_i}(du_i) : i = 0, 1, \ldots, n\}$$

such that $$\mathbb{P}\{U_i : e_i(b_{i-1}, U_i) \in da_i\} = P_{A_i|B_{i-1}}(da_i|b_{i-1}),$$
$$i = 0, 1, \ldots, n.$$

Because the channel output is defined by the model, B $$A_i = e_i(B_{i-1}, U_i), \ i = 0, 1, \ldots, n,$$

$$B_i = h_i(B_{i-1}, e_i(B_{i-1}, U_i), V_i), \ i = 0, 1, \ldots, n,$$

$$\frac{1}{n+1} \sum_{i=0}^{n} E|e_i(B_{i-1}, U_i)|_{\mathbb{R}^q}^2 \le \kappa.$$

Further, a class of admissible functions is:

$$\mathcal{E}_{[0,n]}^{NCM-B.1-IL}(\kappa) \triangleq \{e_i(b_{i-1}, u_i), i=0,\ldots,n : \text{for a fixed } b_{i-1} \text{ the function } e_i(b_{i-1}, \cdot)\}$$

is one-to-one and onto $A_i$ for $i = 0, \ldots, n$, $$\frac{1}{n+1} \sum_{i=0}^{n} E|e_i(B_{i-1}, U_i)|_{\mathbb{R}^q}^2 \le \kappa \right\}.$$

The alternative example characterization of the finite block length feedback capacity is:

$$C_{A^n \to B^n}^{FB,NCM-B.1}(\kappa) = \max_{\{P_{U_i}\}_{i=0}^{n}, \{e_i(\cdot,\cdot)\}_{i=0}^{n} \in \mathcal{E}_{[0,n]}^{NCM-B.1-IL}} \sum_{i=0}^{n} E$$

$$\left\{ \log\left( \frac{P_{B_i|B_{i-1},A_i}(dB_i \mid B_{i-1}, e_i(B_{i-1}, U_i))}{P_{B_i|B_{i-1}}(dB_i \mid B_{i-1})} \right) \right\} \equiv$$

$$\max_{\{P_{U_i}\}_{i=0}^{n}, \{e_i(\cdot,\cdot)\}_{i=0}^{n} \in \mathcal{E}_{[0,n]}^{NCM-B.1-IL}} \sum_{i=0}^{n} I(U_i; B_i \mid B^{i-1})$$

with $$P_{B_i|B_{i-1}}(dB_i \mid b_{i-1}) =$$

$$\int_{\mathbb{U}_i} P_{B_i|B_{i-1},A_i}(dB_i \mid B_{i-1}, e_i(b_{i-1}, u_i)) \otimes P_{U_i|B_{i-1}}(du_i \mid b_{i-1}),$$

$$i = 0, 1, \ldots, n.$$

A computing device or operator of a communication system may solve this example maximization of $C_{A^n;B^n}^{FB,NCM-B.1}(\kappa)$ via dynamic programming or the stochastic calculus of variations, for example. Because the optimal channel input distribution is generated by the above described procedure, computations using the dynamic programming equation, or the Blahut-Arimoto Algorithm applied sequentially in time to the dynamic programming, are simplified. Moreover, for stationary versions (e.g., not varying in time), the algorithms further simplify.

A linear model of a channel in the class B.1 may be expressed via a recursive expression:

$$B_i = -C_{i,i-1} B_{i-1} + D_{i,i} A_i + V_i, \ i = 0, 1, \ldots, n,$$

-continued $$\frac{1}{n+1}\sum_{i=0}^{n} E\{\gamma_i^{B.1}(A_i, B_{i-1})\} \leq \kappa$$

where $\{V_i : i=0, 1, \ldots\}$ is independently distributed according to $$P_{V^n}(dv^n) = \Pi_{i=0}^{n} P_{V_i}(dv_i),$$

with zero mean and covariance matrix:

$$\mu_{V_i} \triangleq E(V_i) = 0, K_{V_i} \triangleq E(V_i V_i^T), i=0, 1, \ldots, n$$

For each $i=0, 1, \ldots, n$, the coefficients $\{C_{i,j}, D_{i,i}: i=0, \ldots, n, j=0, 1, \ldots, i-1\}$ are real-valued matrices with dimensions p by p and p by q, respectively (e.g., $\{p, q\}$ being positive integers). The channel distribution is given by:

$$\mathbb{P}\{B_i \leq b_i \mid B^{i-1} = b^{i-1}, A^i = a^i\} = \mathbb{P}\{V_i \leq b_i + C_{i,i-1}b_i - D_{i,i}a_i\},$$

$i = 0, 1, \ldots, n$.

$$I(A^n \to B^n) =$$

$$\sum_{i=0}^{n} \{H(B_i \mid B^{i-1}) - H(B_i \mid B^{i-1}, A_i)\} = \sum_{i=0}^{n} H(B_i \mid B_{i-1}) - H(V^n)$$

and an example characterization of the finite block length feedback capacity is given by:

$$C_{A^n \to B^n}^{FB, LCM-B.1}(\kappa) =$$

$$\sup_{\{P_{A_i \mid B_{i-1}}(da_i \mid b_{i-1}), i=0\ldots n:\} \in \mathscr{P}_{[0,n]}^{LCM-B.1}(\kappa)} \left\{\sum_{i=0}^{n} H(B_i \mid B_{i-1})\right\} - H(V^n)$$

where $$\mathscr{P}_{[0,n]}^{LCM-B.1}(\kappa) \triangleq$$

$$\left\{P_{A_i \mid B_{i-1}}(da_i \mid b_{i-1}), i=0, \ldots, n : \frac{1}{n+1}\sum_{i=0}^{n} E\{\gamma_i^{B.1}(A_i, B_{i-1})\} \leq \kappa\right\}$$

and $$\mathbb{P}\{B_i \leq b_i \mid B_{i-1} = b^{i-1}\} =$$

$$\int_{\mathbb{A}_i} \mathbb{P}\{V_i \leq b_i + C_{i,i-1}b_i - D_{i,i}a_i\} P_{A_i \mid B_{i-1}}(da_i \mid b_{i-1}), \quad i = 0, 1, \ldots, n.$$

The "cost-to-go" satisfies the following example dynamic programming recursions:

$$C_t(b_{t-1}) = \inf_{s \leq 0} \sup_{P_{A_t \mid B_{t-1}}(da_t \mid b_{t-1})} \left\{-\int_{\mathbb{A}_t \times \mathbb{B}_t} \log\left(\frac{P_{B_t \mid B_{t-1}}(db_t \mid b_{t-1})}{db_t}\right)\right.$$

$$P_{B_t \mid B_{t-1}, A_t}(db_t \mid b_{t-1}, a_t) \otimes P_{A_t \mid B_{t-1}}(da_t \mid b^{t-1}) +$$

$$s\left[\int_{\mathbb{A}_t} \gamma_t^{B.1}(a_t, b_{t-1}) P_{A_t \mid B_{t-1}}(da_t \mid b_{t-1}) - (n+1)\kappa\right] +$$

$$\left.\int_{\mathbb{B}_t} C_{t+1}(b_t) P_{B_t \mid B_{t-1}, A_t}(db_t \mid b_{t-1}, a_t) \otimes P_{A_t \mid B_{t-1}}(da_t \mid b_{t-1})\right\}$$

$$C_n(b_{n-1}) = \inf_{s \leq 0} \sup_{P_{A_n \mid B_{n-1}}(da_n \mid b_{n-1})}$$

$$\left\{-\int_{\mathbb{A}_n \times \mathbb{B}_n} \log\left(\frac{P_{B_n \mid B_{n-1}}(db_n \mid b_{n-1})}{db_n}\right) P_{B_n \mid B_{n-1}, A_n}(db_n \mid b_{n-1}, a_n)\right.$$

$$\varnothing P_{A_n \mid B_{n-1}}(da_n \mid b^{n-1}) +$$

$$\left.s\left[\int_{\mathbb{A}_n} \gamma_n^{B.1}(a_n, b_{n-1}) P_{A_n \mid B_{n-1}}(da_n \mid b_{n-1}) - (n+1)\kappa\right]\right\}.$$

Further, a computing device and/or operator may generate an alternative characterization of the finite block length feedback capacity based on the information structure of the channel input distribution. For example, the channel input distribution:

$$\{P_{A_i \mid B_{i-1}}(a_i \mid b_{i-1}) : i=0, 1, \ldots\}$$

implies that there exists a measurable function:

$$e_i : \mathbb{B}_{i-1} \times \mathbb{U}_i \to \mathbb{A}_i, \mathbb{U}_i \triangleq \mathbb{R}^p, a_i = e_i(b_{i-1}, u_i), i = 0, 1, \ldots, n,$$

where $\{U_i : i=0, 1, \ldots, n\}$ is a p-dimensional random process with distribution:

$$\{P_{U_i}(du_i) : i=0, 1, \ldots, n\}$$

such that $$\mathbb{P}\{U_i : e_i(b_{i-1}, U_i) \in da_i\} = P_{A_i \mid B_{i-1}}(da_i \mid b_{i-1}),$$
$$i=0, 1, \ldots, n.$$

Based on the existence of this example measurable function:

$$A_i = e_i(B_{i-1}, U_i), i = 0, 1, \ldots, n,$$

$$B_i = -C_{i,i-1} B_{i-1} + D_{i,i} e_i(B_{i-1}, U_i) + V_i, i = 0, 1, \ldots, n,$$

$$\frac{1}{n+1}\sum_{i=0}^{n} E|e_i(B_{i-1}, U_i)|_{\mathbb{R}^q}^2 \leq \kappa.$$

and an example set of admissible functions is:

$$\mathscr{E}_{0,n}^{LCM-B.1-IL}(\kappa) \triangleq \{e_i(b^{i-1}, u_i), i=0, \ldots, n : \text{for a fixed } b_{i-1} \text{ the function } e_i(b^{i-1}, \bullet)$$

is one-to-one and onto $A_i$ for $i=0, \ldots, n$, $$\left.\frac{1}{n+1}\sum_{i=0}^{n} E|e_i(B_{i-1}, U_i)|_{\mathbb{R}^q}^2 \leq \kappa\right\}$$

The example alternative characterization of the finite block length feedback capacity is $$C_{A^n \to B^n}^{FB, LCM-B.1}(\kappa) = \max_{\{P_{U_i}\}_{i=0}^n, \{e_i(\cdot, \cdot)\}_{i=0}^n \in \mathscr{E}_{0,n}^{LCM-A.1-IL}} \sum_{i=0}^{n} H^e(B_i \mid B_{i-1}) - H(V^n).$$

$$\equiv \max_{\{P_{U_i}\}_{i=0}^n, \{e_i(\cdot, \cdot)\}_{i=0}^n \in \mathscr{E}_{0,n}^{LCM-A.1-IL}} \sum_{i=0}^{n} I(U_i; B_i \mid B_{i-1})$$

with $$\mathbb{P}\{B_i \leq b_i \mid B_{i-1} = b_{i-1}\} =$$

$$\int_{\mathbb{U}_i} \mathbb{P}\{V_i \leq b_i + C_{i,i-1}b_i - D_{i,i} e_i(b_{i-1}, u_i)\} P_{U_i \mid B_{i-1}}(du_i \mid b_{i-1}),$$

$i = 0, 1, \ldots, n$.

B.7.1.2. Example MIMO AGN Channel with Memory

The following illustrates characterizations of capacities and channel input distributions for a special case of a channel in class B.1 described by a linear channel model. In the special case, a channel noise process is $$V_i \sim N(0, K_{V_i}), i=0,1,\ldots,n,$$

or approximately Gaussian.

By the entropy maximizing property of Gaussian distributions, the finite block length feedback capacity is bounded from above by the inequality $$H(B^n) \leq H(B^{g,n}),$$

where $$B^{g,n} \triangleq \{B_i^g : i=0,1,\ldots,n\}$$

is Gaussian distributed. This upper bound may be achieved when $$\{P_{A_i|B_{i-1}}(da_i|b_{i-1}) = P_{A_i|B_{i-1}}^g(a_i|b_{i-1}) : i=0,1,\ldots,n\}$$

is conditional Gaussian and the average transmission cost is satisfied, implying that $$\{P_{B_i|B_{i-1}}(b_i|b_{i-1}) = P_{B_i|B_{i-1}}^g(b_i|b_{i-1}) : i=0,1,\ldots,n\}$$

is also conditionally Gaussian.

Similar to the other procedures described above with reference to linear channel models, a measurable function $$e_i : \mathbb{B}_{i-1} \times \mathbb{U}_i \to \mathbb{A}_i, \mathbb{U}_i \triangleq \mathbb{R}^p, a_i = e_i(b_{i-1}, u_i), i=0,1,\ldots,n$$

exists such that $$\mathbb{P}\{U_i : e_i(b_{i-1}, U_i) \in da_i\} = P_{A_i|B_{i-1}}(da_i|b_{i-1}),$$
$$i=0,1,\ldots,n.$$

Based on the existence of this measurable function the channel is given by, $$B_i^g = -C_{i,i-1} B_{i-1}^g + D_{i,i} e_i(B_{i-1}^g, U_i) + V_i, i=1,\ldots,n,$$

$$\frac{1}{n+1} \sum_{i=0}^{n} tr(\mathrm{Cov}(A_i)) \leq \kappa.$$

Because the channel output process is Gaussian distributed and a linear combination of any sequence of random variables is Gaussian distributed if and only if the sequence of random variables is also jointly Gaussian distributed, then the functions $$\{e_i(\cdot, \cdot) : i=0,1,\ldots,n\}$$

are necessarily linear and $\{U_i : i=0, 1, \ldots, n\}$ is necessarily a Gaussian sequence, in this example case. These properties imply that the corresponding channel input process, denoted by $$A^{g,n} \triangleq \{A_i^g : i=0,1,\ldots,n\}$$

is Gaussian distributed, satisfying the average transmission cost constraint. Moreover, $U_i$ is independent of $B^{g,i-1}$ for any $i=0, 1, \ldots, n$. Thus, $$A_i^g = e_i(B_{i-1}^g, U_i) = \Gamma_{i,i-1} B_{i-1}^g + U_i, i=0,1,\ldots,n.$$

$$B_i^g = (D_{i,i} \Gamma_{i,i-1} - C_{i,i-1}) B_{i-1}^g + D_{i,i} U_i + V_i, i=0,\ldots,n.$$

Also, because the output process is conditionally Gaussian, in this example case, the conditional entropies $$H(B_i^g | B_{i-1}^g = b^{i-1})$$

are independent of $b_{i-1}$ and $$\sum_{i=0}^{n} H(B_i^g | B_{i-1}^g) = H(V^n) = \frac{p}{2} \sum_{i=0}^{n} \log \frac{|D_{i,i} K_{U_i} D_{i,i}^T + K_{V_i}|}{|K_{V_i}|}.$$

Then, defining $$\Gamma_{i,i-1} = D_{i,i} \Gamma_{i,i-1} - C_{i,i-1}, i=0,1,\ldots,n, \Gamma_{0,-1}=0.$$

A computing device or operator of a communication system may express:

$$A_i^g = \Gamma_{i,i-1} B_{i-1}^g + U_i, i=0,1,\ldots,n,$$

$$B_i^g = \overline{\Gamma}_{i,i-1} B_{i-1}^g + D_{i,i} U_i + V_i, i=1,2,\ldots,n, B_0^g = D_{0,0} U_0 + V_0,$$

$$K_{B_{i-1}^g} \triangleq E\{B_{i-1}^g (B_{i-1}^g)^T\}, i=0,1,\ldots,n.$$

with the following recursion:

$$K_{B_i^g} = \overline{\Gamma}_{i,i-1} K_{B_{i-1}^g} \overline{\Gamma}_{i,i-1}^T + D_{i,i} K_{U_i} D_{i,i}^T + K_{V_i}, K_{B_0^g} = D_{0,0} K_{U_0} D_{0,0}^T + V_0, i=1,\ldots,n$$

In this example case, the average transmission cost is:

$$\sum_{i=0}^{n} E|A_i^g|_{\mathbb{R}^k}^2 = \sum_{i=0}^{n} tr(\Gamma_{i,i-1} K_{B_{i-1}^g} \Gamma_{i,i-1}^T + K_{U_i}).$$

and the example finite block length feedback capacity is characterized by $$C_{A^n \to B^n}^{FB, AWGNW-B.1}(\kappa) =$$

$$\left\{ \{\Gamma_{i,i-1}, K_{U_i}\}_{i=0, j=0}^{n, n-1} : \frac{1}{[n+1]} \sum_{i=0}^{\max} tr\left(\Gamma_{i,i-1} K_{B_{i-1}^g} \Gamma_{i,i-1}^T + K_{U_i}\right) \leq \kappa \right\}^{\frac{p}{2}}$$

$$\sum_{i=0}^{n} \log \frac{|D_{i,i} K_{U_i} D_{i,i}^T + K_{V_i}|}{|K_{V_i}|}.$$

If a process $\{X_i : i=0, 1, \ldots, n\}$ of a source, such as the source 102, intended for transmission over this channel is $\mathbb{R}^p$-valued, Gaussian distributed, and Markov and the matrices which maximize the finite block length feedback capacity are $$\{\Gamma_{i,i-1}^*, K_{U_i}^* : i=0,1,\ldots,n\},$$

then the coding scheme which achieves the finite block length feedback capacity is:

$$A_i^{g,*} = \Gamma_{i,i-1}^* B_{i-1}^g + \Delta_{i,i-1}^* \{X_i - E\{X_i | B^{g,i-1}\}\}\ i=0, 1, \ldots, n,$$

$$\Delta_{i,i-1}^* = K_{U_i}^{*\frac{1}{2}} \{\mathrm{Cov}(X_i - E\{X_i | B^{g,i-1}\})\}^{-\frac{1}{2}}, i=0, 1, \ldots, n.$$

B.7.1. Class B.2

For an example channel condition distribution, $$\{P_{B_i|B_{i-M}^{i-1}, A_i}(db_i|b_{i-M}^{i-1}, a_i) : i=0,1,\ldots,n\},$$

where M is a finite nonnegative integer, the optimal channel input distribution for $C_{A^n \to B^n}^{FB}$ is included in the set $$\mathscr{P}_{[0,n]}^{B.2} \triangleq \left\{ P_{A_i|B_{i-M}^{i-1}}(da_i|b_{i-M}^{i-1}) : i=0, 1, \ldots, n \right\} \subset \mathscr{P}_{[0,n]}^{A.1}$$

This fact implies that the corresponding joint process $\{(A_i, B_i) : i=0, \ldots, n\}$ and channel output process $\{B_i : i=0, \ldots, n\}$ are M-order Markov processes.

An example characterization of the finite block length feedback capacity is $$C_{A^n \to B^n}^{FB,B.2} \triangleq \sup \sum_{i=0}^{n} \int \log\left(\frac{dP_{B_i|B_{i-M}^{i-1},A_i}(\cdot | b_{i-M}^{i-1}, a_i)}{dP_{B_i|B_{i-M}^{i-1}}(\cdot | b_{i-M}^{i-1})}(b_i)\right) P_{B_{i-M}^i,A_i}(db_{i-M}^i, da_i)$$

$$= \sup \sum_{i=0}^{n} I(A_i; B_i | B_{i-M}^{i-1})$$

$$P_{B_i|B_{i-M}^{i-1}}(db_i | b_{i-M}^{i-1}) = \int P_{B_i|B_{i-M}^{i-1},A_i}(db_i | b_{i-M}^{i-1}, a_i) \otimes P_{A_i|B_{i-M}^{i-1}}(da_i | b_{i-M}^{i-1}), i = 0, 1, \ldots, n.$$

Also, if a transmission cost is imposed, then the example characterization may be expressed as $$C_{A^n \to B^n}^{FB,B.2,M \wedge K}(\kappa) \triangleq \sup_{\mathscr{P}_{[0,n]}^{B.2,M \wedge K}(\kappa)}$$

$$\sum_{i=0}^{n} \int \log\left(\frac{dP_{B_i|B_{i-M}^{i-1},A_i}(\cdot | b_{i-M}^{i-1}, a_i)}{dP_{B_i|B_{i-M \wedge K}^{i-1}}(\cdot | b_{i-M \wedge K}^{i-1})}(b_i)\right) P_{B_{M \wedge K}^i,A_i}(db_{i-M \wedge K}^i, da_i)$$

where $$\mathscr{P}_{[0,n]}^{B.2,M \wedge K} \triangleq \{P_{A_i} | B_{i-M \wedge K}^{i-1}(da_i | b_{i-M \wedge K}^{i-1}): i = 0, 1, \ldots, n\}$$

$$P_{B_{i-M \wedge K}^i,A_i}(db_{i-M \wedge K}^i, da_i) = P_{B_i|B_{i-M}^{i-1},A_i}(db_i | b_{i-M}^{i-1}, a_i) \otimes$$

$$P_{A_i|B_{i-M \wedge K}^{i-1}}(da_i | b_{i-M \wedge K}^{i-1}) \otimes P_{B_{i-M \wedge K}^{i-1}}(db_{i-M \wedge K}^{i-1}), \quad i = 0, 1, \ldots, n,$$

$$P_{B_i|B_{i-M \wedge K}^{i-1}}(db_i | b_{i-M \wedge K}^{i-1}) =$$

$$\int P_{B_i|B_{i-M}^{i-1},A_i}(db_i | b_{i-M}^{i-1}, a_i) \otimes P_{A_i|B_{i-M \wedge K}^{i-1}}(da_i | b_{i-M \wedge K}^{i-1}),$$

$$i = 0, 1, \ldots, n.$$

B.7.1. Class B.3

For an example channel condition distribution, $$\{P_{B_i|B_{i-M}^{i-1},A^i}(db_i b_{i-M}^{i-1}, a^i): i=0,1,\ldots,n\},$$

where M is a finite nonnegative integer, the optimal channel input distribution for $C_{A^n \to B^n}^{FB}$ is included in the set $$\mathscr{P}_{[0,n]}^{B.3} \triangleq \{P_{A_i|A^{i-1},B^{i-1}}(da_i | a^{i-1}, b^{i-1}); i = 0, 1, \ldots, n\} \subset \mathscr{P}_{[0,n]}$$

An example characterization of the finite block length feedback capacity is $$C_{A^n \to B^n}^{FB,B.3} \triangleq \sup \sum_{i=0}^{n} \int \log\left(\frac{dP_{B_i|B_{i-M}^{i-1},A^i}(\cdot | b_{i-M}^{i-1}, a^i)}{dP_{B_i|B^{i-1}}(\cdot | b^{i-1})}(b_i)\right) P_{B^i,A^i}(db^i, da^i).$$

If a transmission cost is imposed corresponding to any instantaneous transmission cost function of classes A, B, and C, then the example characterization of the finite block length feedback capacity is given by the above expression for $\mathscr{P}_{[0,n]}^{B.3}$ using $$\mathscr{P}_{[0,n]}^{B.3} \cap \mathscr{P}_{[0,n]}(\kappa).$$

B.8. Example Characterizations of Capacities and Identification of Channel Input Distributions for Channels in Class C By way of example, finite block length feedback capacity formulas and input distributions, for still further classes of channels, determined according the two-step procedure (described with reference to FIGS. 2, 3, 4, and 5) are presented below. The corresponding feedback capacities with and without transmission cost are limiting versions of the finite block length feedback capacities presented below.

B.8.1. Class C.1

For an example channel with a channel conditional distribution:

$$\{P_{B_i|B_{i-2}^{i-1},A_{i-1}^i}(db_i b_{i-2}^{i-1}, a_{i-1}^i): i=0,1,\ldots,n\},$$

the optimal channel input distribution for $C_{A^n \to B^n}^{FB}$ is included in the set $$\mathscr{P}_{[0,n]}^{C.1} \triangleq \{P_{A_i|A_{i-1},B_{i-2}^{i-1}}(da_i | a_{i-1}, b_{i-2}^{i-1}): i = 0, 1, \ldots, n\}$$

This inclusion implies that the corresponding joint process $\{(A_i, B_i): i=0, \ldots, n\}$ and channel output process $\{B_i: i=0, \ldots, n\}$ are second-order Markov processes, i.e., $$P_{A_i,B_i|A^{i-1},B^{i-1}}(da_i, db_i | b^{i-1}, a^{i-1}) = P_{A_i,B_i|A_{i-2}^{i-1},B_{i-2}^{i-1}}(da_i, db_i | a_{i-2}^{i-1}, b_{i-2}^{i-1}), i = 0, \ldots, n,$$

$$P_{B_i|B^{i-1}}(db_i | b^{i-1}) = P_{B_i|B_{i-2}^{i-1}}(db_i | b_{i-2}^{i-1}), i = 0, 1, \ldots, n.$$

An example characterization of the finite block length feedback capacity is $$C_{A^n \to B^n}^{FB,C.1} \triangleq \sup \frac{1}{n+1} \sum_{i=0}^{n} I(A_{i-1}^i; B_i | B_{i-2}^{i-1}).$$

If a tranmission cost is imposed, this example characterization may be expressed as:

$$C_{A^n \to B^n}^{FB,C.1,2\Delta K}(\kappa) \triangleq \sup \sum_{i=0}^{n} \int \log\left(\frac{dP_{B_i|B_{i-2}^{i-1},A_{i-1}^i}(\cdot | b_{i-2}^{i-1}, a_{i-1}^i)}{dP_{B_i|B_{i-2 \wedge K}^{i-1}}(\cdot | b_{i-2 \wedge K}^{i-1})}(b_i)\right)$$

$$P_{B_{2 \wedge K}^i,A_{i-1}^i}(db_{i-2 \wedge K}^i, da_{i-1}^i)$$

where $$\mathscr{P}_{[0,n]}^{C.1,2\Delta K} \triangleq \{P_{A_i|A_{i-1},B_{i-2 \wedge K}^{i-1}}(da_i | a_{i-1}, b_{i-2 \wedge K}^{i-1}): i = 0, 1, \ldots, n\}$$

-continued $$P_{B_{i-2\wedge K}^i, A_i}(db_{i-2\wedge K}^i, da_i, da_{i-1}) =$$

$$P_{B_i|B_{i-2}^{i-1}, A_{i-1}^i}(db_i \mid b_{i-2}^{i-1}, a_{i-1}^i) \otimes P_{A_i|A_{i-1}, B_{i-2\wedge K}^{i-1}}(da_i \mid a_{i-1}, b_{i-2\wedge K}^{i-1}) \otimes$$

$$P_{A_{i-1}|B_{i-2\wedge K}^{i-1}}(a_{i-1} \mid b_{i-2\wedge K}^{i-1}) \otimes P_{B_{i-2\wedge K}^{i-1}}(db_{i-2\wedge K}^{i-1}), \, i = 0, 1, \ldots, n,$$

$$P_{B_i|B_{i-2\wedge K}^{i-1}}(db_i \mid b_{i-2\wedge K}^{i-1}) =$$

$$\int P_{B_i|B_{i-2}^{i-1}, A_{i-1}^i}(db_i \mid b_{i-2}^{i-1}, a_{i-1}^i) \otimes P_{A_i|A_{i-1}, B_{i-2\wedge K}^{i-1}}(da_i \mid a_{i-1}, b_{i-2\wedge K}^{i-1}) \otimes$$

$$P_{A_{i-1}|B_{i-2\wedge K}^{i-1}}(a_{i-1} \mid b_{i-2\wedge K}^{i-1}), \, i = 0, 1, \ldots, n.$$

B.8.2. Class C.2

For an example channel condition distribution, $$\{P_{B_i|B_{i-M}^{i-1}, A_{i-1}^i} : i=0,1,\ldots,n\},$$

the optimal channel input distribution for $C_{A^n \to B^n}^{FB}$ is included in the set $$\mathscr{P}_{[0,n]}^{C.2} \triangleq \{P_{A_i|A_{i-L}^{i-1}, B_{i-M\wedge L}^{i-1}}(da_i \mid a_{i-L}^{i-1}, b_{i-M\wedge L}^{i-1}) : i = 0, 1, \ldots, n\} \subset \overline{\mathscr{P}}_{[0,n]}^{A.2}$$

This inclusion implies that the corresponding joint process $\{(A_i, B_i) : i=0, \ldots, n\}$ and channel output process $\{B_i : i=0, \ldots, n\}$ are limited-memory Markov processes.

B.8.2.1. Unit Memory Channel Input Output (UMCIO) Example

For a special case of the example channel class C.2, an example channel conditional distribution is $$\{P_{B_i|B_{i-1}, A_{i-1}, A_i}(db_i|b_{i-1}, a_i, a_{i-1}) : i=0,1,\ldots,n\}$$

and the optimal channel input distribution for $C_{A^n \to B^n}^{FB}$ may be included in the set $$\mathscr{P}_{[0,n]}^{UMCIO} \triangleq \{P_{A_i|A_{i-1}, B_{i-1}}(da_i \mid a_{i-1}, b_{i-1}) : i = 0, 1, \ldots, n\} \subset \mathscr{P}_{[0,n]}^{C.1}$$

This inclusion implies that the corresponding joint process $\{(A_i, B_i) : i=0, \ldots, n\}$ and channel output process $\{B_i : i=0, \ldots, n\}$ are first-order Markov processes.

An example characterization of the finite block length feedback capacity, in this example case is $$C_{A^n \to B^n}^{FB, UMCIO} \triangleq \sup_{\{P_{A_i|A_{i-1}}(da_i|a_{i-1}, b_{i-1}) : i=0,1,\ldots,n\}} \sum_{i=0}^{n} I(A_{i-1}, A_i; B_i \mid B_{i-1}),$$

where $$I(A_{i-1}, A_i; B_i \mid B_{i-1}) = \int \log\left(\frac{dP_{B_i|B_{i-1}, A_i, A_{i-1}}(\cdot \mid b_{i-1}, a_i, a_{i-1})}{dP_{B_i|B_{i-1}}(\cdot \mid b_{i-1})}(b_i)\right)$$

$$P_{B_i|B_{i-1}, A_i, A_{i-1}}(db_i \mid b_{i-1}, a_i, a_{i-1}) \otimes P_{A_i|A_{i-1}, B_{i-1}}(da_i \mid a_{i-1}, b_{i-1}) \otimes$$

$$P_{A_{i-1}, B_{i-1}}(da_{i-1}, db_{i-1}), \, i = 0, 1, \ldots$$

and $$P_{B_i|B_{i-1}}(db_i \mid b_{i-1}) =$$

$$\int P_{B_i|B_{i-1}, A_{i-1}, A_i}(db_i \mid b_{i-1}, a_{i-1}, a_i) \otimes P_{A_i|A_{i-1}, B_{i-1}}(da_i \mid a_{i-1}, b_{i-1}) \otimes$$

$$P_{A_{i-1}|B_{i-1}}(a_{i-1} \mid b_{i-1}), \, i = 0, 1, \ldots, n.$$

B.8.2.2. Unit Memory Channel Input (UMCI) Example

For another special case of the example channel class C.2, an example channel conditional distribution is $$\{P_{B_i|A_{i-1}, A_i}(db_i|a_{i-1}, a_i) : i=0,1,\ldots,n\}$$

and the optimal channel input distribution for $C_{A^n \to B^n}^{FB}$ may be included in the set $$\mathscr{P}_{[0,n]}^{UMCI} \triangleq \{P_{A_i|A_{i-1}, B_{i-1}}(da_i|a_{i-1}, b_{i-1}) : i=0,1,\ldots,n\}.$$

This inclusion implies that the corresponding joint process $\{(A_i, B_i) : i=0, \ldots, n\}$ and channel output process $\{B_i : i=0, \ldots, n\}$ are first-order Markov processes.

An example characterization of the finite block length feedback capacity, in this example case is $$C_{A^n \to B^n}^{FB, UMCI} \triangleq \sup_{\{P_{A_i|A_{i-1}}(da_i|a_{i-1}, b_{i-1}) : i=0,1,\ldots,n\}} \frac{1}{n+1} \sum_{i=0}^{n} I(A_{i-1}, A_i; B_i \mid B_{i-1}).$$

where $$I(A_{i-1}, A_i; B_i \mid B_{i-1}) =$$

$$\int \log\left(\frac{dP_{B_i|A_i, A_{i-1}}(\cdot \mid a_i, a_{i-1})}{dP_{B_i|B_{i-1}}(\cdot \mid b_{i-1})}(b_{i-1})\right) P_{B_i|A_i, A_{i-1}}(db_i \mid a_i, a_{i-1})$$

$$\otimes P_{A_i|A_{i-1}, B_{i-1}}(da_i \mid a_{i-1}, b_{i-1}) \otimes P_{A_{i-1}, B_{i-1}}(da_{i-1}, db_{i-1}), \, 1 = 0, 1, \ldots, n,$$

and $$P_{B_i|B_{i-1}}(db_i \mid b_{i-1}) =$$

$$\int P_{B_i|A_{i-1}, A_i}(db_i \mid a_{i-1}, a_i) \otimes P_{A_i|A_{i-1}, B_{i-1}}(da_i \mid a_{i-1}, b_{i-1}) \otimes$$

$$P_{A_{i-1}|B_{i-1}}(da_{i-1} \mid b_{i-1}), \, i = 0, 1, \ldots, n.$$

B.9. Example Characterizations of Capacities and Identification of Channel Input Distributions for MIMO ANonGN Channels with Memory The two step procedure (described with reference to FIGS. 2, 3, 4, and 5) may also allow computing devices and/or operators of communication systems to characterize generalizations of Additive Gaussian Noise (AGN) channels and nonstationary Multiple-Input Multiple Output (MIMO) Additive Non-Gaussian Noise (ANonGN) channels. These other types of channels may be defined by the example model:

$$B_i = \sum_{j=1}^{L} D_{i,j} A_{i-j} + V_i, \, i = 0, 1, \ldots, n, \, \frac{1}{n+1} E\left\{\sum_{i=0}^{n} \gamma_i(A_{i-L}^i, B^{i-1})\right\} \leq \kappa$$

where $\{V_i : i=0, 1, \ldots, n\}$ is p-dimensional nonstationary non-Gaussian distributed noise, $\{A_i : i=0, 1, \ldots, n\}$ are q-dimensional channel input processes, and a condition "A" is causally related to $V^n$" is represented, in the example model, by $$P_{A^n,V^n}(da^n, dv^n) = \bigotimes_{i=0}^{n}\left(P_{A_i|A^{i-1},V^{i-1}}(da_i \mid a^{i-1}, v^{i-1}) \otimes P_{V_i|V^{i-1},A^i}(dv_i \mid v^{i-1}, a^i)\right)$$

$$= \bigotimes_{i=0}^{n}\left(P_{A_i|A^{i-1},V^{i-1}}(da_i \mid a^{i-1}, v^{i-1}) \otimes P_{V_i|V^{i-1},A^i_{i-L}}(dv_i \mid v^{i-1}, a^i_{i-L})\right).$$

The channel conditional distribution of the example non-stationary MIMO ANonGN channel is $$\mathbb{P}\{B_i \le b_i \mid B^{i-1}, A^i\} = \mathbb{P}\left\{V_i \le b_i - \sum_{j=1}^{L} D_{i,j}A_{i-j} \,\middle|\, V^{i-1}, A^i_{i-L}\right\}$$

or $$\mathbb{P}\{B_i \le b_i \mid B^{i-1}\} = \int_{b^i_{i-L}} \mathbb{P}\left\{V_i \le b_i - \sum_{j=1}^{L} D_{i,j}a_{i-j} \,\middle|\, V^{i-1}, a^i_{i-L}\right\} \otimes$$
$$P_{A_i|A^{i-1}_{i-L},V^{i-1}}(da_i \mid a^{i-1}_{i-L}, V^{i-1}) \otimes P_{A^{i-1}_{i-L}|V^{i-1}}(da^{i-1}_{i-L} \mid V^{i-1}).$$

An example characterization of the finite block length feedback capacity for the MIMO Additive Non-Gaussian Noise channels with memory may be expressed as:

$$C^{FB,ANonGN}_{A^n;B^n}(\kappa) = \sup_{\left\{P_{A_i|A^{i-1}_{i-L},V^{i-1}}(a_i|a^{i-1}_{i-L},v^{i-1},),i=0,\ldots,n: E\{\sum_{i=0}^{n}\gamma_i(A^i_{i-L},B^{i-1})\}\le\kappa\right\}} \left\{\sum_{i=0}^{n} H(B_i \mid B^{i-1}) - H(V_i \mid V^{i-1}, A^i_{i-L})\right\}$$

where the transition probability distribution of the channel output process $\{B_i: i=0, 1, \ldots, n\}$ is given by the above mentioned model.

If the noise process is non-Gaussian with conditional distribution:

$$\{P_{V_i|V^{i-1},A^i} = P_{V_i|V^{i-1}_{i-L},A^i_{i-L}}: i=0,1,\ldots,n\},$$

and the instantaneous tranmission cost is:

$$\gamma_i(a^{i-1}_{i-L}, b^{i-1}) \triangleq \gamma^1_i(a^i_{i-L}, b^{i-1}_{i-L}), i=0,\ldots,n.$$

then another example characterization of the finite block length feedback capacity for a channel in this class of channels is $$C^{FB,AnonGN,L}_{W;B^n}(\kappa) = \sup_{\left\{P_{A_i|A^{i-1}_{i-L},V^{i-1}_{i-L}}(a_i|a^{i-1}_{i-L},v^{i-1}_{i-L}),i=0,\ldots,n: E\{\sum_{i=0}^{n}\gamma^1_i(A^{i-1}_{i-L},B^{i-1}_{i-L})\}\le\kappa\right\}} \left\{\sum_{i=0}^{n} H(B_i \mid B^{i-1}) - H(V_i \mid V^{i-1}_{i-L}, A^i_{i-L})\right\}$$

where $$\mathbb{P}\{B_i \le b_i \mid B^{i-1}\} = \int_{\mathbb{A}_i} \mathbb{P}\left\{V_i \le b_i - \sum_{j=1}^{L} D_{i,j}a_{i-j} \,\middle|\, V^{i-1}_{i-L}, A^{i-1}_{i-L}\right\} \otimes P_{A_i|A^{i-1}_{i-L},V^{i-1}_{i-L}}$$
$$(da_i \mid a^{i-1}_{i-L}, V^{i-1}_{i-L}) \otimes P_{A^{i-1}_{i-L}|V^{i-1}_{i-L}}(a^{i-1}_{i-L} \mid V^{i-1}_{i-L}), i=0,1,\ldots,n.$$

In another example, the noise process is Gaussian with conditional distribution:

$$\{P_{V_i|V^{i-1},A^i} = P_{V_i|V^{i-1},A^i_{i-L}}: i=0,1,\ldots,n\},$$

and the instantaneous transmission cost function is:

$$\gamma_i(a^{i-1}_{i-L}, b^{i-1}) \triangleq \gamma^1_i(a^i_{i-L}, b^{i-1}_{i-L}), i=0,\ldots,n.$$

In this case, the optimal channel input distribution is:

$$P_{A_i|A^{i-1}_{i-L},V^{i-1}}*(a_i|a^{i-1}_{i-L}, v^{i-1}), i=0,\ldots,n$$

and it is conditionally Gaussian. A Gaussian process $$\{A^g_i: i=0,1,\ldots,n\}$$

realizes this distribution, where $$A^g_i = \sum_{j=1}^{L} \Gamma^1_{i,j} A^g_{i-j} + \sum_{j=0}^{i-1} \Gamma^2_{i,j} V_j + U_i, i = 0, 1, \ldots, n.$$

That is, at each time $i=0, 1, \ldots n$ the Gaussian process is a linear combination of $\{A^{g,i-1}_{i-L}, V^i\}$ and Gaussian random variables.

In yet another example, the noise process is Gaussian, and satisfies $$\{P_{V_i|V^{i-1},A^i} = P_{V_i|V^{i-1}_{i-L},A^i_{i-L}}: i=0,1,\ldots,n\},$$

In this case, the optimal channel input distribution is:

$$P_{A_i|A^{i-1}_{i-L},V^{i-1}_{i-L}}*(a_i|a^{i-1}_{i-L}, v^{i-1}_{i-L}), i=0,\ldots,n$$

and it is conditionally Gaussian. A Gaussian process $$\{A^g_i: i=0,1,\ldots,n\}$$

realizes this distribution, where $$A^g_i = \sum_{j=1}^{L} \Gamma^1_{i,j} A^g_{i-j} + \sum_{j=1}^{L} \Gamma^2_{i,j} V_{i-j} + U_i, i = 0, 1, \ldots, n$$

In still another example, the noise process is scalar Gaussian, $A^n$ is causally related to and defined by:

$$\{P_{V_i|V^{i-1},A^i} = P_{V_i|V^{i-1}}: i=0,1,\ldots,n\}$$

and the instantaneous tranmission cost function is)

$$\gamma_i(a^{i-1}_{i-L}, b^{i-1}) \triangleq \gamma(a_i), i=0,1,\ldots,n.$$

In this case, the Gaussian process $$\{A^g_i: i=0,1,\ldots,n\}$$

defined by:

$$A^g_i = \sum_{j=0}^{i-1} \Gamma^2_{i,j} V_j + U_i, i = 0, 1, \ldots, n.$$

is a realization of the optimal channel input distribution. Further, if $$\{P_{V_i|V^{i-1}} = P_{V_i|V^{i-1}_{i-L}}: i=0,1,\ldots,n\}$$

is stationary, the Gaussian process realization further reduces to:

$$A_i^g = \sum_{j=1}^{L} \Gamma_j^2 V_{i-j} + U_i, i = 0, 1, \ldots, n$$

B.10. Necessary and Sufficient Conditions for Feedback not to Increase Capacity

The example two-step procedure (described with reference to FIGS. 2, 3, 4, and 5) may allow computing device and/or operators or communication systems to determine necessary and sufficient conditions for feedback encoding to not increase capacity for a channel with memory, such as the channel 106. For such channels, feedback encoding does not increase capacity and the characterization of finite block length capacity with and without feedback is the same. Further, the capacity with and without feedback is the same in these cases. Example characterizations of the finite block length capacity without feedback and the capacity without feedback, developed according to the two-step procedure are described below along with necessary and sufficient conditions for feedback encoding not to increase channel capacity of channels with memory.

If an example channel has memory and an instantaneous transmission cost constraint:

$$\mathscr{P}_{[0,9]}(\boldsymbol{K})$$

then $$C_{A^n;B^n}^{noFB}(\boldsymbol{K}) \leq C_{A^n \to B^n}^{FB}(\boldsymbol{K}),$$

and feedback encoding does not provide additional gain compared to encoding without feedback if and only if the following identify holds:

$$C_{A^n \to B^n}^{FB}(\boldsymbol{K}) = C_{A^n;B^n}^{noFB}(\boldsymbol{K})$$

Further, feedback encoding does not increase capacity without feedback if and only if:

$$\liminf_{n \to \infty} \frac{1}{n+1} C_{A^n \to B^n}^{FB}(\kappa) = \liminf_{n \to \infty} \frac{1}{n+1} C_{A^n;B^n}^{noFB}(\kappa)$$

where the limits are finite.

Next, further example notation is introduced. Specifically, let $$I(A^n; B^n) = \sum_{i=0}^{n} E\left\{\log\left(\frac{dP_{B_i|B^{i-1},A^i}(\cdot|B^{i-1}, A^i)}{dP_{B_i|B^{i-1}}^{npFB}(\cdot|B^{i-1})}(B_i)\right)\right\}$$

$$\equiv \mathbb{I}_{A^n;B^n}\left(\left\{P_{A_i|A^{i-1}}^{npFB}, P_{B_i|B^{i-1},A^i}: i = 0, 1, \ldots, n\right\}\right)$$

where $I(A^n;B^n)$ is a functional of the channel distribution and the channel input distribution without feedback denoted by $$\{P_{A_i|A^{i-1}}^{noFB}: i=0,1,\ldots,n\} \in \mathscr{P}_{[0,n]}(\boldsymbol{K})$$

The maximum information structure without feedback, in this example notation, is $$\{a^{i-1}\}, i=0,1,\ldots,n.$$

Also, let $$I(A^n \to B^n) = \sum_{i=0}^{n} E\left\{\log\left(\frac{P_{B_i|B^{i-1},A^i}(\cdot|B^{i-1}, A^i)}{P_{B_i|B^{i-1}}^{FB}(\cdot|B^{i-1})}(B_i)\right)\right\}$$

$$\equiv \mathbb{I}_{A^n \to B^n}\left(\left\{P_{A_i|A^{i-1},B^{i-1}}^{FB}, P_{B_i|B^{i-1},A^i}: i = 0, 1, \ldots, n\right\}\right)$$

That is, $I(A^n \to B^n)$ is a functional of the channel distribution and the channel input distribution with feedback denoted by $$\{P_{A_i|A^{i-1},B^{i-1}}^{FB}: i=0,1,\ldots,n\} \in \mathscr{P}_{[0,n]}(\boldsymbol{K})$$

The maximum information structure without feedback, in this example notation, is $$\{a^{i-1}, b^{i-1}\}, i=0,1,\ldots,n.$$

Using this example notation, for a channel with memory and an encoder with a transmission cost constraint, the finite block length capacity without feedback with transmission cost is:

$$C_{A^n;B^n}^{noFB}(\kappa) = \sup_{\left\{P_{A_i|A^{i-1}}^{noFB}(da_i|a^{i-1}):i=0,\ldots,n\right\} \in \mathscr{P}_{[0,n]}(\kappa)}$$

$$\mathbb{I}_{A^n \to B^n}\left(\left\{P_{A_i|A^{i-1}}^{noFB}, P_{B_i|B^{i-1},A^i}: i = 0, 1, \ldots, n\right\}\right)$$

and, similarly, the finite block length capacity with feedback with transmission cost is:

$$C_{A^n \to B^n}^{FB}(\kappa) = \sup_{\left\{P_{A_i|A^{i-1},B^{i-1}}^{FB}(da_i|a^{i-1},b^{i-1}):i=0,\ldots,n\right\} \in \mathscr{P}_{[0,n]}(\kappa)}$$

$$\mathbb{I}_{A^n \to B^n}\left(\left\{P_{A_i|A^{i-1},B^{i-1}}^{FB}, P_{B_i|B^{i-1},A^i}: i = 0, 1, \ldots, n\right\}\right)$$

Also, define a set satisfying conditional independence as $$\mathscr{P}_{[0,n]}^{CI} \triangleq \{P_{A_i|A^{i-1},B^{i-1}}^{FB}(da_i|a^{i-1},b^{i-1}) = P_{A_i|A^{i-1}}^{noFB}(da_i|a^{i-1}) - a.a.(a^{i-1},b^{i-1}): i=0,\ldots,n\}$$

The characterization of finite block length capacity with feedback is equal to the characterization of finite block length capacity without feedback if and only if the corresponding optimal channel input distribution of the former belongs to the above set. Thus, $C_{A^n;B^n}^{noFB}(\boldsymbol{K})$ and $C_{A^n \to B^n}^{FB}(\boldsymbol{K})$ are related by $$C_{A^n;B^n}^{noFB}(\kappa) = \sup_{\left\{P_{A_i|A^{i-1},B^{i-1}}^{FB}(da_i|a^{i-1},b^{i-1}):i=0,\ldots,n\right\} \in \mathscr{P}_{[0,n]}(\kappa) \cap \mathscr{P}_{[0,n]}^{CI}}$$

$$\mathbb{I}_{A^n \to B^n}\left(\left\{P_{A_i|A^{i-1},B^{i-1}}^{FB}, P_{B_i|B^{i-1},A^i}: i = 0, 1, \ldots, n\right\}\right)$$

For a memoryless channel, this condition holds because the optimal channel input distribution which corresponds to the characterization of finite block length feedback capacity satisfies $$P_{A_i|A^{i-1},B^{i-1}}^{FB}(da_i|a^{i-1},b^{i-1}) = P_{A_i}(da_i) - a.a.a^{i-1}, i=0,\ldots,n$$

Also, the optimal channel input distribution which corresponds to the characterization of finite block length capacity without feedback satisfies $$P_{A_i|A^{i-1}}^{noFB}(da_i|a^{i-1}) = P_{A_i}(da_i) - a.a.a^{i-1}, i=0,\ldots,n$$

For any example channel in classes A, B, and C and any instantaneous transmission cost function in classes A, B, and C, let $$\{P(db_i|\mathscr{I}_i^Q):\mathscr{I}\subseteq\{a^{i-1},b^{i-1}\}, i=0,\ldots,n\}$$

denote the channel distribution and let $$\{P^{FB,*}(da_i|\mathscr{I}_i^{FB}):i=0,1,\ldots,n\}\in\mathscr{P}_{[0,n]}^{FB}(\mathcal{K})\subseteq\mathscr{P}_{[0,n]}(\mathcal{K}), \mathscr{I}_i^{FB}\subseteq\{a^{i-1}b^{i-1}\}, i=0,1,\ldots,n\}$$

denote the channel input distribution corresponding to the characterization of the finite block length feedback capacity $C_{A^n\to B^n}^{FB}(\mathcal{K})$. With these example definitions, feedback does not increase the finite block length capacity without feedback (i.e., $C_{A^n;B^n}^{noFB}(\mathcal{K})=C_{A^n;B^n}^{FB}(\mathcal{K})$) if and only if there exists a channel input distribution (without feedback)

$$\{P^{*,noFB}(da_i|\mathscr{I}_i^{noFB}):i=0,1,\ldots,n\}, \mathscr{I}_i^{noFB}\subseteq\{a^{i-1}\}, i=0,1,\ldots,n,$$

which induces the joint distribution $$P_{A^n,B^n}^{FB,*}(da^n,db^n)$$

and the channel output distribution $$P_{B^n}^{FB,*}(db^n)$$

corresponding to the pair $$\{P^{FB,*}(da_i|\mathscr{I}_i^{FB}),P(db_i|\mathscr{I}_i^Q):i=0,\ldots,n\}.$$

C. Designing Information Lossless Encoders to Achieve Characterized Capacities In addition to characterizing the "finite block length" feedback capacity for channels, such as the channel 106, the techniques of the present disclosure include methods to design encoders that achieve characterized capacities of channels with memory. These capacity achieving encoders are "information lossless encoders," in that the mapping, implemented by the encoders, of information from a source to encoded symbols are sequentially invertible. Encoders violating this property are not able to achieve the capacity of a given channel.

Further, for each of the example channels (e.g., A, B, and C) discussed herein, a computing device and/or operator of a communication system may generate specific coding schemes or mappings for the "information lossless" encoder based on the characterization of the capacity for the channel and a corresponding optimal channel input distribution. That is, all capacity achieving encoders may be "information lossless" encoders, but, for a given channel, a computing device or operator may generate a specific "information lossless" coding scheme based on a characterization of capacity for that channel. A computing device and/or operator may also define additional conditions of the information lossless encoder for a specific channel based on a characterization of capacity for the specific channel.

The optimal (i.e., "information lossless") encoding schemes designed according to the method discussed below may reduce the complexity of communication systems and operate optimally. For example, optimal operation may include an optimal operation in terms of the overall number of processing elements (e.g., CPUs) required to process transmissions and/or the number of memory elements and steps required to encoder and decode messages. Such optimal encoding and decoding schemes may require small processing delays and short code lengths in comparison to encoding and decoding schemes designed based on an assumption of a channel without memory or based on a separate treatment of source codes and channel codes.

Although, encoders and corresponding necessary and sufficient conditions discussed below are described, by way of example, with reference to the example communication system 100, which system 100 is a point-to-point communication system, encoders of the present disclosure may be applied to or implemented in systems other than point-to-point communication systems. For example, encoders of the present disclosure may be implemented in multi-user and network communication systems by repeating the procedures described below (for each user, for each node of a network, etc) Implementations of encoders may even be utilized in joint collaborative communication.

C.1. Encoder Design Overview and Methods

Figure 6:
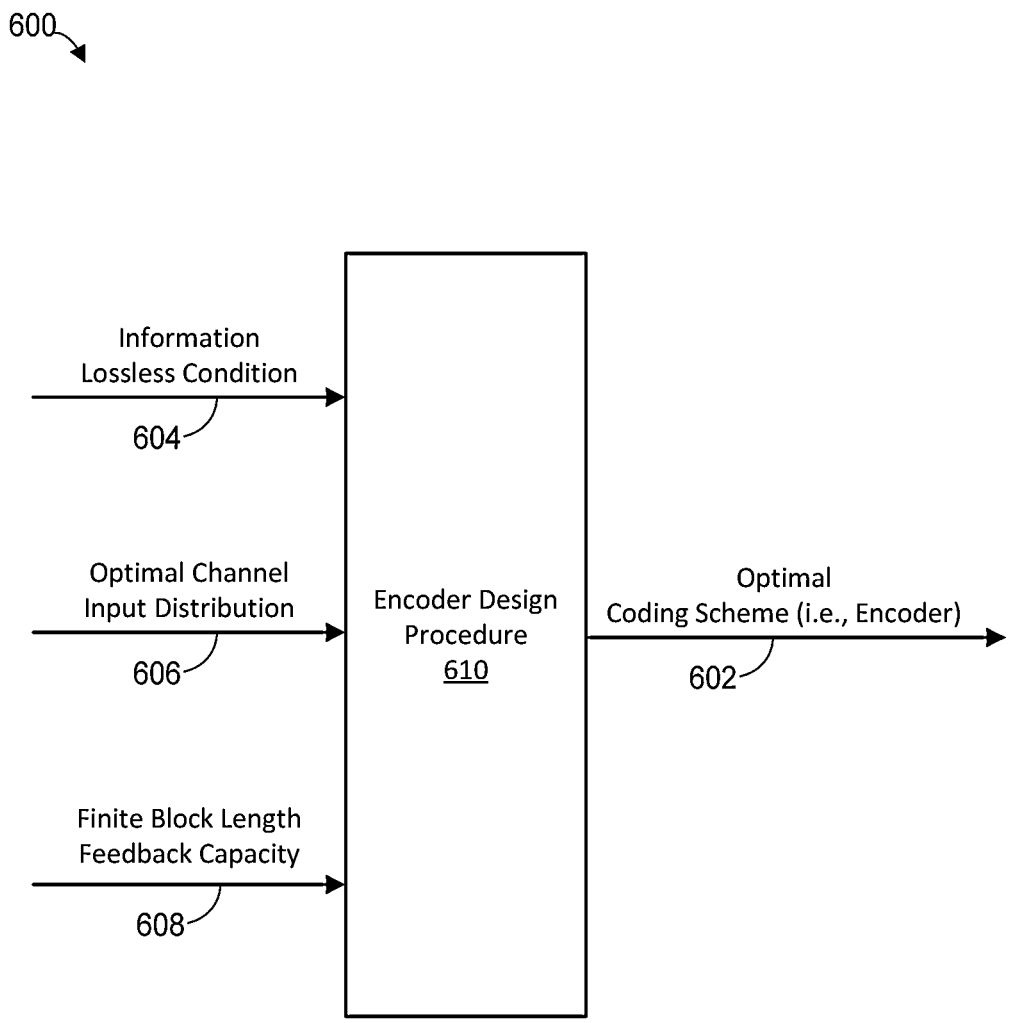
FIG. 6 illustrates an example process for designing an information lossless encoder, which encoder may be implemented in the system illustrated in FIG. 1.

FIG. 6 illustrates an example process 600 for designing an information lossless encoder for a particular channel, such as the channel 106. The information lossless encoder 602 designed according to the process 600 may achieve capacities, such as finite block length feedback capacities, feedback capacities, finite block length feedback capacities with transmission cost, feedback capacities with transmission cost, finite block length capacities without feedback, capacities without feedback, finite block length capacities without feedback and with transmission cost, and capacities without feedback and with transmission cost. These types of capacities are further described in sections B.2. and B.3. entitled "Capacity Without Feedback" and "Capacity With Feedback," respectively. A computing device, such as the computing device illustrated in detail in FIG. 15, may be specially and/or specifically configured (e.g., by one or more algorithms, routines, modules, or engines) to implement at least a portion of the process 600. Further, components of the example communication system 100, such as the encoder 104, may be configured according to the output of the process 600.

In the process 600, an information lossless condition 604, a characterization of capacity 606 (e.g., finite block length feedback capacity), and an optimal channel input distribution 608 are input into an encoder design procedure 610. The characterization of capacity 606 and the optimal channel input distribution 608 may be generated according to an implementation of the two-step procedure (described with reference to FIGS. 2, 3, 4, and 5). The information lossless condition 604 may be defined based on a desired inevitability of the resulting information lossless encoder 602. Specifically, the information lossless condition 604 may be defined, for a give class of channels, in terms of directed information measures, as discussed in further detail below with reference to example classes of channels.

The encoder design procedure 610 may, based on the information lossless condition 604, the characterization of capacity 606, and the optimal channel input distribution 608, generate the information lossless encoder 602. The information lossless encoder 602 may be utilized in an implementation of the system 100 as encoder 104, for example. Also, although not emphasized in the below description, decoders corresponding to the information lossless encoder 602 may also be generated by the encoder design procedure 610 based on the information lossless condition. In this manner, computing devices and/or operators of communication systems may design encoding and decoding processing for a communication system, such as the system 100.

Figure 7:
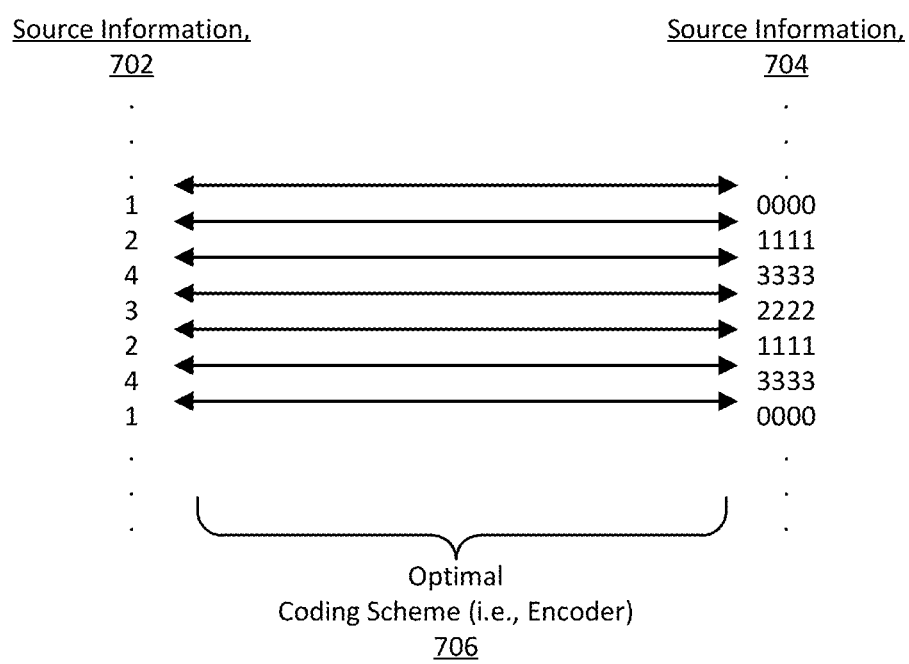
FIG. 7 illustrates an example encoding scheme which may be implemented by an information lossless encoder designed according to the process illustrated in FIG. 6.

Generally, an encoding process may encode received symbols $x^n$ from a source, such as the source 102, into channel input symbols $a^n \triangleq \{a_0, a_1, \ldots, a_n\}$, $a_j \in X_j$, where $j=0, 1, \ldots, n$, as further discussed with reference to FIG. 1. FIG. 7 illustrates such a procedure. In source information 702, such as sampled speech signals, digital representations of photographs, etc., may be encoded by an encoder 706 to produce encoded symbols 704. As illustrated by the arrows in FIG. 7, this encoder 706 implements an encoding scheme that is invertible. That is, the encoded symbols 704 may be mapped back to the source information 702, and, thus, no information is lost (i.e., the encoder is "information lossless").

Although FIG. 7 illustrates certain information, symbols, and mapping by way of example, implementations of information lossless encoders may encode any suitable types and formats of data for transmission over a channel other than those illustrated in FIG. 7. Further, encoding schemes may map any number of received symbols from a source to any number of encoded symbols.

Figure 8:
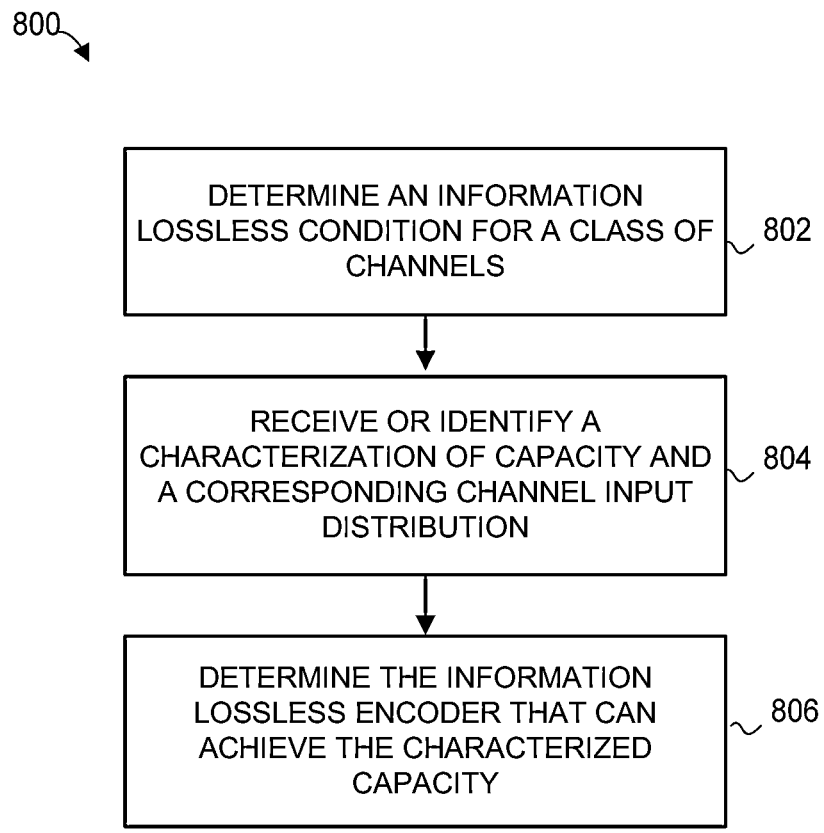
FIG. 8 is a flow diagram of an example method for designing a capacity achieving and information lossless encoder, which encoder may be implemented in the system illustrated in FIG. 1.

FIG. 8 is a flow diagram of an example method 800 for designing a capacity achieving and information lossless encoder. A computing device, such as the computing device illustrated in detail in FIG. 15, may be specially and/or specifically configured to implement at least a portion of the method 800. Further, in some implementations, a suitable combination of a computing device and an operator of a communication system, such as the communication system 100, may implement the method 800.

In the method 800, an information lossless condition is determined for a class of channels (block 802). For example, a computing device or operator may determine an information lossless condition for one or more of the classes of channel described in section B.1. entitled "Characterizing Channels." The determination of the information lossless condition may include utilizing a general definition of information lossless encoders along with properties of a channel defined in a channel model to generate one or more specific information lossless conditions for a specific class of channels. Example determinations utilizing this procedure are discussed further below for example channels in classes A, B, and C (as defined in described in section B.1).

The method 800 may also include receiving a characterization of channel capacity and a corresponding channel input distribution (block 804). The characterization of channel capacity and corresponding input distribution may correspond to the class of channels associated with the information lossless conditions determined at block 802. The characterization or formula for the capacity may be a characterization or formula for a finite block length feedback capacity, feedback capacity, finite block length feedback capacity with transmission cost, feedback capacity with transmission cost, finite block length capacity without feedback, capacity without feedback, finite block length capacity without feedback and with transmission cost, and capacity without feedback and with transmission cost. Further, the characterization of channel capacity and corresponding channel input distribution may be an output from the two-step procedure (described with reference to FIGS. 2, 3, 4, and 5).

A computer device and/or operator of a communication system may then utilize the information lossless condition(s), characterization of channel capacity, and channel input distribution to determine an encoding scheme (block 806). That is, the computer device and/or operator may design the encoding scheme based on both properties of the channel (e.g., capacity and optimal channel input distribution) and necessary and sufficient conditions for any encoder to achieve the capacity of a channel with memory. Certain of these optimal or capacity achieving encoding schemes for specific classes of channels are discussed in sections B.6.1.2.2., B.6.2.2., and B.7.1.2.

C.2. Example Information Lossless Conditions

For further clarification and by way of example, the section below include necessary and sufficient conditions for any encoder of example classes A and B to be information lossless. Based on these conditions and based on characterizations of capacities and optimal channel input distributions, computing devices and/or operators may design encoders for transmission of information over channels in the example classes A and B. The example corresponding to class A includes an encoder with feedback and the example corresponding to class B includes an encoder without feedback.

C.2.1. Feedback Encoder Corresponding to Example Class a

A feedback encoder corresponding to the example class A (e.g., class A channels) may be referred to herein as $$e^n \in \mathcal{E}_{[0,n]}$$

The information structure entering the example encoder at any time i may be expressed as $\{a^{i-1}, x^i, b^{i-1}\}$.

By substituting $a^{i-1}$ recursively into the right side of $$a_i = e_i(a^{i-1}, x^i, b^{i-1})$$

then $$a_i = e_i(a^{i-1}, x^i, b^{i-1}) = \bar{e}_i(x^i, b^{i-1}), i=0, \ldots, n.$$

Thus, for any feedback encoder of example class A, the information structure of the encoder at each time instant i is:

$$\mathcal{I}_i^e \triangleq \{a^{i-1}, x^i, b^{i-1}\} \equiv \{x^i, b^{i-1}\}, i=0, \ldots, n,$$

and this information structure is the most general classical information structure among all possible deterministic nonanticipative encoders with feedback.

Given any feedback encoder of example Class A, an encoder and any source and channel disributions, the information from the source to the channel output is the directed information defined by $$I(X^n \to B^n) \triangleq \sum_{i=0}^{n} I(X^i; B_i | B^{i-1}) \stackrel{(a)}{=} \sum_{i=0}^{n} I(X^i, A^i; B_i | B^{i-1})$$

Also, given any encoder of Class A, the following chain rule of conditional mutual information holds:

$$I(X^i; B_i | B^{i-1}) = I(X^i, A^i; B_i | B^{i-1})$$
$$= I(A_i; B_i | B^{i-1}) + I(X^i; B_i | B^{i-1}, A^i),$$
$$i = 0, 1, \ldots, n$$
$$\geq I(A^i; B_i | B^{i-1}), i = 0, 1, \ldots, n$$

where the inequality is due to the nonnegativity of conditional mutual information. In fact, the following stronger version of this expression holds:

For any $e^n \in \mathcal{E}_{[0,n]}$ then $$\log\left(\frac{P_{B_i|B^{i-1},X^i}}{P_{B_i|B^{i-1}}}\right) = \log\left(\frac{P_{B_i|B^{i-1},A^i}}{P_{B_i|B^{i-1}}}\right) + \log\left(\frac{P_{B_i|B^{i-1},A^i,X^i}}{P_{B_i|B^{i-1},A^i}}\right), i = 0, 1, \ldots, n.$$

A feedback encoder of example class A is "information lossless" with respect to the directed information measures $$I(X^n \to B^n) \text{ and } I(A^n \to B^n)$$

if $$I(X^n \to B^n) = I(A^n \to B^n), \forall e^n \in \mathcal{E}_{[0,n]}^{IL} \subseteq \mathcal{E}_{[0,n]}.$$

A sufficient condition for a feedback encoder of example Class A to be "information lossless" according to this definition is based on the following conditional independence:

$$X^i \leftrightarrow (A^i, B^{i-1}) \leftrightarrow B_i, i=1, \ldots, n. \qquad \text{MC1:}$$

Given any feedback encoder of example class A, if $$X^1 \leftrightarrow (A^i, B^{i-1}) \leftrightarrow B_i \text{ then } I(X^i, B_i | B^{i-1}, A^i) = 0,$$

and the following identify holds:

$$I(X^i; B_i | B^{i-1}) = I(A^i; B_i | B^{i-1}), i = 0, 1, \ldots, n.$$

Hence, any class of functions which induces MC1 or equivalently, induces the conditional independence on the sequence of channel conditional distributions $$P_{B_i | B^{i-1}, A^i, X^i} = P_{B_i | B^{i-1}, A^i}, i = 0, 1, \ldots, n$$

is an information lossless class of functions.

Sufficient conditions (and also necessary) for any class of functions to be an information lossless class, for a feedback encoder of example class A channel, may be expressed as follows:

Class A Encoder is Information Lossless if
for fixed $b^{-1} \in \mathbb{B}^{-1}$, $e_0(\Phi, b^{-1}): \mathbb{X}_0 \longmapsto \mathbb{A}_0$ is one-to-one, onto $\mathbb{A}_0$,
and its inverse $\phi_0 \triangleq e_0^{-1}(\bullet, b^{-1}): \mathbb{A}_0 \longmapsto \mathbb{X}_0$ is measurable,
for fixed $(a_0, x_0, b^{-1}, b_0) \in \mathbb{A}_0 \times \mathbb{X}_0 \times \mathbb{B}^{-1} \times \mathbb{B}_0$, $e_1(a_0, x_0, \bullet, b^{-1}, b_0): \mathbb{X}_1 \longmapsto \mathbb{A}_1$
is one-to-one onto $\mathbb{A}_1$, and its inverse $\phi_1 \triangleq e_1^{-1}(a_0, \bullet, x_0, b^{-1}, b_0): \mathbb{A}_1 \longmapsto \mathbb{X}_1$ is measurable
for any $i = 2, 3, \ldots, n$,
for fixed $(a^i, x^{i-1}, b^{i-1}) \in \mathbb{A}^i \times \mathbb{X}^{i-1} \times \mathbb{B}^{i-1} \times \mathbb{B}_i$, $e_i(a^i, x^{i-1}, \bullet, b^{i-1}): \mathbb{X}_i \longmapsto \mathbb{A}_i$ is one-to-one, onto $\mathbb{A}_i$, and its inverse $\phi_i \triangleq e_i^{-1}(a^{i-1}, \bullet, x^{i-1}, b^{i-1}): \mathbb{A}_i \longmapsto \mathbb{X}_i$ is measurable.

All of the examples of capacity achieving encoders with feedback, discussed in the above sections, satisfy these necessary and sufficient conditions and are, thus, information lossless This class of Information Lossless encoders also satisfies the following conditional independence:

$$A^i \leftrightarrow (X^i, B^{i-1}) \leftrightarrow B_i, i = 0, 1, \ldots, n. \quad \text{MC2}$$

Still further, the following stronger identity holds for the information lossless encoders:

$$\forall e^n \in \mathcal{E}_{[0,n]}^{IL} \text{ then } \log\left(\frac{P_{B_i | B^{i-1}, X^i}}{P_{B_i | B^{i-1}}}\right) = \log\left(\frac{P_{B_i | B^{i-1}, A^i}}{P_{B_i | B^{i-1}}}\right), i = 0, 1, \ldots, n.$$

C.2.2. Encoders without Feedback Corresponding to Example Class B

An encoder without feedback corresponding to the example class B may be referred to herein as $$e^n \in \mathcal{E}_{[0,n]}^{nfb},$$

The information structure entering the example encoder without feedback at any time i may be expressed as $\{a^{i-1}, x^i\}$.

By substituting $a^{i-1}$ recursively into the right side of $$a_i = e_i(a^{i-1}, x^i)$$

then $$a_i = e_i(a^{i-1}, x^i) \equiv \bar{e}_i(x^i), i = 0, \ldots, n.$$

Thus, for any encoder without feedback of example class B, the information structure of the encoder at each time instant i is:

$$\mathcal{I}_i^{e, nfb} \triangleq \{a^{i-1}, x^i\} \equiv \{x^i\}, i = 0, \ldots, n,$$

and this information structure is the most general classical information structure among all possible deterministic nonanticipative encoders.

Given any encoder without feedback of example Class B and any source and channel distributions, the information from the source to the channel output is the mutual information defined by $$I(X^n; B^n) = \sum_{i=0}^{n} I(X^n; B_i | B^{i-1}) = \sum_{i=0}^{n} I(X^i; B_i | B^{i-1}) \stackrel{(a)}{=} \sum_{i=0}^{n} I^e(X^i, A^i; B_i | B^{i-1})$$

An encoder without feedback of example class B is "information lossless" with respect to the directed information measures $$I(X^n; B^n) \text{ and } I(A^n; B^n)$$

if $$I(X^n; B^n) = I(A^n; B^n), \forall e^n \in \mathcal{E}_{[0,n]}^{IL, nfb} \subseteq \mathcal{E}_{[0,n]}^{nfb}.$$

Sufficient conditions (and also necessary) for any class of functions to be an information lossless class, for an encoder without feedback of example class B, may be expressed as follows:

Class B Encoder is information Lossless if
$e_0(\bullet): \mathbb{X} \longmapsto \mathbb{A}_0$ is one-to-one, onto $\mathbb{A}_0$,
and its inverse $\phi_0 \triangleq e_0^{-1}(\bullet) \cdot \mathbb{X}_0 \longmapsto \mathbb{X}_0$ is measurable
for fixed $(a_0, x_0) \in \mathbb{A}_0 \times \mathbb{A}_0$, $e_1(a_0, x_0, \bullet): \mathbb{X}_1 \longmapsto \mathbb{A}_1$
is one-to-one, onto $\mathbb{A}_1$, and its inverse $\phi_1 \triangleq e_1^{-1}(a_0, \bullet, x_0): \mathbb{A}_1 \longmapsto \mathbb{X}_1$ is measurable for any $i = 2, 3, \ldots, n$,
for fixed $(a^i, x^{i-1}) \in \mathbb{A}^i \times \mathbb{X}^{i-1}$, $e_i(a^i, x^{i-1}, \bullet): \mathbb{A}_i \longmapsto \mathbb{X}_i$
is one-to-one, onto $\mathbb{A}_i$, and its inverse $\phi_i \triangleq e_i^{-1}(a^{i-1}, \bullet, x^{i-1}): \mathbb{A}_i \longmapsto \mathbb{X}_i$ is measurable.

Still further, the following stronger identity holds for the information lossless encoders:

$$\forall e^n \in \mathcal{E}_{[0,n]}^{IL, nfb} \text{ then } \log\left(\frac{P_{B_i | B^{i-1}, X^i}}{P_{B_i | B^{i-1}}}\right) = \log\left(\frac{P_{B_i | B^{i-1}, A^i}}{P_{B_i | B^{i-1}}}\right), i = 0, 1, \ldots, n.$$

D. Compressing Information with Zero-Delay

The below-discussed compressions of information with zero-delay utilize a "nonanticipative" (e.g., zero-delay) rate distortion function (RDF). This function along with various other relevant quantities are defined and discussed below before specifying a number of example compression schemes. Also, in the following discussion, a "non-stationary" source may refer to a source of information, such as the source 102, that varies in time.

D.1. Nonanticipative RDF of Non-Stationary Sources

Generally, an RDF may define an manner in which data is to be sent over a channel, such as the channel 106. For example, an RDF may define a number of bits per symbol of information that should be sent over a channel. The manner in which data is sent over a particular channel may be optimal or not depending on the particular RDF that defines compression for the particular channel. For example, to achieve a capacity, such as the capacities discussed in section B, a compression of information may utilize a nonanticipative RDF, as discussed below.

A nonanticipative RDF may be defined in terms of a "source distribution," a "reproduction distribution," and a "fidelity of reproduction," in an implementation. The source distribution may be a collection of conditional probability distributions:

$$\{P_{X_t|X^{t-1}}(dx_t|x^{t-1}):t=0,1,\ldots,n\}.$$

The reproduction distribution may also be a collection of conditional probability distributions:

$$\{P_{Y_t|Y^{t-1},X^t}(dy_t|y^{t-1},x^t):t=0,1,\ldots,n\}.$$

Also, to express the nonanticipative RDF, the following family of causal conditional distributions are defined:

$$\vec{P}_{Y^n|X^n}(dy^n|x^n) \triangleq \otimes_{t=0}^n P_{Y_t|Y^{t-1},X^t}(dy_t|y^{t-1},x^t).$$

Given the source distribution and reproduction distribution, the "joint distribution" is given by:

$$P_{X^n,Y^n}(dx^n,dy^n) \triangleq P_{X^n}(dx^n) \otimes \vec{P}_{Y^n|X^n}(dx^n,dy^n),$$

and the "marginal distributions" are given by:

$$P_{Y^n}(dy^n) \triangleq \int_{X^n} P_{X^n}(dx^n) \otimes \vec{P}_{Y^n|X^n}(dy^n|x^n).$$

The distortion function of reproducing $x_t$ by $y_t$, for $t=0, 1, \ldots, n$, may be a measurable function:

$$d_{0,n}: \mathcal{X}_{0,n} \times \mathcal{Y}_{0,n} \longmapsto [0,\infty], d_{0,n}(x^n,y^n) = \Sigma_{t=0}^n \rho_t(T^t x^n, T^t y^n),$$

where, $$T^t x^n \triangleq \{x_0, x_1, \ldots, x_t\}, T^t y^n \triangleq \{y_0, y_1, \ldots, y_t\}, t=0,1,\ldots,n.$$

The fidelity set of reproduction conditional distributions is then defined by:

$$\vec{\mathcal{Q}}_{0,n}(D) \triangleq$$

$$\left\{ \vec{P}_{Y^n|X^n}(\cdot \mid x^n): \frac{1}{n+1} \int_{X_{0,n} \times Y_{0,n}} d_{0,n}(x^n, y^n) P_{X^n,Y^n}(dx^n, dy^n) \leq D \right\}$$

where $D \geq 0$.

The information measure of the nonanticipative RDF may be a special case of directed information defined by:

$$I_{P_{X^n}}(X^n \to Y^n) \triangleq$$

$$\int \log\left(\frac{\vec{P}_{Y^n|X^n}(dy^n \mid x^n)}{P_{Y^n}(dy^n)}\right) P_{X^n,Y^n}(dx^n, dy^n) \equiv \mathbb{I}_{X^n \to Y^n}\left(P_{X^n}, \vec{P}_{Y^n|X^n}\right).$$

The finite time nonanticipative RDF may be defined by:

$$R_{0,n}^{na}(D) \triangleq \vec{P}_{Y^n|X^n \in \vec{\mathcal{Q}}_{0,n}(D)}^{\inf} \mathbb{I}_{X^n \to Y^n}\left(P_{X^n}, \vec{P}_{Y^n|X^n}\right).$$

and the nonanticipative RDF rate may be defined by:

$$R^{na}(D) = \lim_{n \to \infty} \frac{1}{n+1} R_{0,n}^{na}(D)$$

This RDF function may specify that $R^{na}(D)$ bits/symbol are to be transmitted over a channel, such as the channel 106, such that the distortion does not exceed D. The distortion D may be represented by any suitable distortion measure, such as the Hamming distortion measure, the squared-error distortion measure, etc.

D.2. Methods for Compressing Information with Zero-Delay

Figure 9:
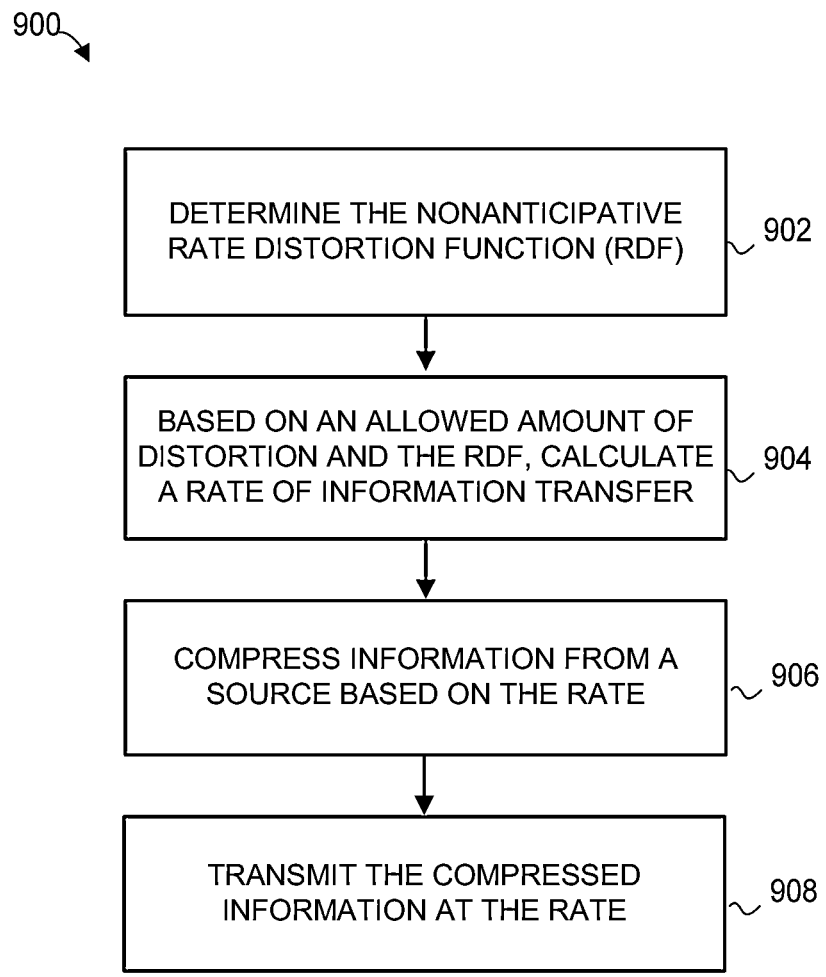
FIG. 9 is a flow diagram of an example method for determining and utilizing a rate distortion function, which function may be utilized to configure the system illustrated in FIG. 1.

FIG. 9 is a flow diagram of an example method 900 for compressing information with zero-delay (e.g., for use in real-time communications). A computing device, such as the computing device illustrated in detail in FIG. 15, may be specially and/or specifically configured to implement at least a portion of the method 900. Further, in some implementations, a suitable combination of a computing device, an operator of a communication system, such as the communication system 100, and one or more other suitable components of a communication system (e.g., routers, modems, gateways, etc.) may implement the method 900.

In the method 900, a computing device and/or operator of a communications system determines a nonanticipative rate distortion function (RDF) (block 902). The nonanticipative RDF may be a function, as described above in section D.1, that is not dependent on all transmitted symbols over a channel. Rather, the nonanticipative RDF may be causal in that the nonanticipative RDF only depends on previously transmitted information over a channel. In this manner the determined nonanticipative RDF is zero-delay.

In some implementations, a computer and/or operator of a communications system may determine the nonanticipative RDF according to the definitions in section D.1 and further characterize the nonanticipative RDF according to properties of the channel over which information is to be transmitted. For example, a computer or operator may characterize the nonanticipative RDF according to a properties of an AWGN channel, as further discussed in various examples presented below. In any event, the method 900 includes determining a nonanticipative RDF, where the nonanticipative RDF may be expressed in any suitable form including a general form for any suitable channel or a more specific characterization according to properties of a specific channel.

The method 900 also includes determining a rate of information transfer based on the RDF and an allowed amount of distortion (block 904). In some implementations, the allowed amount of distortion may be a number or expression representing an amount of distortion (e.g., Hamming or squared-error distortion) of information transmitted over one or more channels. The computer or operator of a communications system may determine the allowed amount of distortion based on a desired performance (e.g., efficiency) of transmitting information and/or based on desired qualities of the received information after transmission. For example, for information representing speech, an operator of a communication system may specify (e.g., by configuring a computer to compress information) an allowed amount of distortion such that transmitted speech signals are understandable to a human after being decoded.

The computer and/or operator may provide the allowed amount of distortion to the determined nonanticipative RDF (e.g., as input) to determine the rate of information transfer, which rate corresponds to the allowed amount of distortion. In other words, when the allowed amount of distortion is provided to the nonanticipative RDF, the nonanticipative RDF produces a corresponding rate of information transfer. If information is transferred over a channel at this rate, the information will be distorted (e.g., according to a squared-error distortion) at a level at or below the allowed amount of distortion. The computer and/or operator implementing portions of the method 900 may express the rate as a number of bits per source symbol, a number of bytes per source symbol, or any other suitable amount of data per symbol of source information.

In some implementations, the computer and/or operator may utilize a buffer or range in determining the rate of information transfer. For example, instead of utilizing one allowed amount of distortion, the computer and/or operator may determine a range of information transfer rates (e.g., bits/symbol) based on an allowed range of distortions. In other examples, the computer and/or operator may determine a rate of information transfer based on a proxy amount of distortion, which proxy defines a buffer between an actual allowed amount of distortion and the proxy amount.

Still further, the method 900 includes compressing information from a source according to the determined rate (block 906). The computing device implementing at least this portion of block 900 may apply any number of suitable compression methods to compress information from a source of information, such as the source 102, such that the compressed information results in a rate (e.g., bits/symbol) at or less than the rate determined at block 904. Example compression methods may include, by way of example, A-law algorithms, code-excited linear predictions, linear predictive coding, mu-law algorithms, block truncation coding, fast cosine transform algorithms, set partitioning in hierarchical trees, etc. Alternatively, a computing device may utilize a coding scheme designed according to the JSCC methods discussed herein to simultaneously compress and encode information from a source.

The method 900 still further includes transmitting the compressed information at the determined rate (block 908). Once compressed, components of a communication system, such as the system 100, may transmit the compressed information at the determined rate. In some implementations, this may include further encoding of the compressed information, and, in other implementations utilizing JSCC, the compressed information may already be encoded for optimal transmission over a channel.

D.3. Closed Form Expressions for a Finite-Time Nonanticipative RDF

As discussed in section D.1, a finite-time (e.g., not taking an infinite number of transmissions) expression for the nonanticipative RDF may include an infimum. Below, closed-form expressions are presented for a nonstationary optimal reproduction conditional distribution, which distribution attains the infimum of the finite-time nonanticipative RDF, $R_{0,n}^{na}(D)$.

D.3.1. Optimal Reproduction Conditional Distribution for the Nonanticipative RDF If the infimum of RZ (D) is attained at:

$$\{P_{Y_t|Y^{t-1},X^t}^*(\bullet|y^{t-1},x^t), t=0,\ldots,n\}$$

then $R_{0,n}^{na}(D)$ satisfies the following backward in time recursive equations:

For t=n:

$$P_{Y_n|Y^{n-1},X^n}^*(dy_n \mid y^{n-1}, x^n) = \frac{e^{s\rho_n(T^n x^n, T^n y^n)} P_{Y_n|Y^{n-1}}^*(dy_n \mid y^{n-1})}{\int_{Y_n} e^{s\rho_n(T^n x^n, T^n y^n)} P_{Y_n|Y^{n-1}}^*(dy_n \mid y^{n-1})}.$$

where s<0 is the Lagrange multiplier of the fidelity, and For t=n−1, n−2, ..., 0:

$$P_{Y_t|Y^{t-1},X^t}^*(dy_t \mid y^{t-1}, x^t) = \frac{e^{s\rho_t(T^t x^n, T^t y^n) - g_{t,n}(x^t,y^t)} P_{Y_t|Y^{t-1}}^*(dy_t \mid y^{t-1})}{\int_{Y_t} e^{s\rho_t(T^t x^n, T^t y^n) - g_{t,n}(x^t,y^t)} P_{Y_t|Y^{t-1}}^*(dy_t \mid y^{t-1})}$$

where $g_{t,n}(x^t, y^t)$ is given by:

$$g_{t,n}(x^t,y^t) = -\int_{\mathcal{X}_{t+1}} P_{X_{t+1}}(dx_{t+1}|X^t) \log(\int_{\mathcal{Y}_{t+1}} e^{s\rho_{t+1}} (T^{t+1}x^n, T^{t+1}y^n) - g_{t+1,n}(x^{t+1},y^{t+1}) P_{Y_{t+1}|Y_t}^*(dy_t|y^t))$$

and the finite time nonanticipative RDF is given by:

$$R_{0,n}^{na}(D) =$$

$$sD(n+1) - \sum_{t=0}^{n} \int_{X^t \times Y^{t-1}} \Bigg\{ \int_{Y_t} g_{t,n}(x^t, y^t) P_{Y_t|Y^{t-1},X^t}^*(dy_t \mid y^{t-1}, x^t) + $$

$$\log\Bigg(\int_{Y_t} e^{s\rho_t(T^t x^n, T^t y^n) - g_{t,n}(x^t,y^t)} P_{Y_t|Y^{t-1}}^*(dy_t \mid y^{t-1})\Bigg)\Bigg\} \otimes$$

$$P_{X_t|X^{t-1}}(dx_t \mid x^{t-1}) \otimes P_{X^{t-1},Y^{t-1}}(dx^{t-1}, dy^{t-1}).$$

If $R_{0,n}^{na}(D) > 0$, then s<0, and $$\frac{1}{n+1} \Sigma_{t=0}^n \int \rho_t(T^t x^n, T^t y^n) P_{X^t,Y^t}(dx^t, dy^t) = D.$$

D.3.2. Information Structures of the Nonanticipative RDF

From the above expressions, given any source distribution, a computing device and/or operator of a communication system may identify a dependence of the optimal nonstationary reproduction distribution on past and present source symbols. However, the above expressions do not immediately yield a dependence on past reproduction symbols, referred to herein as "information structures." Regarding this dependence, the following observations are presented:

(1) The dependence of $P_{Y_n|Y^{n-1},X^n}^*(dy_n|y^{n-1},x^n)$ on $x^n \in \mathcal{X}_{0,n}$ is determined by the dependence of $\tilde{\rho}_n(T^n x^n, T^n y^n)$ on $x^n \in \mathcal{X}_{0,n}$ as follows:

(2) If $\rho_n(T^n x^n, T^n y^n) = \tilde{\rho}(x_n, y^n)$ then $P_{Y_n|Y^{n-1},X^n}^*(dy_n|y^{n-1}, x^n) = P_{Y_n|Y^{n-1},X_n}^*(dy_n|y^{n-1}, x_n)$, while for t=n−1, n−2, ..., 0. the dependence of $P_{Y_t|Y^{t-1},X^t}^*(dy_t|y^{t-1},x^t)$ on $x^t \in \mathcal{X}_{0,t}$ is determined by the dependence of $\rho_t(x^t, y^t)$ on $x^t \in \mathcal{X}_{0,t}$ and $g_{t,n}(x^t,y^t)$ on $x^t \in \mathcal{X}_{0,t}$.

(3) If $P_{X_t|X^{t-1}}(dx_t|x^{t-1}) = P_{X_t|X_{t-1}}(dx_t|x_{t-1})$ and $\rho_t(T^t x^n, T^t y^n) = \tilde{\rho}(x_t, y_t)$ then $P_{Y_t|Y^{t-1},X^t}^*(dy_t|y^{t-1},x^t) = P_{Y_t|Y^{t-1},X_t}^*(dy_t|y^{t-1}),x_t)$.

(4) If $g_{t,n}(x^t,y^t) = g_{t,n}(x^t,y^{t-1})$, t=0, ..., n−1, optimal reproduction distribution (IV.227) reduces to $$P_{Y_t|Y^{t-1},X^t}^*(dy_t \mid y^{t-1}, x^t) = \frac{e^{s\rho_t(T^t x^n, T^t y^n)} P_{Y_t|Y^{t-1}}^*(dy_t \mid y^{t-1})}{\int_{Y_t} e^{s\rho_t(T^t x^n, T^t y^n)} P_{Y_t|Y^{t-1}}^*(dy_t \mid y^{t-1})},$$

$$t = 0, 1, \ldots n.$$

D.3.3. Alternative Characterization of the Finite-Time Nonanticipative RDF

To further clarify the dependence of the optimal reproduction distribution on past reproductions, an alternative characterization of $R_{0,n}^{na}(D)$ may include a maximization over a certain class of functions. A computing device and/or operator of a communications system may utilize this alternative characterization to derive lower bounds on $R_{0,n}^{na}(D)$, which bounds are achievable.

The alternative characterization may be expressed as:

$$R_{0,n}^{na}(D) = \sup_{s \leq 0} \sup_{\{\lambda_t \in \Psi_s^t : t=0, \ldots, n\}}$$

$$\left\{ sD(n+1) - \sum_{t=0}^{n} \int_{\mathbb{X}_{0,t} \times \mathbb{Y}_{0,t-1}} \left\{ \int_{\mathbb{Y}_t} g_{t,n}(x^t, y^t) P^*_{Y_t | Y^{t-1}, X^t} dy_t \mid y^{t-1}, x^t \right\} + \log(\lambda_t(x^t, y^{t-1})) \right\} \otimes P_{X_t | X^{t-1}}(dx_t \mid x^{t-1}) \otimes P_{X^{t-1}, Y^{t-1}}(dx^{t-1}, dy^{t-1})$$

where $$\Psi_s^t \triangleq \left\{ \lambda_t(x^t, y^{t-1}) \geq 0 : \int_{\mathbb{X}_{0,t-1}} \left( \int_{\mathcal{X}_t} e^{s \rho_t(T^t x^n, T^t y^n) - g_{t,n}(x^t, y^t)} \lambda_t(x^t, y^{t-1}) P_{X_t | X^{t-1}}(dx_t \mid x^{t-1}) \right) \otimes P_{X^{t-1} | Y^{t-1}}(dx^{t-1} \mid y^{t-1}) \leq 1 \right\}$$

$$g_{n,n}(x^n, y^n) = 0,$$

$$g_{t,n}(x^t, y^t) = -\int_{\mathcal{X}_{t+1}} P_{X_{t+1} | X^t}(dx_{t+1} \mid x^t) \log(\lambda_{t+1}(x^{t+1}, y^t))^{-1},$$

$$t = 0, 1, \ldots, n-1.$$

For $s \in (-\infty, 0]$, a necessary and sufficient condition to achieve the supremum of the above alternative characterization of $R_{0,n}^{na}(D)$ is the existence of a probability measure $$P_{Y_t | Y^{t-1}}^*(dy_t | y^{t-1})$$

such that $$\lambda_t(x^t, y^{t-1}) = \left\{ \int_{\mathcal{Y}_t} e^{s \rho_t(x^t, y^t) - g_{t,n}(x^t, y^t)} P^*_{Y_t | Y^{t-1}}(dy_t | y^{t-1}) \right\}^{-1},$$
$$t = 0, 1, \ldots, n,$$

and such that, $$c(y^t) \triangleq$$

$$\int_{\mathbb{X}_{0,t-1}} \left( \int_{\mathcal{X}_t} e^{s \rho_t(T^t x^n, T^t y^n) - g_{t,n}(x^t, y^t)} \lambda_t(x^t, y^{t-1}) \otimes P_{X_t | X^{t-1}}(dx_t \mid x^{t-1}) \right) \otimes P_{X^{t-1} | Y^{t-1}}(dx^{t-1} \mid y^{t-1}) = 1, t = 0, 1, \ldots, n.$$

The above alternative characterization of $R_{0,n}^{na}(D)$ may allow a computing device and/or operator to compute $R_{0,n}^{na}(D)$ exactly (e.g., as part of the example method 600) for a given source with memory.

D.4. Example Nonanticipative RDF for a Gaussian Source and Optimal Transmission Over an AWGN Channel In an example scenario, the following expression describes a p-dimensional nonstationary Gaussian source process:

$$X_{t+1} = A_t X_t + B_t W_t, \, t = 0, 1, \ldots, n-1$$

where $$A_t \in \mathbb{R}^{p \times p}, B_t \in \mathbb{R}^{p \times k}, \, t = 0, 1, \ldots, n-1.$$

For an Autoregressive Moving Average model with finite tap delays, there may exist a state space representation for some p. For the following example analysis in this scenario, assume:

(G1) $X_0 \in \mathbb{R}^p$ is Gaussian $N(\bar{x}_0, \bar{\lambda}_0)$:
(G2) $\{W_t : t = 0, \ldots, n\}$ is a k-dimensional IID Gaussian $N(0, I_{k \times k})$ sequence, independent of $X_0$:
(G3) The distortion function is single letter defined by $d_{0,n}(x^n, y^n) \triangleq \sum_{t=0}^{n} \|x_t - y_t\|_{\mathbb{R}^p}^2$.

The nonstationary optimal reproduction distribution may be given, for $s \leq 0$, by the following recursive equations:

$$P^*_{Y_n | Y^{n-1}, X_n}(dy_n | y^{n-1}, x_n) = \frac{e^{s\|y_n - x_n\|_{\mathbb{R}^p}^2} P^*_{Y_n | Y^{n-1}}(dy_n | y^{n-1})}{\int_{\mathcal{Y}_n} e^{s\|y_n - x_n\|_{\mathbb{R}^p}^2} P^*_{Y_n | Y^{n-1}}(dy_n | y^{n-1})}$$

$$g_{n,n}(x_n, y^n) = 0$$

$$P^*_{Y_t | Y^{t-1}, X_t}(dy_t | y^{t-1}, x_t) = \frac{e^{s\|y_t - x_t\|_{\mathbb{R}^p}^2 - g_{t,n}(x_t, y^t)} P^*_{Y_t | Y^{t-1}}(dy_t | y^{t-1})}{\int_{\mathcal{Y}_t} e^{s\|y_t - x_t\|_{\mathbb{R}^p}^2 - g_{t,n}(x_t, y^t)} P^*_{Y_t | Y^{t-1}}(dy_t | y^{t-1})},$$
$$t = n-1, n-2, \ldots, 0$$

$$g_{t,n}(x_t, y^t) = -\int_{\mathcal{X}_{t+1}} P_{X_{t+1} | X_t}(dx_{t+1} | x_t)$$

$$\log \left( \int_{\mathcal{Y}_{t+1}} e^{s\|y_{t+1} - x_{t+1}\|_{\mathbb{R}^p}^2 - g_{t+1,n}(x_{t+1}, y^{t+1})} \otimes P^*_{Y_{t+1} | Y^t}(dy_{t+1} | y^t) \right),$$
$$t = n-1, n-2, \ldots, 0.$$

Thus, the optimal reproduction distributions may be conditionally Gaussian, and the optimal reproduction distributions may be realized using a general Gaussian channel with memory, modeled by:

$$Y_t = \bar{A}_t X_t + \bar{B}_t Y^{t-1} + V_t^c, \, t = 0, \ldots, n$$

where $$\bar{A}_t \in \mathbb{R}^{p \times p}, \bar{B}_t \in \mathbb{R}^{p \times tp}, \text{ and } \{V_t^c : t = 0, \ldots, n\}$$

are independent sequences of Gaussian vectors:

$$\{N(0; Q_t) : t = 0, \ldots, n\}.$$

Gaussian error processes may introduce the pre-processing at the encoder and/or decoder, in this example. Let, $$\{K_t : t = 0, \ldots, n\}, K_t \triangleq X_t - \mathbb{E}\{X_t | Y^{t-1}\},$$

denote the covariance of the pre-processing by:

$$\Lambda_t \triangleq \mathbb{E}\{K_t K_t^{tr}\}, \, t = 0, \ldots, n.$$

Also, let $E_t$ be a unitary matrix such that:

$$E_t \Lambda_t E_t^{tr} = \text{diag}\{\lambda_{t,1}, \ldots, \lambda_{t,p}\}, \Gamma_t \triangleq E_t K_t, \, t = 0, \ldots, n.$$

Analogously, to obtain the nonanticipative RDF in this example, the processes:

$$\{\tilde{k}_t : t = 0, \ldots, n\}$$

defined by $$\tilde{K}_t \triangleq Y_t - \mathbb{E}\{X_t | Y^{t-1}\} = Y_t - \hat{X}_{t|t-1}, \tilde{\Gamma}_t = E_t \tilde{K}_t.$$

are introduced. Using properties of conditional entropy, observations for this example scenario include:

$$d_{0,n}(X^n, Y^n) = d_{0,n}(K^n, \tilde{K}^n) = \sum_{t=0}^{n} \|\tilde{K}_t - K_t\|_{\mathbb{R}^p}^2 = \sum_{t=0}^{n} \|\tilde{\Gamma}_t - \Gamma_t\|_{\mathbb{R}^p}^2.$$

and $$R_{0,n}^{na}(D) = R_{0,n}^{na, K^n, \tilde{K}^n}(D) = R_{0,n}^{na, \Gamma^n, \tilde{\Gamma}^n}(D).$$

Using these observation, a computing device and/or operator of a communication system may obtain the optimal (e.g., capacity achieving) nonanticipative RDF for the above defined multidimensional Gaussian process. The computing device and/or operator may also identify a "duality" between a multidimensional Gaussian process and a MIMO AWGN channel. These results are described below by way of example.

The $R_{0,n}^{na}(D)$ of the example Gaussian source, according to the definitions in section D.1 and the above discussed model of the Gaussian source, is given by:

$$R_{0,n}^{na}(D) = \frac{1}{2}\sum_{t=0}^{n}\sum_{i=1}^{p} \log\left(\frac{\lambda_{t,i}}{\delta_{t,i}}\right)$$

$$\Lambda_t \triangleq \mathbb{E}\{(X_t - \mathbb{E}\{X_t \mid Y^{t-1}\})(X_t - \mathbb{E}\{X_t \mid Y^{t-1}\})^{tr}\}, \hat{X}_{t|t-1} \triangleq \mathbb{E}\{X_t \mid Y^{t-1}\}$$

$$\delta_{t,i} \triangleq \begin{cases} \xi & \text{if } \xi \leq \lambda_{t,i} \\ \lambda_{t,i} & \text{if } \xi > \lambda_{t,i} \end{cases}, t = 0, \ldots, n, i = 1, \ldots, p$$

and $\xi$ is chosen such that $\frac{1}{n+1}\sum_{t=0}^{n}\sum_{i=1}^{p}\delta_{t,i} = D$.

where the error $$X_t - \mathbb{E}\{X_t \mid Y^{t-1}\}$$

is Gaussian, and where $\Lambda_t$ are given by the following Kalman filter equations:

$$\hat{X}_{t+1|t} = A\hat{X}_{t|t-1} + A\Lambda_t(E_t^{tr}H_tE_t)^{tr}M_t^{-1}(Y_t - \hat{X}_{t|t-1}), \hat{X}_{0|-1} = \mathbb{E}X_0$$

$$\Lambda_t = A\Lambda_t A^{tr} - A\Lambda_t(E_t^{tr}H_tE_t)^{tr}M_t^{-1}(E_t^{tr}H_tE_t)\Lambda_t A^{tr} + BB_t^{tr}, \Lambda_0 = \bar{\Lambda}_0$$

$$M_t = E_t^{tr}H_tE_t\Lambda_t(E_t^{tr}H_tE_t)^{tr} + E_t^{tr}\mathscr{B}_tQ_t\mathscr{B}_t^{tr}E_t$$

$$H_t \triangleq \text{diag}\{\eta_{t,1}, \ldots, \eta_{t,p}\}, \eta_{t,i} = 1 - \frac{\delta_{t,i}}{\lambda_{t,i}}, Q_t \triangleq \text{Cov}(V_t^c),$$

$$\mathscr{B}_t \triangleq \sqrt{H_t\Delta_tQ_t^{-1}}, \Delta_t = \text{diag}\{\delta_{t,1}, \ldots, \delta_{t,p}\}, i = 1, \ldots, p, t = 0, \ldots n.$$

Moreover, $$\sigma\{Y^t\} = \sigma\{\tilde{K}^t\} = \sigma\{B^t\}, t=0,\ldots,n$$

(i.e., these processes generate the same information).

Figure 10A:
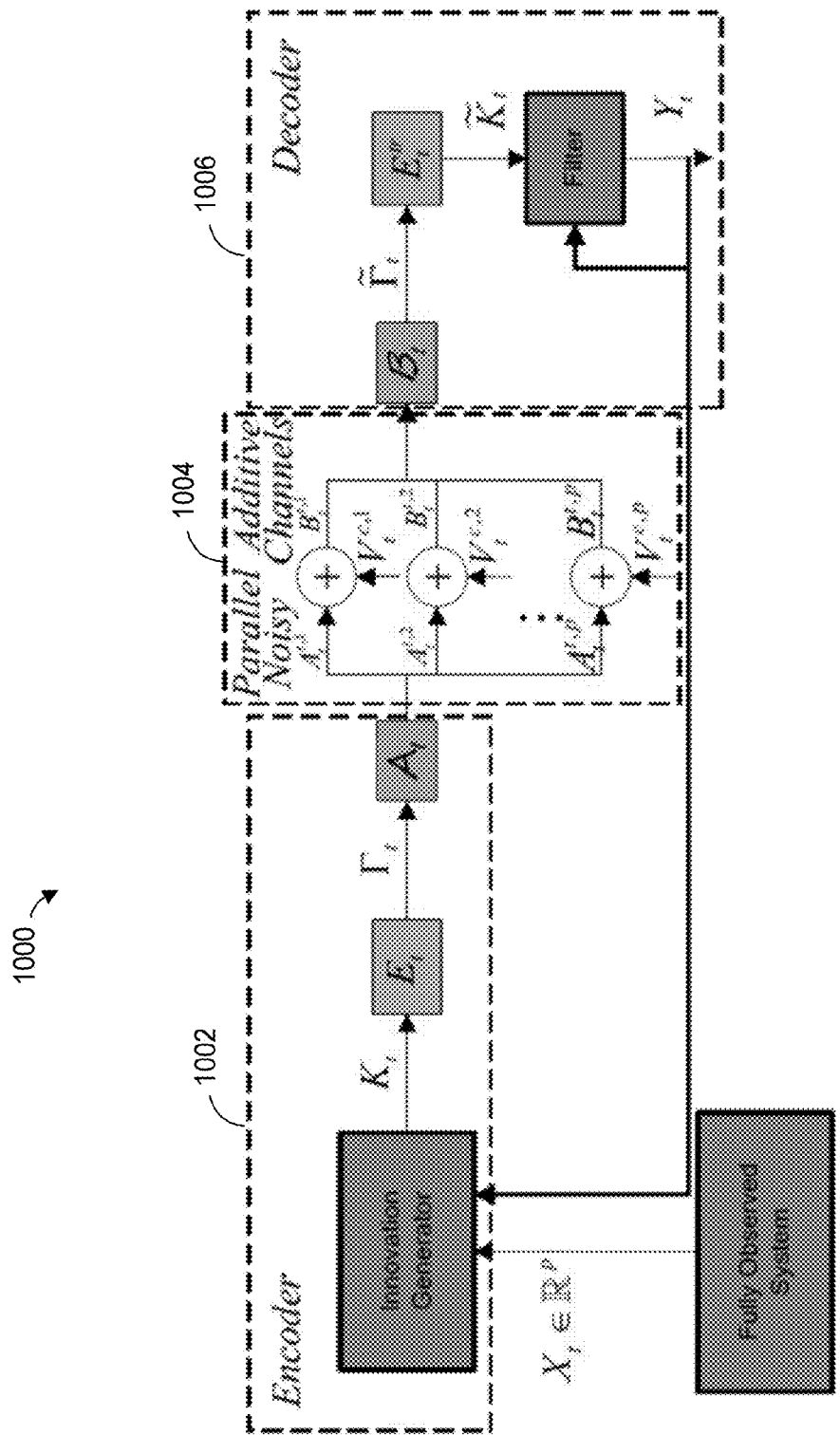
FIG. 10A depicts a combination of components in a communication system 1000 that realizes a rate distortion function, such as a rate distortion function determined in the method of FIG. 9.

FIG. 10A depicts a combination of encoder-channel-decoder in a communication system 1000 that realizes $R_{0,n}^{na}$ (D). That is, information encoded by an encoder 1002, transmitted over one or more channels 1004, and decoded by a decoder 1006 is distorted according to $R_{0,n}^{na}(D)$. A computing device may compress information transmitted over the channels 1004 at a certain rate (e.g., number of bits/symbol), defined by $R_{0,n}^{na}(D)$, to limit distortion of the information below a threshold distortion, as further discussed with reference to FIG. 9. In this example, the realization of the optimal nonstationary reproduction distribution is given by:

$$Y_t = E_t^{tr}H_tE_t(X_t - \hat{X}_{t|t-1}) + E_t^{tr}\mathscr{B}_tV_t^c + X_{t|t-1}$$

The encoder 1002 and decoder 1006 of the system 1000 may encode and decode, respectively, with feedback according to:

$$A_t = E_t^{tr}H_tE^t(X_t - \hat{X}_{t|t-1})$$

$$Y_t = E_t^{tr}H_tE_t\{X_t - \hat{X}_{t|t-1}\} + E_t^{tr}\mathscr{B}_tV_t^c + X_{t|t-1}$$

Alternatively, the encoder 1002 and decoder 1006 of the system 1000 may encode and decode, respectively, without feedback according to:

$$A_t = E_t^{tr}H_tE_t(X_t - \mathbb{E}(X_t))$$

$$Y_t = E_t^{tr}H_tE_t\{X_t - \mathbb{E}(X_t)\} + E_t^{tr}\mathscr{B}_tV_t^c + \mathbb{E}(X_t)$$

By taking a limit of $R_{0,n}^{na}(D)$, a computing device and/or operator may obtain the per unit time nonanticipative RDF $R^{na}(D)$ from $R_{0,n}^{na}(D)$. This $R^{na}(D)$ may represent the rate distortion function of stationary (e.g., not varying in time) Gaussian sources of information, in this example. Specifically, the $R^{na}(D)$ is obtained as follows:

$$R^{na}(D) = \frac{1}{2}\lim_{n\to\infty}\frac{1}{n+1}\sum_{t=0}^{n}\sum_{i=1}^{p}\log\left(\frac{\lambda_{t,i}}{\delta_{t,1}}\right)$$

$$= \frac{1}{2}\sum_{i=1}^{p}\log\left(\frac{\lambda_{\infty,i}}{\delta_{\infty,i}}\right).$$

where
$\lim_{n\to\infty}\delta_{t,i} = \delta_{\infty,i}$ and $\lim_{n\to\infty}\lambda_{t,i} = \lambda_{\infty,i}$.

In addition, for a scalar Gaussian stationary source:

$$X_{t+1} = \alpha X_t + \sigma_W W_t, W_t \sim N(0;1)$$

$$R^{na}(D) = \frac{1}{2}\log\left(\frac{\lambda_{\infty,1}}{\delta_{\infty,1}}\right), \delta_{\infty,1} = D, \lambda_{\infty,1} = \alpha^2 D + \sigma_W^2,$$

$$= \frac{1}{2}\log\left(\alpha^2 + \frac{\sigma_W^2}{D}\right), \lambda_{\infty,1} \geq \delta_{\infty,1}.$$

For an independent and identically distributed (IID) scalar Gaussian source:

$$R^{na}(D) = R(D) = \frac{1}{2}\log\frac{\sigma_X^2}{D}, \sigma_X \geq D$$

Figure 10B:
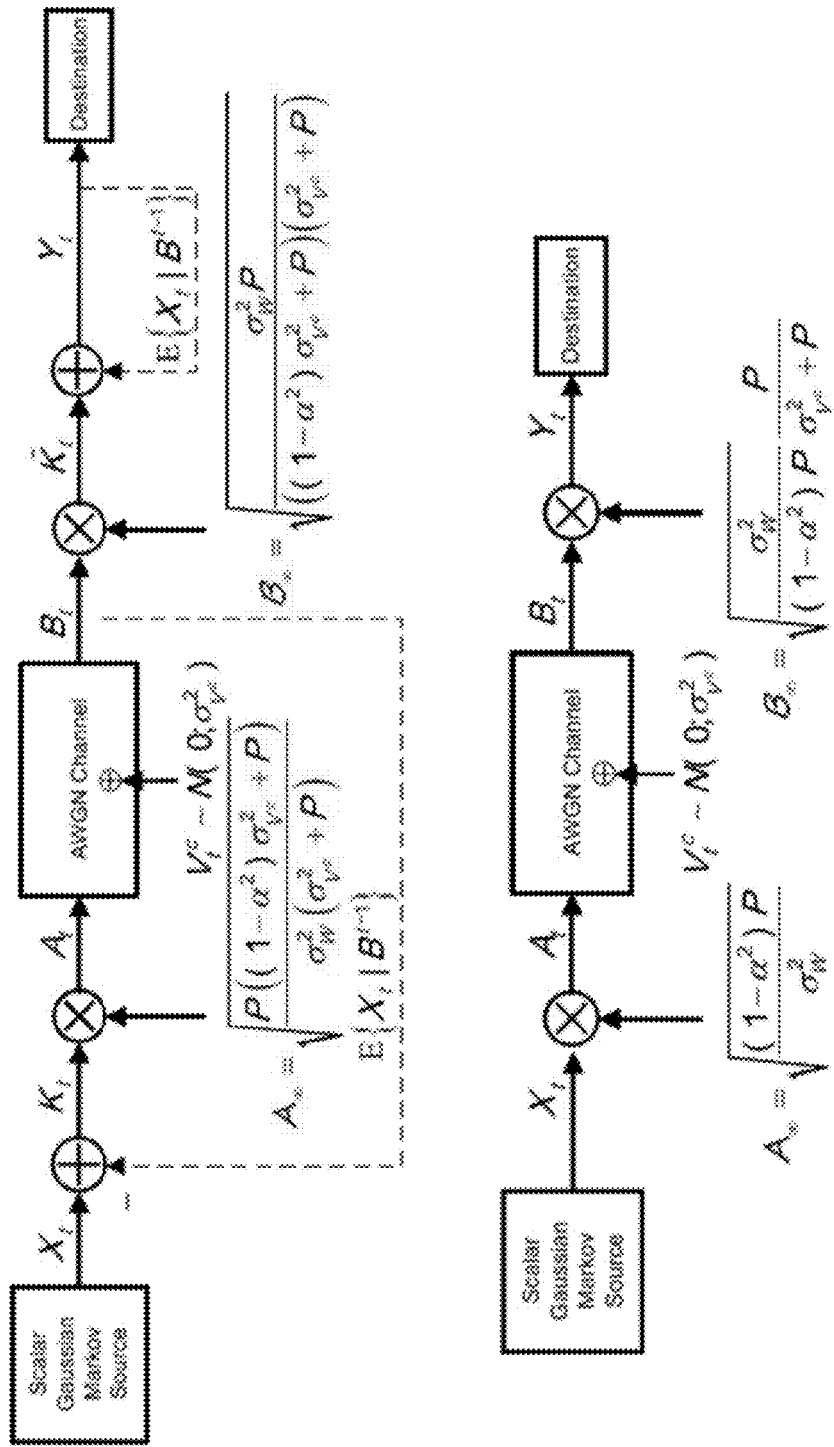
FIG. 10B depicts an example realization of a nonanticipative rate distortion function for a vector of independent sources with memory.

Note, for a vector of independent sources with memory, the nonanticipative RDF involves water filing in the spatial dimension. The realization of these sources over an Additive White Gaussian Noise Channel with an average power constraint not exceeding P is shown in FIG. 10B.

Returning to FIG. 10A, the encoder 1002 may implement the compression scheme for vector correlated sources, and the encoder 1002 may achieve the capacity of a communication system where the source is a Gaussian random process and where information is transmitted over additive white Gaussian noise (AWGN) channels. This encoding may also be equivalent to JSCC design using symbol-by-symbol transmission of a vector Gaussian source with memory over a multiple-input multiple output Gaussian memoryless channel. In this capacity achieving case, the encoded symbols may be expressed with respect to the encoder 1002 which either includes feedback (case (1)) or does not include feedback (case (2)). That is, the special cases (1), (2) below follow from the general nonanticipative RDF of correlated Gaussian sources with a square error distortion function.

(1) Capacity Achieving Realization with Feedback.
Consider the realization of the $$R(D) = R^{na}(D) = \frac{1}{2}\log\frac{\sigma_X^2}{D}$$

(i.e., for IID processes classical RDF=nonanticipative RDF), Let X be a RV $N(0;\sigma_X^2)$ with $\sigma_X \geq D$. Letting p=1, then from (I.V.256)-(IV.257) we have $$\mathcal{A}_t = q_t, \ 1\frac{1}{\delta_{t,1}}\left(1 - \frac{\delta_{t,1}}{\lambda_{t,1}}\right), \ \frac{P_{t,1}}{q_{t,1}} = \frac{\lambda_{t,1}}{\delta_{t,1}} - 1$$

which implies $$B_t = \sqrt{\frac{P_{t,1}}{\lambda_{t,1}}} \, K_t + V_t^c, \, t = 0, \ldots, n.$$

$$\mathcal{A}_t = \sqrt{\frac{P_{t,1}}{\lambda_{t,1}}}, \ \lambda_{t,1} = \mathrm{Var}(X - \mathbb{E}(X \mid B^{i-1})), \ K_t = X - \mathbb{E}(X \mid B^{i-1}),$$

Substituting into the encoder the limiting values, $\delta_{\infty,1} = D$, $\lim_{n \to \infty} q_{t,1} = q_{\infty,1}$, $\lim_{n \to \infty} P_{t,1} = P_{\infty,1} = P$ then for i=0, 1, . . .

$$B_t = \sqrt{\frac{P}{\mathbb{E}\{X - \mathbb{E}(X \mid B^{i-1})\}^2}} \{X - \mathbb{E}(X \mid B^{i-1})\} + V_t^c, \, t = 0, 1, \ldots,$$

(2) Capacity Achieving Realization without Feedback.

When there is no feedback, all state-ments in (1) hold, $\lambda_{\infty,1} = \sigma_X^2$, while $\mathbb{E}(X|B^{i-1})$ is replaced by $\mathbb{E}(X_i|\sigma\{\mathbb{R}\}) = \mathbb{E}(X)$ (i.e, only á priori information is used), and then (IV.264) reduces to $$B_t = \sqrt{\frac{P}{\mathbb{E}\{X_t - \mathbb{E}(X_t)\}^2}} \{X_t - \mathbb{E}(X_t)\} + V_t^c, \, t = 0, 1, \ldots,$$

E. Joint Source Channel Coding Design

The following description may refer to "Joint Source Channel Coding," or JSCC, as a coding/decoding scheme or a design of a coding/decoding scheme that does not separate source encoder and decoders and channel encoders and decoders. Such JSCC may produce a coding scheme that both compresses and encodes data for transmission, where the compression occurs with zero-delay and the compression and encoding allow the transmission to achieve a capacity of a channel.

Figure 11:
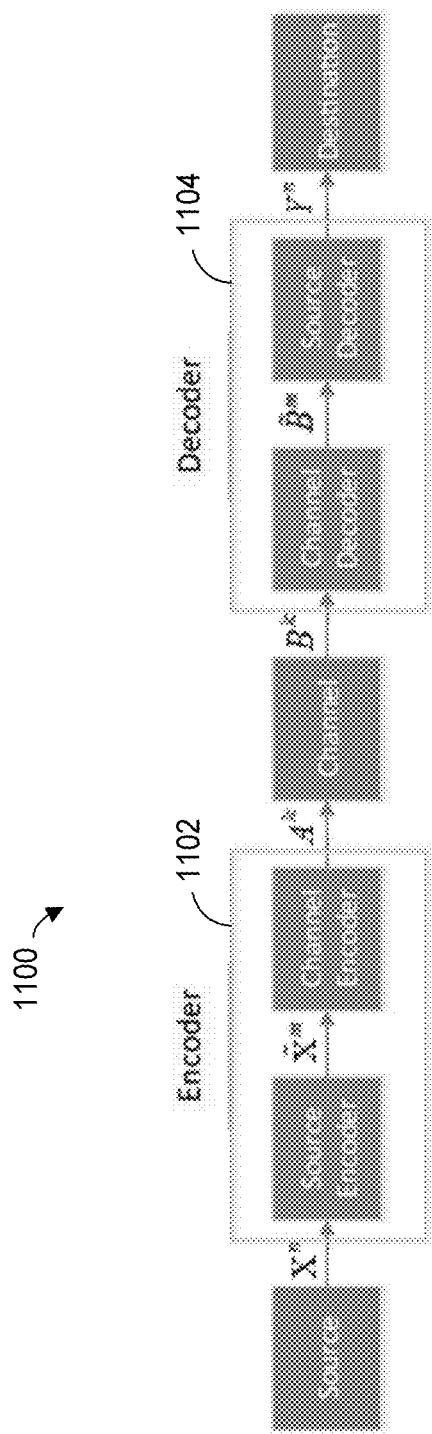
FIG. 11 depicts another example communication system in which encoders and decoders are designed according to joint source channel coding.

To further clarify this point and by way of example, FIG. 11 depicts another example communication system 1100. A JSCC design of an encoder 1102 may not separate the source coding and channel coding of the encoder 1102. That is, the encoder 1102 may include a single code to perform both source coding (e.g., compression) and channel coding (e.g., encoding of the compressed symbols). Similarly, a JSCC design of a decoder 1104 may not separate the source decoding and channel decoding of the decoder 1104.

E.1. Methods for Joint Source Channel Coding Design

Figure 12:
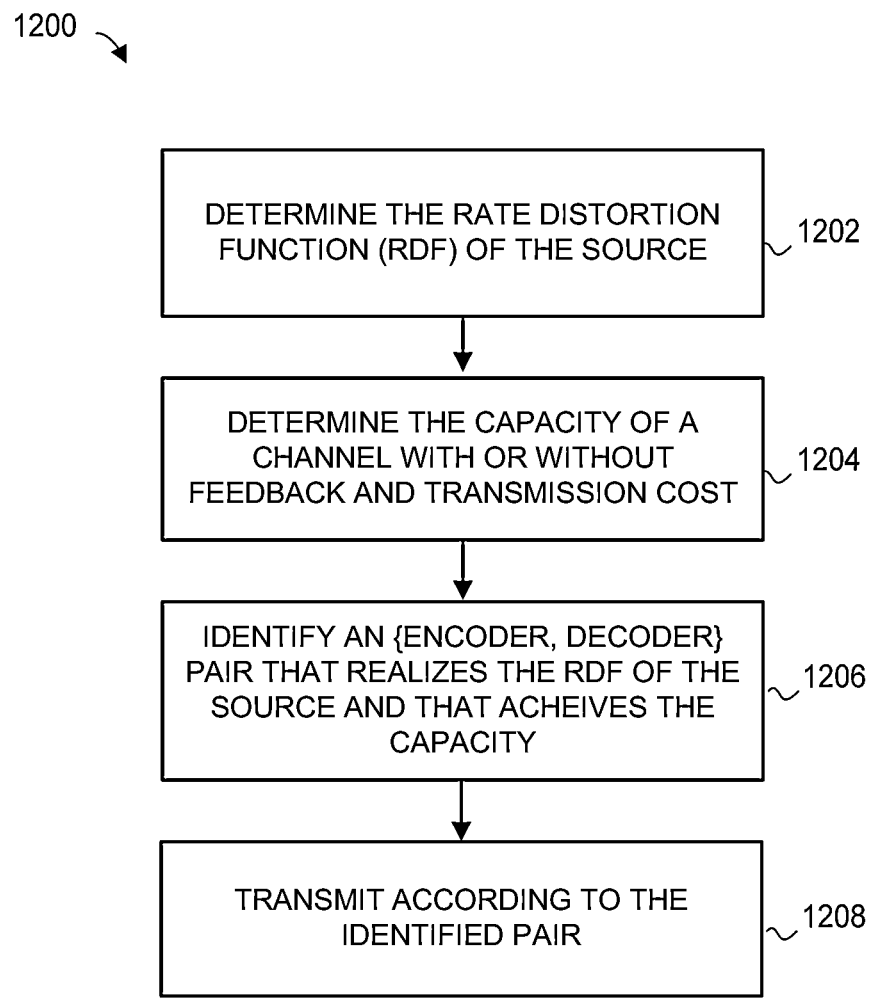
FIG. 12 is a flow diagram of an example method for identifying and utilizing an {encoder, decoder} pair, which pair may be utilized in the system illustrated in FIG. 1.

FIG. 12 is a flow diagram of an example method 1200 for designing and utilizing an {encoder, decoder} pair based on JSCC. A computing device, such as the computing device illustrated in detail in FIG. 15, may be specially and/or specifically configured to implement at least a portion of the method 1200. Further, in some implementations, a suitable combination of a computing device, an operator of a communication system, such as the communication system 100, and one or more other suitable components of a communication system (e.g., routers, modems, gateways, etc.) may implement the method 1200.

The example method 900 includes determining a rate distortion function (RDF) of the source (block 1202). The source, for example, may be the source 102, and a computing device and/or operator may determine the RDF to be a nonanticipative RDF corresponding to the source 102, as further discussed in section D entitled "Encoder Design Overview and Methods." In this manner, the computing device and/or operator may determine an RDF that is zero-delay. In some implementations, the determined RDF may include one or more realizations of an encoder, channel, and decoder representing the RDF, and, in other applications, the determined RDF may include one or more sets of data, algorithms, or instructions that represent the RDF and are stored a nontransitory computer-readable medium.

The example method 900 also includes determining a capacity of a channel over which information, generated by the source, is to be transmitted (block 1204). The determined capacity may include a characterization or formula for a finite block length feedback capacity, feedback capacity, finite block length feedback capacity with transmission cost, feedback capacity with transmission cost, finite block length capacity without feedback, capacity without feedback, finite block length capacity without feedback and with transmission cost, and capacity without feedback and with transmission cost. A computing device and/or operator may determine this characterization or formula according to the method 300, for example.

An {encoder, decoder} pair is then identified (block 1206), where the {encoder, decoder} pair realizes the determined RDF and achieves the determined capacity. The {encoder, decoder} pair may include a single code for the encoder, which compresses and encodes symbols from a source, such as the source 102. The {encoder, decoder} pair may also include a single decoder, which code both decodes and decompresses symbols transmitted over the channel. In other words, the encoder may receive uncompressed symbols from a source and output compressed and encoded symbols for transmission over a channel, and the decoder may receive the transmitted symbols and output uncompressed and decoded symbols.

Identifying the {encoder, decoder} pair that realizes the determined RDF and achieves the determined capacity may include identifying an {encoder, decoder} pair that satisfies one or more conditions, in an implementation. As discussed further below, a computing device and/or operator may utilize the determined RDF and the determined capacity to generate specific conditions that the identified {encoder, decoder} pair must satisfy. Then the computing device and/or operator may identify a specific {encoder, decoder} pair that realizes the determined RDF and achieves the determined capacity.

Returning to FIG. 12, the example method 1200 may also include transmitting information according to the identified {encoder, decoder} pair (block 1208). A computing device and/or operator may configures one or more components of a communication system, such as computing devices, modems, routers, etc., to utilize the identified codes for encoding and decoding in transmitting information. This specific configuration may include specifically programming specialized modules of a computing device or other tangible communications device with the identified codes for encoding and decoding. A computing device and/or operator may then activate transmissions of information according to the identified {encoder, decoder} pair. These transmissions may be optimal or near optimal in the sense that $R(D)=C(\kappa)$ for a range of values $(D, \kappa)$.

E.2. Methodology of JSCC Design for General {Source, Channel} Pairs with Memory In this section, example methodologies for JSCC design for general {source, channel} pairs with memory and with respect to {distortion function, transmission cost} pairs are developed. A computing device and/or operator may implement these methodologies as part of the example method 900, for example, or in another method in which encoders and/or decoders are designed according to JSCC. The methodologies are for JSCC design with respect to general {distortion function, transmission cost} pairs, where some examples of distortion functions and transmission cost functions are further discussed in sections B and D.

E.2.1. Nonanticipative (Zero-Delay) Code

To facilitate the development of JSCC methodologies, an example definition of nonanticipative code is introduced below. The definition is for any $$\{source, channel\} \equiv \{P_{X^n}, \{P_{B_i|B^{i-1}, A^i}: i=0,1,\ldots,n\}\}$$

with respect to any

{distortion function, transmission cost} ≡ $\{d_{0,n}, c_{0,n}\}$

A set of randomized nonanticipative encoders with feedback denoted by $$\mathscr{P}_{[0,n]}^{fb,E}$$

may be a sequence of conditional distributions:

$$P_{A_i|A^{i-1}, B^{i-1}, X^i}(a_i | a^{i-1}, b^{i-1}, x^i), i=0,1,\ldots,n$$

Also, an example set of randomized feedback encoders embeds nonanticipative deterministic feedback encoders defined by:

$$\mathscr{E}_{[0,n]}^{fb} \triangleq$$
$$\{e_i : \mathbb{A}^{i-1} \times \mathbb{B}^{i-1} \times \mathbb{X}^i \mapsto \mathscr{A}_i, \, a_i = e_i(a^{i-1}, b^{i-1}, x^i), i=0,\ldots,n\} \subset \mathscr{P}_{[0,n]}^{fb,E}.$$

The example encoders introduced above are nonanticipative in the sense that at each transmission time, i, $$P_{A_i|A^{i-1}, B^{i-1}, X^i}(a_i | a^{i-1}, b^{i-1}, x^i) \text{ and } e_i(a^{i-1}, b^{i-1}, x^i)$$

do not depend on any future symbols (e.g., symbols to be transmitted at future times). The encoders may only be functions of past and present symbols and past channel inputs and outputs, in an implementation.

A set of randomized and deterministic nonanticipative encoders without feedback may be defined by:

$$\mathscr{P}_{[0,n]}^{nfb,E} \triangleq \{P_{A_i|A^{i-1}, X^i}: i=0,1,\ldots,n\} \subset \mathscr{P}_{[0,n]}^{fb,E},$$

$$\mathscr{E}_{[0,n]}^{nfb} \triangleq \{e_i(\cdot,\cdot): a_i = e_i^{nfb}(a^{i-1}, x^i)\}_{i=0}^n \subset \mathscr{E}_{[0,n]}^{fb}.$$

Also, a randomized decoder may be a sequence of conditional distributions defined by $$\mathscr{P}_{[0,n]}^{D} \triangleq \{P_{Y_i|Y^{i-1}, B^i}(y_i | y^{i-1}, b^i): i=0,1,\ldots,n\}$$

embedding deterministic decoders denoted by:

$$\mathscr{E}_{[0,n]}^{D} \triangleq \{g_i(\cdot,\cdot): y_i = g_i(y^{i-1}, b^i)\}_{i=0}^n \subset \mathscr{P}_{[0,n]}^{D}.$$

Given any source, nonanticipative encoder as defined above, and randomized decoder as defined above, a joint probability distribution may be defined as:

$$P_{X^n, A_n, B^n, Y^n}(dx^n, da^n, da^n, db^n, dy^n) = \otimes_{i=0}^n P_{Y_i|Y^{i-1}, B^i}$$
$$(dy_i|y^{i-1}, b^i) \otimes P_{B_i|B^{i-1}, A^i}(db_i|b^{i-1}, a^i) \otimes$$
$$P_{A_i|A^{i-1}, B^{i-1}, X^i}(da_i|a^{i-1}, b^{i-1}, x^i) \otimes P_{X_i|X^{i-1}}(dx_i|x^{i-1}).$$

Given any $$\{P_{X^n}, \{P_{B_i|B^{i-1}, A^i}: i=0,1,\ldots,n\}\},$$

a nonanticipative code for JSCC design of a system, $$\Sigma_{JSCC} \triangleq (\mathbb{X}^n, \mathbb{A}^n, \mathbb{B}^n, \mathbb{Y}^n, P_{X^n}, \{P_{B_i|B^{i-1}, A^i}: i=0,1,\ldots,n\}, d_{0,n}, c_{0,n}),$$

is a nonanticipative {encoder, decoder} pair $$\{P_{A_i|A^{i-1}, B^{i-1}, X^i}, P_{Y_i|Y^{i-1}, B^i}: i=0,1,\ldots,n\}$$

This nonanticipative {encoder, decoder} pair has an excess distortion probability:

$$\vec{P}\{d_{0,n}(x^n, y^n) > (n+1)d\} \leq \epsilon, \epsilon \in (0,1), d \geq 0$$

and transmission cost:

$$\frac{1}{n+1}\mathbb{E}\{c_{0,n}(A^n, B^{n-1})\} \leq \kappa, \kappa \geq 0.$$

The minimum excess distortion achievable by a nonanticipative code may be: $D^o(n,\epsilon,\kappa) \triangleq \inf\{d: \forall(n,d,\epsilon,\kappa) \text{ nonanticipative code}\}$.

E.2.2. Realization of a Reproduction Distribution of the Finite-Time RDF

Figure 13:
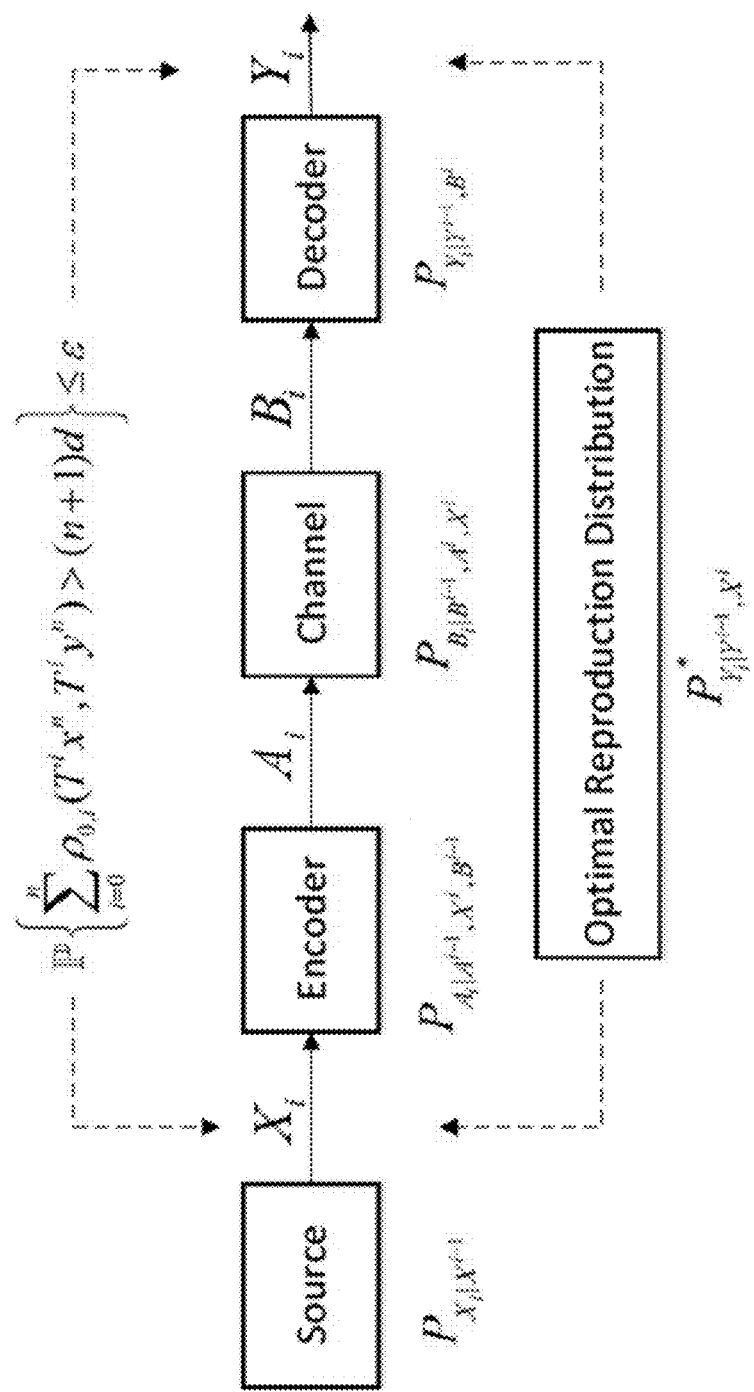
FIG. 13 illustrates a realization of a finite-time RDF.

The following description defines an example "realization" of the conditional distribution corresponding to the $R_{0,n}^{na}(D)$ for a given source. FIG. 13 illustrates such a realization. As described further with reference to FIG. 12, this type of realization may be utilized for JSCC design of an {encoder, decoder} pair.

Given a nonanticipative code:

$$\Sigma_{JSCC} \triangleq (\mathbb{X}^n, \mathbb{A}^n, \mathbb{B}^n, \mathbb{Y}^n, P_{X^n}, \{P_{B_i|B^{i-1}, A^i}: i=0,1,\ldots,n\}, d_{0,n}, c_{0,n}),$$

a realization of the optimal reproduction distribution:

$$\{P_{Y_i|Y^{i-1}, X^i}^*(y_i|y^{i-1}, x^i): i=0,1,\ldots,n\}$$

corresponding to $R_{0,n}^{na}(D)$ may be an {encoder, decoder} pair with the encoder used with or without feedback, such that $$\vec{P}_{Y^n|X^n}^*(y^n|x^n) = \otimes_{i=0}^n P_{Y_i|Y^{i-1}, X^i}^*(dy_i|y^{i-1}, x^i)$$

In such a case, the $R_{0,n}^{na}(D)$ is "realizable," because the realization operates with average distortion≤D.

In some implementations, given a system:

$$\Sigma_{JSCC} \triangleq (\mathbb{X}^n, \mathbb{A}^n, \mathbb{B}^n, \mathbb{Y}^n, P_{X^n}, \{P_{B_i|B^{i-1}, A^i}: i=0,1,\ldots,n\}, d_{0,n}, c_{0,n}),$$

multiple realization of the optimal reproduction distribution may exist. For example, in systems utilizing Gaussian sources and channels with memory, realization with feedback encoding and without feedback encoding may exist.

To identify the {encoder, decoder} pair that realizes the determined RDF and achieves the determined capacity, as discussed with reference to FIG. 12, a computing device or operator may identify the realization that satisfies $$R_{0,n}^{na}(D) = C_{A^n \to B^n}^{FB}(\mathcal{K}).$$

Then, for such a realization, a computing device and/or operator may compute the excess distortion probability is computed and the minimum excess distortion achievable. Because the RDFs and capacities may be determined (e.g., according to the example methods 300 and 600), the {encoder, decoder} pair follows from the above condition.

E.3. Example JSCC Design for a Binary Symmetric Markov Source Over a Binary State Symmetric Channel with Memory Although the following description provides an example design of an {encoder, decoder} pair according to JSCC for a specific type of source and channel, the techniques of the present disclosure may allow {encoder, decoder} pairs to be designed for other types of channels and/or sources. For example, the techniques disclosed herein may be utilized to generate {encoder, decoder} pairs for binary, symmetric, non-symmetric, Gaussian, non-Gaussian, stationary, non-stationary, etc. sources and/or channels. In fact, the realization of FIG. 10A corresponds to a JSCC design.

In the following example, an {encoder, decoder} pair, designed according to JSCC, realizes an RDF for a channel and operates at the capacity of the channel. Specifically, the example includes a binary symmetric Markov source (BSMS (p)) and a binary state symmetric channel (BSSC($\alpha_i, \beta_i$)). The example also utilizes a single letter Hamming definition of distortion and a single letter instantaneous cost function with and without feedback.

The nonanticipative RDF of the BSMS(p) may be developed from the following transition probabilities:

$$P_{X_i|X_{i-1}}(x_i | x_{i-1}) = \begin{bmatrix} 1-p & p \\ p & 1-p \end{bmatrix}.$$

Also, the single letter Hamming distortion criterion between the source symbol and the reproduction (e.g., decoded) symbol may be defined by:

$$\rho(x_i, y_i) = 0 \text{ if } x_i = y_i,$$

and 0 otherwise.

According to the definitions of nonanticipative RDF presented in section D, $R^{na}(D)$ of a BSMS(p) with single letter Hamming distortion is given by:

$$R^{na}(D) = \begin{cases} H(p) - mH(\alpha) - (1-m)H(\beta) & \text{if } D \leq \frac{1}{2} \\ 0 & \text{otherwise} \end{cases}$$

where D is the average distortion, $$m = 1 - p - D + 2pD, \quad \alpha = \frac{(1-p)(1-D)}{1-p-D+2pD}, \quad \beta = \frac{p(1-D)}{p+D-2pD}.$$

The optimal reproduction distribution may be given by:

$$P^*_{Y_i|X_i,Y_{i-1}}(y_i | x_i, y_{i-1}) = \begin{matrix} & 0,0 & 0,1 & 1,0 & 1,1 \\ 0 & \alpha & \beta & 1-\beta & 1-\alpha \\ 1 & 1-\alpha & 1-\beta & \beta & \alpha \end{matrix}.$$

To determine the capacity of BSSC($\alpha_i, \beta_1$) with and without feedback, a computing device and or operator may, in this example, consider a special case of the unit memory channel of the same structure as the optimal reproduction distribution:

$$P_{B_i|A_i,B_{i-1}}(b_i | a_i, b_{i-1}) = \begin{matrix} & 0,0 & 0,1 & 1,0 & 1,1 \\ 0 & \alpha_1 & \beta_1 & 1-\beta_1 & 1-\alpha_1 \\ 1 & 1-\alpha_1 & 1-\beta_1 & \beta_1 & \alpha_1 \end{matrix}.$$

Also, the state of a channel may be:
$$s_i \triangleq a_i \oplus b_{i-1}.$$

The single letter cost function may be:

$$\gamma(a_i, b_{i-1}) = \begin{cases} 1 & \text{if } a_i = b_{i-1}, (s_i = 0) \\ 0 & \text{if } a_i \neq b_{i-1}, (s_i = 1) \end{cases}.$$

Also, an average transmission cost is imposed, where the average transmission cost is defined by $$\frac{1}{n+1} \sum_{i=0}^{n} \mathbb{E}\{\gamma(a_i, b_{i-1})\} = \kappa,$$

wire $\mathcal{K}$ =constant.

In this example, the average transmission cost at time i may be:
$$\mathbb{E}\{\gamma(A_i, B_{i-1})\} = P_{A_i, B_{i-1}}(0,0) + P_{A_i, B_{i-1}}(1,1) = P_{S_i}(0).$$

According to the techniques discussed in section B, the capacity of the BSSC($\alpha_1, \beta_i$) with and without feedback and average transmission cost is equal and may be expressed as:
$$C_{A^\infty \to B^\infty}^{FB}(\mathcal{K}) = C_{A^\infty, B^\infty}^{nfB}(\mathcal{K}) = H(\lambda)(1 - \mathcal{K})) - \mathcal{K} H(\alpha_1) - (1 - \mathcal{K}) H(\beta_1)$$

where
$$\lambda = \alpha_1 \mathcal{K} + (1 - \beta_1).$$

The capacity achieving channel input distribution without feedback is:

$$P^*_{A_i|A_{i-1}}(a_i | a_{i-1}) = \begin{bmatrix} \frac{1-\kappa-\gamma}{1-2\gamma} & \frac{\kappa-\gamma}{1-2\gamma} \\ \frac{\kappa-\gamma}{1-2\gamma} & \frac{1-\kappa-\gamma}{1-2\gamma} \end{bmatrix}$$

where
$$\gamma = \alpha_1 \mathcal{K} + \beta_1(1 - \mathcal{K}).$$

and the capacity achieving channel input distribution with feedback is:

$$P^*_{A_i|B_{i-1}}(a_i | b_{i-1}) = \begin{bmatrix} \kappa & 1-\kappa \\ 1-\kappa & \kappa \end{bmatrix}.$$

Figure 14:
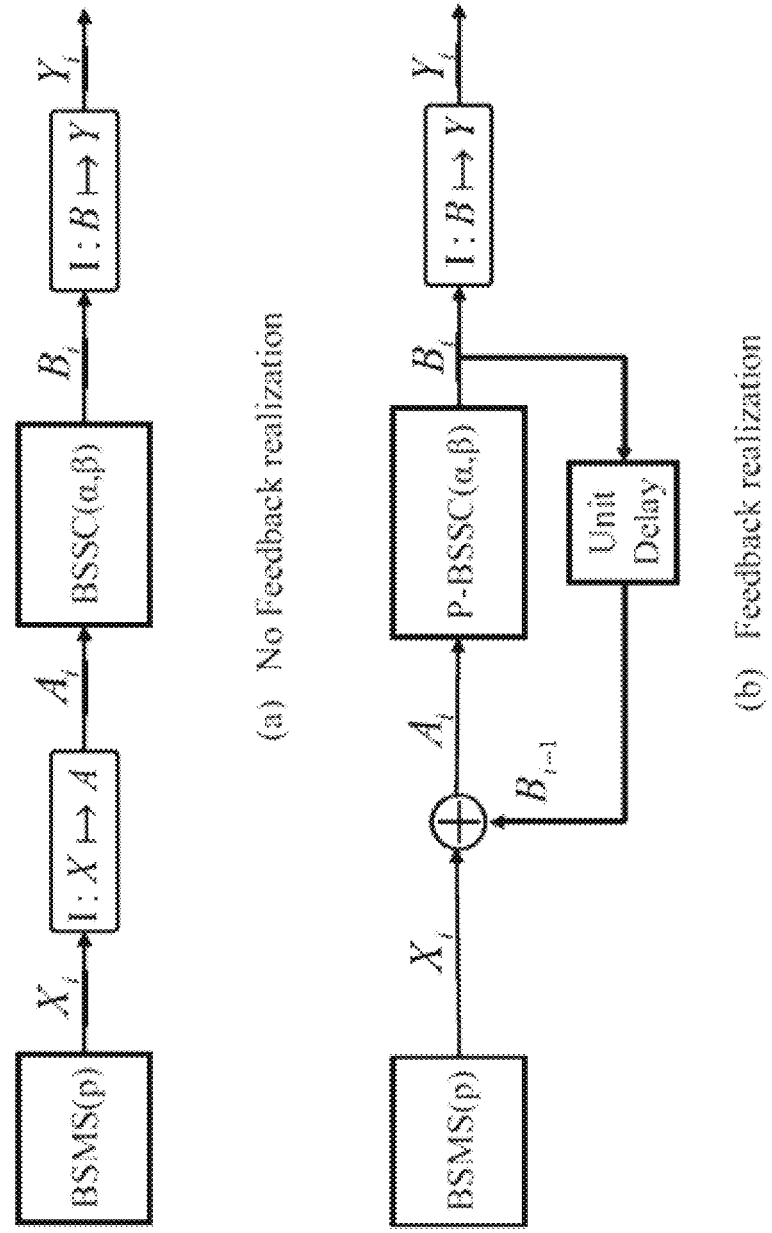
FIG. 14 illustrate example {encoder, decoder} pairs that realize an RDF and a capacity of a channel.

Now that the capacity and RDF are determined for this example, a computing device and/or operator may identify or construct an {encoder, decoder} pair that realizes the determined RDF and achieves the determined capacity. FIG. 14 illustrates example realizations of the {encoder, decoder} pair.

For $$\mathcal{K} = m, \alpha_1 = \alpha \text{ and } \beta_1 = \beta$$

the {encoder, decoder} pair to be identified or constructed must satisfy:

$$C_{A^\infty \to B^\infty}^{FB}(\mathcal{K}) = H(p) - mH(\alpha) - (1-m)H(\beta) = R^{na}(D)$$

For encoding without feedback (as shown in part (a) of FIG. 14), a parameter of the optimal channel input distribution may be equal to the parameter of the conditional distribution of the source:

$$\left( \frac{1 - \kappa - \gamma}{1 - 2\gamma} = p \right).$$

In this example, the {encoder, decoder} pair satisfying the above condition may be the identity mapping on respective inputs. That is, $$a_i = x_i, y_i = b_i$$

or uncoded transmission is optimal. This result may imply that no encoding is performed and no decoding is performed. Also, a computing device and/or operator may evaluate the minimum excess distortion achievable. For encoding with feedback (shown in part (b) of FIG. 14), the {encoder, decoder} pair is given by:

$$a_i = x_i \oplus b_{i-1}, y_i = b_i, i = 0, 1, \ldots$$

Although this case is presented above by way of example, other {encoder, decoder} pairs can be computed using precisely the same methodology (e.g., by invoking the examples of optimal channel input distributions for channels with memory and feedback and transmission cost, and by using the expression of the finite time nonanticipative RDF).

F. Example Computing Device

Figure 15:
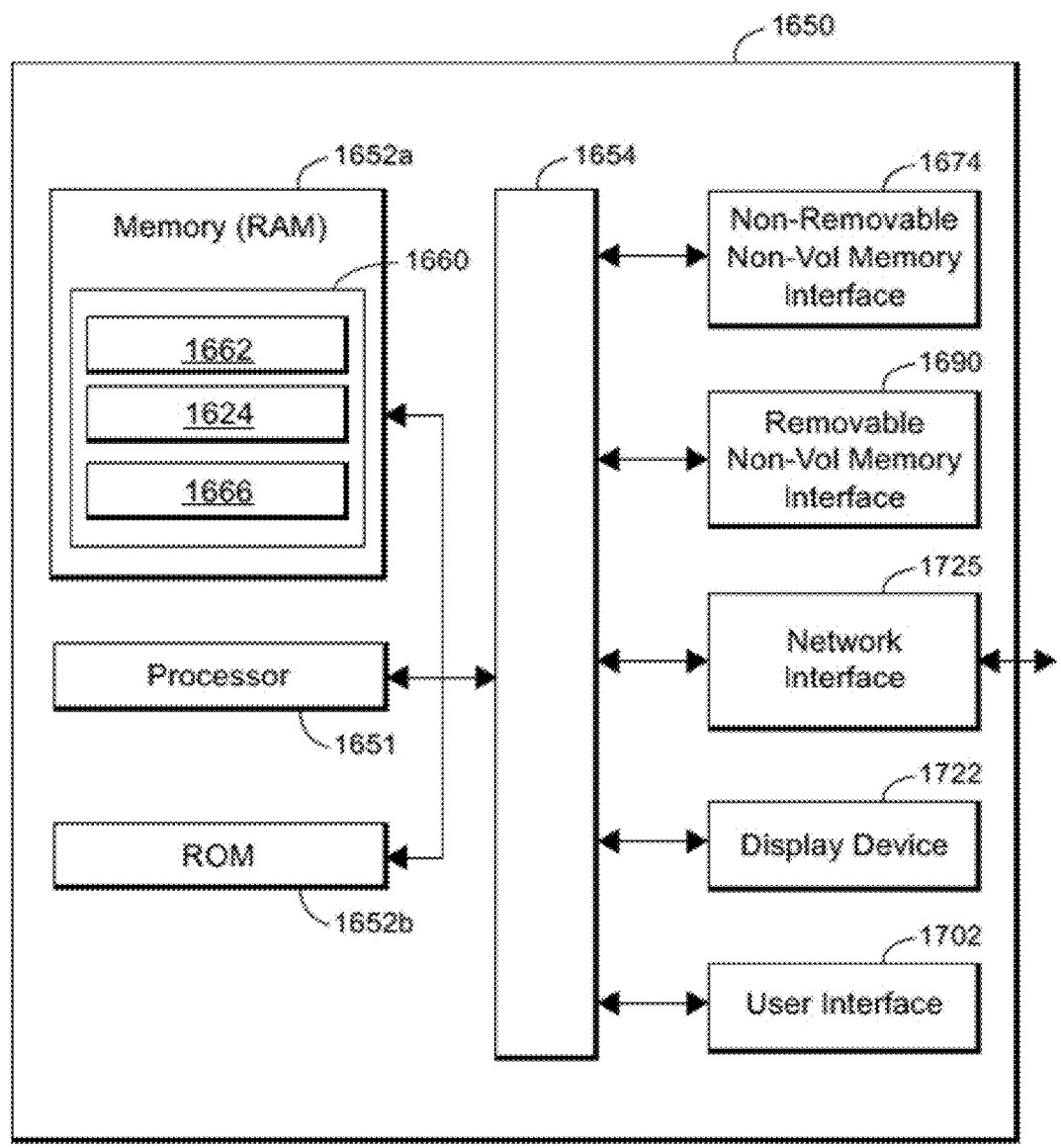
FIG. 15 is a block diagram of an example computing device.

FIG. 15 illustrates an example computing device 1650, which computing device 1650 may be implemented as the source 102, may implement the encoder 104 or the decoder 108, and/or may implement at least some of the functionality discussed with reference to FIGS. 3, 4, 5, 8, 9, and 12. The computing device 1650 may include one or more central processing units (CPUs) or processing units 1651 (may be called a microcontroller or a microprocessor), a system memory 1652a and 1652b, and a system bus 1654 that couples various system components including the system memory 1652 to the processing units 1651. The system bus 1654 may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The computing device 1650 may include an assortment of computer-readable media. Computer-readable media may be any media that may be accessed by the computing device 1650. By way of example, and not limitation, the computer-readable media may include both volatile and nonvolatile media, removable and non-removable media. Media may also include computer storage media and communication media. The computer-readable media may store information such as computer-readable instructions, program modules, data structures, or other data. Computer-storage media may include non-transitory media, such as a RAM 1652b, a ROM 1652a, EEPROM, optical storage disks, magnetic storage devices, and any other non-transitory medium which may be used to store computer-accessible information.

In an embodiment, the ROM 1652a and/or the RAM 1652b may store instructions that are executable by the processing unit 1651. For example, a basic input/output system (BIOS), containing algorithms to transfer information between components within the computer 1650, may be stored in ROM 1652b. Data or program modules that are immediately accessible or are presently in use by the processing unit 1651 may be stored in RAM 1652a. Data normally stored in RAM 1652a while the computing device 1650 is in operation may include an operating system, application programs, program modules, and program data. In particular, the RAM 1652a may store one or more applications 1660 including one or more routines 1662, 1664, and 1666 implementing the functionality of the example methods 300, 400, 500, 800, 900, and 1200.

The computing device 1650 may also include other storage media such as a hard disk drive that may read from or write to non-removable, non-volatile magnetic media, a magnetic disk drive that reads from or writes to a removable, non-volatile magnetic disk, and an optical disk drive that reads from or writes to a removable, nonvolatile optical disk. Other storage media that may be used includes magnetic tape cassettes, flash memory cards, digital versatile disks, digital video tape, solid state RAM, and solid state ROM. The hard disk drive may be connected to the system bus 1654 through a non-removable memory interface such as interface 1674. A magnetic disk drive and optical disk drive may be connected to the system bus 1654 by a removable memory interface, such as interface 1690.

A user or operator may interact with the computing device 1650 through input devices such as a keyboard or a pointing device (i.e., a mouse). A user input interface 1702 may be coupled to the system bus 1654 to allow the input devices to communicate with the processing unit 1651. A display device such as a monitor 1722 may also be connected to the system bus 1654 via a video interface (not shown).

The computing device 1650 may operate in a networked environment using logical connections to one or more remote computing devices, for example. The remote computing device may be a personal computer (PC), a server, a router, or other common network node. The remote computing device typically includes many or all of the previously-described elements regarding the computing device 1650. Logical connections between the computing device 1650 and one or more remote computing devices may include a wide area network (WAN). A typical WAN is the Internet. When used in a WAN, the computing device 1650 may include a modem or other means for establishing communications over the WAN. The modem may be connected to the system bus 1654 via the network interface 1725, or other mechanism. In a networked environment, program modules depicted relative to the computing device 1650, may be stored in the remote memory storage device. As may be appreciated, other means of establishing a communications link between the computing device 1650 and a remote computing device may be used.

Additional Considerations

Upon reading this disclosure, those of ordinary skill in the art will appreciate still additional alternative structural and functional designs for characterizing channels and capacities, determining optimal input distributions, designing encoders and decoders, etc. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A method for characterizing a capacity of a channel with memory and feedback, the method comprising:
defining a channel model corresponding to the channel, wherein:
the channel is utilized to transmit information from a source to a destination, and
the channel model indicates a dependence of outputs from the channel on past and present channel input symbols and on past channel output symbols;
determining a representation of the capacity based on the channel model and based on a channel input distribution that achieves the capacity, wherein the representation represents the capacity for a finite number of transmissions over the channel, and wherein the representation includes an optimization; and
solving, by one or more processors of a specially configured computing device, the optimization of the representation of the capacity to determine the capacity of the channel for the finite number of transmissions.

2. The method of aspect 1, wherein determining the representation of the capacity includes:
determining, using stochastic optimal control techniques, a subset of distributions which include the channel input distribution that achieves the capacity.

3. The method of aspect 2, wherein the subset of distributions is a first subset of distributions, and wherein determining the representation of the capacity further includes:
determining, based on the first subset of distributions and using a variational equality of conditional mutual information or mutual information, an upper bound to identify a second subset of distributions which includes the channel input distribution that achieves the capacity, wherein the second subset of distributions is smaller than the first subset of distributions.

4. The method of any one of aspects 1 to 3, further comprising:
defining a transmission cost function, wherein the transmission cost function specifies a cost to transmit the information from the source to the destination and indicates a dependence on at least one of the past and present channel input symbols or the past channel output symbols,
wherein determining the representation of the capacity includes determining the representation of the capacity based on the channel model and based on the transmission cost function.

5. The method of aspect 4, wherein the subset of distributions is a first subset of distributions, wherein determining the representation of the capacity further includes:
determining, using stochastic optimal control techniques, a subset of distributions which include the channel input distribution that achieves the capacity,
determining, based on the channel model and the transmission cost function, if an output of the channel or the transmission cost function is dependent on quantities other than the past channel input symbols and the past channel output symbols,
if the output of the channel or the transmission cost function is dependent on quantities other than the past channel input symbols and the past channel output symbols,
determining, based on the first subset of distributions and using a variational equality of conditional mutual information, a second subset of distributions which include the optimal channel input distribution, wherein the second subset of distributions is smaller than the first subset of distributions, and
determining the representation of the capacity based on the second subset of distributions, if the output of the channel or the transmission cost function is not dependent on quantities other than the past channel input symbols and the past channel output symbols, determining the representation of the capacity based on the first subset of distributions 6. The method of any one of aspects 1 to 5, wherein the representation of the capacity is a first representation of a finite-block length capacity, the method further comprising:
determining, based on the first representation of the finite-block length capacity, determining a second representation of the capacity, wherein the second representation is an upper bound on the first representation and represents the capacity for an infinite number of transmissions over the channel per unit time.

7. The method of any one of aspects 1 to 6, wherein the optimization is a maximization, and wherein solving the optimization of the representation of the capacity including solving the maximization.

8. The method of any one of aspects 1 to 7, wherein solving the optimization includes solving the optimization using a dynamic programming algorithm.

9. The method of any one of aspects 1 to 8, wherein solving the optimization includes solving the optimization using a Blahut-Arimoto algorithm sequentially.

10. The method of any one of aspects 1 to 9, wherein solving the optimization includes:
determining a gain or reduction in the capacity for encoding with feedback as compared to encoding without feedback.

11. The method of any one of aspects 1 to 10, further comprising:
designing, by an encoder design procedure, a coding scheme based on the capacity of the channel determined by solving the optimization of the representation of the capacity, wherein the coding scheme utilizes the channel input distribution that achieves the capacity, and wherein the coding scheme satisfies a condition specifying that none of the information is lost in the coding scheme.

12. The method of aspect 11, further comprising:
configuring an encoder coupled to the channel to encode based on the coding scheme that satisfies the condition specifying that none of the information is lost in the coding scheme.

13. A system including:
one or more processors; and
one or more non-transitory memories,
wherein the one or more non-transitory memories store computer-readable instructions that specifically configure the system such that, when executed by the one or more processors, the computer-readable instructions cause the system to:
receive a channel model corresponding to the channel, wherein:
the channel is utilized to transmit information from a source to a destination, and
the channel model indicates a dependence of outputs from the channel on past and present channel input symbols and on past channel output symbols;
determine a representation of the capacity based on the channel model and based on a channel input distribution that achieves the capacity, wherein the representation represents the capacity for a finite number of transmissions over the channel, and wherein the representation includes an optimization; and
solve the optimization of the representation of the capacity to determine the capacity of the channel for the finite number of transmissions.

14. The system of aspect 13, wherein the computer-readable instructions further cause the system to:
determine a nonanticipative rate distortion function based on a received model of the source and based on a causal reproduction distribution, wherein the second representation and the third representation specify a rate at which symbols from the source should be transmitted to the destination.

15. The system of aspect 14, wherein the computer-readable instructions further cause the system to:
design a coding scheme based on the capacity of the channel determined by solving the optimization of the representation of the capacity and based on the nonanticipative rate distortion function, wherein the coding scheme utilizes the channel input distribution that achieves the capacity, and wherein the coding scheme satisfies a condition specifying that none of the information is lost in the coding scheme,
configure an encoder coupled to the channel to encode based on the coding scheme, wherein the coding scheme simultaneously compresses and encodes information transmitted over the channel.

16. The system of aspect 15, wherein designing the coding scheme includes designing the coding scheme by joint source channel coding.

17. The system of any one of aspects 13 to 16, wherein determining the representation of the capacity includes:
determining, using stochastic optimal control techniques, a subset of distributions which include the channel input distribution that achieves the capacity.

18. The system of aspect 17, wherein the subset of distributions is a first subset of distributions, and wherein determining the representation of the capacity further includes:
determining, based on the first subset of distributions and using a variational equality of conditional mutual information or mutual information, an upper bound to identify a second subset of distributions which includes the channel input distribution that achieves the capacity, wherein the second subset of distributions is smaller than the first subset of distributions.

19. The system of any one of aspects 13 to 18, wherein the representation of the capacity is a first representation of a finite-block length capacity, and wherein the computer-readable instructions further cause the system to:
determine, based on the first representation of the finite-block length capacity, determining a second representation of the capacity, wherein the second representation is an upper bound on the first representation and represents the capacity for an infinite number of transmissions over the channel per unit time.

20. The system of any one of aspects 13 to 19, wherein the channel model is a probabilistic map.

21. The system of any one of aspects 13 to 20, wherein the channel model is a function of the past and present channel input symbols.

The invention claimed is:

1. A method for characterizing a capacity of a channel with memory and feedback, the method comprising:
defining a channel model corresponding to the channel, wherein:
the channel is utilized to transmit information from a source to a destination, and
the channel model indicates a memory dependence of outputs from the channel on past and present channel input symbols and on past channel output symbols;
determining a representation of the capacity based on the channel model and based on a plurality of channel input distributions that are conditional distributions that depend on past channel input and output symbols, wherein the representation includes a finite-block length feedback capacity corresponding to the capacity for a finite number of transmissions over the channel or a feedback capacity corresponding to a per unit time limit of the finite-block length feedback capacity, and wherein the representation of the capacity includes an optimization over the plurality of channel input distributions; and
solving, by one or more processors of a specially configured computing device, the optimization of the representation of the capacity over the plurality of channel input distributions to determine a single channel input distribution that achieves an optimal finite-block length feedback capacity or an optimal feedback capacity.

2. The method of claim 1, wherein determining the representation of the capacity includes:
determining, using stochastic optimal control techniques, a subset of the plurality of channel input distributions which includes the single channel input distribution that achieves the optimal finite-block length feedback capacity or the optimal feedback capacity.

3. The method of claim 2, wherein the subset of the plurality of channel input distributions is a first subset of channel input distributions, and wherein determining the representation of the capacity further includes:
determining, based on the first subset of channel input distributions and using a variational equality of conditional mutual information or mutual information, an upper bound on the representation of the capacity to identify a second subset of channel input distributions which includes the single channel input distribution that achieves the optimal finite-block length feedback capacity or the optimal feedback capacity, wherein the second subset of channel input distributions is smaller than the first subset of channel input distributions.

4. The method of claim 1, further comprising:
defining a transmission cost function, wherein the transmission cost function specifies a cost to transmit the information from the source to the destination, wherein the transmission cost function depends on past and present channel input symbols and the past channel output symbols,
wherein determining the representation of the capacity includes determining the representation of the capacity further based on the transmission cost function.

5. The method of claim 4, wherein determining the representation of the capacity further includes:
   determining, using stochastic optimal control techniques, a first subset of the plurality of channel input distributions which includes the single channel input distribution that achieves the optimal finite-block length feedback capacity or the optimal feedback capacity,
   determining, based on the channel model and the transmission cost function, if the channel output transition probabilities depend on quantities other than the memory of the channel or the dependence of transmission cost function on past and present channel input symbols and the past channel output symbols,
   if the channel output transition probabilities depend on quantities other than the memory of the channel or the dependence of transmission cost function on past and present channel input symbols and the past channel output symbols,
      determining, based on the first subset of channel input distributions and using a variational equality of conditional mutual information or mutual information, a second subset of channel input distributions which includes the single channel input distribution that achieves the optimal finite-block length feedback capacity or the optimal feedback capacity, wherein the second subset of channel input distributions is smaller than or equal to the first subset of channel input distributions, and
      determining the single channel input distribution that achieves the optimal finite-block length feedback capacity or the optimal feedback capacity based on the second subset of distributions,
   if the channel output transition probabilities do not depend on quantities other than the memory of the channel or the dependence of transmission cost function on past and present channel input symbols and the past channel output symbols, determining the single channel input distribution that achieves the optimal finite-block length feedback capacity or the optimal feedback capacity based on the first subset of channel input distributions.

6. The method of claim 1, wherein the representation of the capacity is a first representation of the finite-block length feedback capacity, the method further comprising:
   determining a second representation of the capacity based on the first representation of the finite-block length feedback capacity, wherein the second representation of the capacity is an upper bound on the first representation of the finite-block length feedback capacity and represents the feedback capacity corresponding to the per unit time limit of the finite-block length feedback capacity for an infinite number of transmissions over the channel.

7. The method of claim 1, wherein the optimization is a maximization, and wherein solving the optimization of the representation of the capacity includes solving the maximization.

8. The method of claim 1, wherein solving the optimization includes solving the optimization using a dynamic programming algorithm.

9. The method of claim 1, wherein solving the optimization includes one of solving the optimization independently using a sequential or recursive Blahut-Arimoto algorithm or solving the optimization using the sequential or recursive Blahut-Arimoto algorithm based on sequential variational equalities in combination with a dynamic programming algorithm.

10. The method of claim 1, wherein solving the optimization includes:
    determining a gain in a characterization of capacity for encoding with feedback as compared to encoding without feedback.

11. The method of claim 1, further comprising:
    designing, by an encoder design procedure, a coding scheme based on the optimal finite-block length feedback capacity or the optimal feedback capacity determined by solving the optimization of the representation of the capacity, wherein the coding scheme utilizes the single channel input distribution that achieves the optimal finite-block length feedback capacity or the optimal feedback capacity, and wherein the coding scheme satisfies a condition specifying that none of the information is lost in the coding scheme.

12. The method of claim 11, further comprising:
    configuring an encoder coupled to the channel to encode based on the coding scheme that satisfies the condition specifying that none of the information is lost in the coding scheme.

13. A system comprising:
    one or more processors; and
    one or more non-transitory memories,
    wherein the one or more non-transitory memories store computer-readable instructions that specifically configure the system such that, when executed by the one or more processors, the computer-readable instructions cause the system to:
       receive a channel model corresponding to the channel, wherein:
          the channel is utilized to transmit information from a source to a destination, and
          the channel model indicates a memory dependence of outputs from the channel on past and present channel input symbols and on past channel output symbols;
       determine a representation of the capacity based on the channel model and based on a plurality of channel input distributions that are conditional distributions that depend on past channel input and output symbols, wherein the representation includes a finite-block length feedback capacity corresponding to the capacity for a finite number of transmissions over the channel or a feedback capacity corresponding to a per unit time limit of the finite-block length feedback capacity, and wherein the representation of the capacity includes an optimization over the plurality of channel input distributions; and
       solve the optimization of the representation of the capacity over the plurality of channel input distributions to determine a single channel input distribution that achieves an optimal finite-block length feedback capacity or an optimal feedback capacity.

14. The system of claim 13, wherein the computer-readable instructions further cause the system to:
    determine a nonanticipative rate distortion function based on a received model of the source and based on a causal reproduction distribution, wherein the nonanticipative rate distortion function specifies a rate at which symbols from the source should be transmitted to the destination with distortion.

15. The system of claim 14, wherein the computer-readable instructions further cause the system to:
    design a coding scheme based on the optimal finite-block length feedback capacity or the optimal feedback capacity of the channel determined by solving the optimization of the representation of the capacity and based on the nonanticipative rate distortion function, wherein the coding scheme utilizes the single channel input distribution that achieves the optimal finite-block length feedback capacity or the optimal feedback capacity, and wherein the coding scheme satisfies a condition specifying that none of the information is lost in the coding scheme, configure an encoder coupled to the channel to encode based on the coding scheme, wherein the coding scheme simultaneously compresses and encodes information to be transmitted over the channel.

16. The system of claim 15, wherein designing the coding scheme includes designing the coding scheme by joint source channel coding.

17. The system of claim 13, wherein determining the representation of the capacity includes:
determining, using stochastic optimal control techniques, a subset of channel input distributions which includes the single channel input distribution that achieves the optimal finite-block length feedback capacity or the optimal feedback capacity.

18. The system of claim 17, wherein the subset of channel input distributions is a first subset of channel input distributions, and wherein determining the representation of the capacity further includes:
determining, based on the first subset of channel input distributions and using a variational equality of conditional mutual information or mutual information, an upper bound on the representation of the capacity to identify a second subset of channel input distributions which includes the single channel input distribution that achieves the optimal finite-block length feedback capacity or the optimal feedback capacity, wherein the second subset of channel input distributions is smaller than or equal to the first subset of channel input distributions.

19. The system of claim 13, wherein the representation of the capacity is a first representation of a finite-block length feedback capacity, and wherein the computer-readable instructions further cause the system to:
determine a second representation of the capacity based on the first representation of the finite-block length feedback capacity, wherein the second representation of the capacity is an upper bound on the first representation of the finite-block length feedback capacity and represents the feedback capacity corresponding to the per unit time limit of the finite-block length feedback capacity for an infinite number of transmissions over the channel.

20. The system of claim 13, wherein the channel model is a probabilistic map.

21. The system of claim 13, wherein the channel model is a function of the past and present channel input symbols and random noise generated according to a distribution function.

22. The method of claim 1, wherein determining the representation of the capacity includes:
determining, using a stochastic optimal control technique and a variational equality of conditional mutual information or mutual information, the channel input distribution that achieves the finite-block length feedback capacity or the feedback capacity.

23. The method of claim 4, further comprising
solving the optimization of the representation of the capacity using stochastic optimal control techniques and a variational equality of conditional mutual information or mutual information.

24. The method of claim 11, wherein the coding scheme utilizes the single channel input distribution that achieves the optimal finite-block length feedback capacity or the optimal feedback capacity, and wherein the coding scheme is capable of encoding uniform Random Variables.

25. The system of claim 13, further comprising instructions to:
define a transmission cost function, wherein the transmission cost function specifies a cost to transmit the information from the source to the destination, wherein the transmission cost function depends on past and present channel input symbols and the past channel output symbols,
wherein determining the representation of the capacity includes determining the representation of the capacity further based on the transmission cost function.

* * * * *